(12) United States Patent
Byers et al.

(10) Patent No.: US 7,910,666 B2
(45) Date of Patent: Mar. 22, 2011

(54) MERCAPTAN-HARDENED EPOXY POLYMER COMPOSITIONS AND PROCESSES FOR MAKING AND USING SAME

(75) Inventors: Jim D. Byers, Bartlesville, OK (US); Mitchell D. Refvik, Bartlesville, OK (US); Chad E. Brown, Bartlesville, OK (US); Michael S. Matson, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 985 days.

(21) Appl. No.: 11/465,013

(22) Filed: Aug. 16, 2006

(65) Prior Publication Data

US 2007/0112100 A1 May 17, 2007

Related U.S. Application Data

(60) Provisional application No. 60/708,610, filed on Aug. 16, 2005.

(51) Int. Cl.
C08G 59/14 (2006.01)
C08G 63/48 (2006.01)
C08L 63/00 (2006.01)

(52) U.S. Cl. .......................................... 525/523; 525/50
(58) Field of Classification Search .................. 523/435; 428/109; 525/523
See application file for complete search history.

(56) References Cited

U.S. PATENT DOCUMENTS

| | | | |
|---|---|---|---|
| 2,411,954 A | 12/1946 | Burke | |
| 2,476,891 A * | 7/1949 | Mortenson | 554/101 |
| 3,028,417 A * | 4/1962 | Eisenmann | 560/179 |
| 3,041,284 A | 6/1962 | Calhoun et al. | |
| 3,114,734 A | 12/1963 | Gobrad et al. | |
| 3,211,674 A | 10/1965 | Sandridge | |
| 3,278,496 A | 10/1966 | LeFave et al. | |
| 3,352,810 A * | 11/1967 | McLay et al. | 523/453 |
| 3,446,780 A | 5/1969 | Bertozzi | |
| 3,465,057 A | 9/1969 | Cameron et al. | |

(Continued)

FOREIGN PATENT DOCUMENTS

DE 318164 5/1992

(Continued)

OTHER PUBLICATIONS

Kanemura, Y, et al. "Dithiols as Improvers for Polyurethanes," Chemical Abstracts, American Chemical Society, vol. 11, No. 22, Nov. 27, 1989 (XP000251903).

(Continued)

*Primary Examiner* — Mark Eashoo
*Assistant Examiner* — David Karst
(74) *Attorney, Agent, or Firm* — Merchant & Gould, P.C.

(57) ABSTRACT

Mercaptan-hardened epoxy polymer compositions, methods of making the mercaptan-hardened epoxy polymer compositions, and methods of using the mercaptan-hardened epoxy polymer compositions are provided. The mercaptan-hardened epoxy polymer can be produced by contacting a thiol ester composition and an epoxide composition to produce a mixture and then heating the mixture to produce the mercaptan-hardened epoxy polymer. In some embodiments, the thiol ester compositions include thiol esters, hydroxy thiol esters, and crosslinked thiol esters. Adhesive polymer compositions, methods of making the adhesive polymer compositions, and methods of using the adhesive polymer compositions are provided. The adhesive polymer composition can be produced by contacting a thiol ester composition and an epoxide composition to produce a mixture and then heating the mixture to produce the adhesive polymer composition.

36 Claims, 17 Drawing Sheets

Table 3 – Preparation of Mercaptan-Hardened Epoxy Compositions

| Run Number | Curing Agent Identity | Curing Agent (g) | Epoxide Identity | Epoxide (g) | SH:Epoxide Molar Ratio | Catalyst Identity | Catalyst (g) | Gel Time (min) | Observations |
|---|---|---|---|---|---|---|---|---|---|
| 11 | MHSO | 3.83 | Araldite® 506 | 1.76 | 1.0059 | - | - | >2 hrs | long cure time, not tacky |
| 12 | MHSO | 3.85 | Araldite® 506 | 1.90 | 0.9443 | Versamine® H30 | 0.19 | 7 | large exotherm, not tacky |
| 13 | MHSO | 5.60 | Araldite® 506 | 1.81 | 0.9426 | - | - | >2 hrs | long cure time, slightly tacky |
| 14 | MHSO | 5.80 | Araldite® 506 | 1.76 | 0.9960 | Versamine® H30 | 0.23 | 10 | slight exotherm, not tacky |
| 15 | MSO | 2.96 | Araldite® 506 | 1.72 | 1.0175 | Versamine® H30 | 0.20 | >12 hrs | mushy solid @ >12 hrs |
| 16 | MSO | 4.13 | Araldite® 506 | 1.71 | 0.9895 | Versamine® H30 | 0.19 | >12 hrs | mushy solid @ >12 hrs |
| 17 | MSO | 5.60 | Araldite® 506 | 1.71 | 0.9917 | Versamine® H30 | 0.24 | >12 hrs | mushy solid @ >12 hrs |
| 18 | MHSO | - | Araldite® 506 | | -! | - | - | | |
| 19 | MHSO | 3.80 | Araldite® 506 | 1.72 | 1.0292 | DBU | 0.17 | 10 | slight exotherm, tacky/rubbery |
| 20 | MHSO | - | Araldite® 506 | | - | - | - | | |
| 21 | MHSO | 5.60 | Araldite® 506 | 1.69 | 1.0021 | DBU | 0.23 | 1 | large exotherm, hard/tough |
| 22 | MSO | 2.94 | Araldite® 506 | 1.71 | 1.0106 | DBU | 0.14 | 25 | slight exotherm, mushy solid |
| 23 | MSO | 4.10 | Araldite® 506 | 1.71 | 0.9823 | DBU | 0.19 | > 12 hrs | very tacky solid @ >12 hrs |
| 24 | MSO | 5.64 | Araldite® 506 | 1.74 | 0.9885 | DBU | 0.24 | >12 hrs | mushy solid @ >12 hrs |
| 25 | CMSO | 4.95 | Araldite® 506 | 1.73 | 1.0206 | DBU | 0.21 | 13 | slight exotherm, tacky solid |
| 26 | CMSO | 13.9 | Araldite® 506 | 1.72 | 1.0135 | DBU | 0.48 | 1 | slight exotherm, tough/rubbery |
| 27 | MHSO | 2.02 | Araldite® 506 | 3.41 | 0.9836 | DBU | 0.18 | >12 hrs | tacky/rubbery |
| 28 | MSO | 6.33 | Araldite® 506 | 1.74 | 0.9919 | DBU | 0.25 | DS | still liquid @ >12 hrs |

U.S. PATENT DOCUMENTS

| | | | |
|---|---|---|---|
| 3,686,326 A | | 8/1972 | Oswald et al. |
| 3,707,552 A | | 12/1972 | Dobinson et al. |
| 3,742,006 A | | 6/1973 | Doss |
| 3,746,685 A | | 7/1973 | Dobinson et al. |
| 3,832,328 A | * | 8/1974 | Eggensperger et al. ...... 524/289 |
| 3,853,959 A | * | 12/1974 | Dobinson et al. ............. 560/147 |
| 3,884,951 A | | 5/1975 | Oswald |
| 3,914,288 A | | 10/1975 | Garnish et al. |
| 3,916,067 A | | 10/1975 | Jones et al. |
| 3,926,822 A | | 12/1975 | Habiby |
| 3,953,347 A | | 4/1976 | Habiby |
| 3,981,901 A | | 9/1976 | Guthrie et al. |
| 3,986,966 A | | 10/1976 | Wakim |
| 3,991,089 A | | 11/1976 | Schwab et al. |
| 4,045,472 A | | 8/1977 | Guthrue et al. |
| 4,119,640 A | | 10/1978 | Hodakowski et al. |
| 4,218,332 A | | 8/1980 | Schwab et al. |
| 4,231,956 A | | 11/1980 | Sullivan et al. |
| 4,254,185 A | | 3/1981 | Buter |
| 4,340,707 A | | 7/1982 | Quais et al. |
| 4,504,651 A | * | 3/1985 | Yamaguchi et al. .......... 528/360 |
| 4,521,320 A | | 6/1985 | Spivack et al. |
| 4,566,878 A | | 1/1986 | Karol et al. |
| 4,594,193 A | | 6/1986 | Regen |
| 4,626,562 A | * | 12/1986 | Motomura et al. ........... 523/466 |
| 4,636,242 A | | 1/1987 | Timmons |
| 4,788,083 A | | 11/1988 | Dammann et al. |
| 5,126,425 A | | 6/1992 | Sesagawa et al. |
| 5,154,950 A | | 10/1992 | Rosthauser et al. |
| 5,405,426 A | | 4/1995 | Timmons et al. |
| 5,411,776 A | | 5/1995 | Schmidt et al. |
| 5,422,422 A | | 6/1995 | Bader et al. |
| 5,454,851 A | | 10/1995 | Zlotnikov et al. |
| 5,538,531 A | | 7/1996 | Hudson et al. |
| 5,925,726 A | | 7/1999 | Seppala et al. |
| 5,932,681 A | | 8/1999 | Herold et al. |
| 6,039,781 A | | 3/2000 | Goertz et al. |
| 6,221,994 B1 | | 4/2001 | Galbiati et al. |
| 6,231,633 B1 | | 5/2001 | Hirano et al. |
| 6,358,296 B1 | | 3/2002 | Markusch et al. |
| 6,583,302 B1 | | 6/2003 | Erhan et al. |
| 7,153,917 B2 | | 12/2006 | Rink et al. |
| 7,169,737 B2 | | 1/2007 | Hidaka et al. |
| 7,557,236 B2 | * | 7/2009 | Brown et al. ................. 558/250 |
| 7,585,932 B2 | | 9/2009 | Byers et al. |
| 7,713,326 B2 | | 5/2010 | Carstens et al. |
| 7,781,484 B2 | | 8/2010 | Byers et al. |
| 2003/0204030 A1 | | 10/2003 | Higuchi et al. |
| 2005/0096222 A1 | | 5/2005 | Hidaka et al. |
| 2005/0176902 A1 | | 8/2005 | Rink et al. |
| 2005/0197390 A1 | | 9/2005 | Byers et al. |
| 2005/0197391 A1 | | 9/2005 | Refvik et al. |
| 2006/0000252 A1 | * | 1/2006 | Carstens et al. ............. 71/64.02 |
| 2006/0009365 A1 | | 1/2006 | Erhan et al. |
| 2006/0036110 A1 | | 2/2006 | Brown et al. |
| 2006/0111520 A1 | | 5/2006 | Byers et al. |
| 2007/0055033 A1 | | 3/2007 | Byers et al. |
| 2007/0088146 A1 | | 4/2007 | Nakamura et al. |
| 2007/0112100 A1 | | 5/2007 | Byers et al. |
| 2008/0214774 A1 | | 9/2008 | Brown et al. |
| 2009/0124762 A1 | | 5/2009 | Brown et al. |
| 2009/0124784 A1 | | 5/2009 | Brown et al. |

FOREIGN PATENT DOCUMENTS

| | | |
|---|---|---|
| EP | 0 308 664 | 8/1988 |
| EP | 0 716 057 | 6/1996 |
| FR | 1 194 553 | 11/1959 |
| GB | 908986 | 10/1962 |
| GB | 1292214 | 10/1972 |
| GB | 1312821 | 4/1973 |
| GB | 1312822 | 4/1973 |
| GB | 1 484 062 | 8/1977 |
| GB | 2188327 | 9/1987 |
| JP | 60123506 | 7/1985 |
| JP | 1 090169 | 4/1989 |
| JP | 1090167 | 6/1989 |
| JP | 1090168 | 6/1989 |
| JP | 1090170 | 6/1989 |
| JP | 2003-252956 | 9/2003 |
| JP | 2003252956 A * | 9/2003 |
| WO | WO 86/06371 | 11/1986 |
| WO | WO 02/053672 | 7/2002 |
| WO | WO 03/006569 | 1/2003 |
| WO | WO 03/082958 | 10/2003 |
| WO | WO 2005/080325 | 1/2005 |
| WO | WO 2005/014564 | 2/2005 |
| WO | WO 2005/123862 | 12/2005 |
| WO | WO 2007/021960 | 2/2007 |
| WO | WO 2007/022217 | 2/2007 |
| WO | WO 2007/035215 | 3/2007 |
| WO | WO2008/106637 | 9/2008 |

OTHER PUBLICATIONS

Search Report from International Patent Application No. PCT/US2006/031393, dated Jan. 1, 2007.

Search Report from Internatinal Patent Application No. PCT/US2006/031901 dated Nov. 11, 2006.

International Application No. PCT/US2006/031419 Search Report, Mar. 8, 2007.

Search Report for International Patent Application No. PCT/US2005/005110 dated Jan. 24, 2006.

Elchueva, A.D., et al., "Influence of the Type of Oligoisocyanate on the Properties of Thiourethane Compounds," Russian J of Applied Chem, vol. 74 (2001) pp. 1040-1043.

Fitt, Peter S., et al., "Dithiols. Part XIX. Further Studies on the Deacetylation of Acetylated Dithiols," J of the Chem Society No. 5 (1957) pp. 2240-2249.

Derkach, N. Ya, et al., "Mercapto Derivatives of Alkylmalonic Esters," Chemical Abstracts, vol. 54, No. 22, (1960), Abstract No. 24386a.

Blackman L.C.F., et al. "Promoters for the Dropwise Condensation of Steam. Part II . . . ," J of the Chem Society, No. 1 (1957) pp. 165-169.

Mazaev, V.E., et al., "Preparation Reflux Mercaptoethanol Appropriate Acid," Derwent Publications, Week 197442, Abstract No. SU410010 (1974).

Demchuk, Dmitry V., et al. "Synthesis of 12- and 13-Membered Sulfur-Containing Lactones by Homolytic Macrocyclization . . . ," Synthesis, (1995) pp. 307-311.

Sudmeier, James L., et al. "Fast Kinetics by Stopped-Flow Chlorine-35 Nuclear Magnetic Resonance . . . " Inorganic Chem vol. 10 No. 4 (1971) pp. 860-863.

Tanaka, Kiyoshi, et al., "Oxidation of Thiol by 5-Arylidene, 1,3-Dimethylbarbituric Acid and Its Application . . . ," Tetrahedron Letters, vol. 28, No. 36 (1987) pp. 4173-4176.

Troyansky, Emmanuil I., et al. "Stereoselective Free Radical Cycloaddition-Macrocyclization in Facile Synthesis . . . ," Tetrahedron, vol. 51, No. 42 (1995) pp. 11431-11444.

Chavdarian, Charles G., et al. "Synthesis, Redox Characteristics, and in Vitro Norepinephrine Uptake . . . " J of Medicinal Chem, vol. 22, No. 11 (1979) pp. 1317-1322.

Sjoberg, Bertil, "Uber Thioglycerine und einige verwandte Schwefelverbindungen," Berichte der Deutschen Chemischen Gesellschaft, vol. 75, No. 1 (1942) pp. 13-29.

Mayadunne, Roshan T.A., et al. "Multiarm organic compounds for use as reversible chain-transfer agents . . . ," Tetrahedron Letters, vol. 43, No. 38 (2002) pp. 6811-6814.

Miyake, Y., et al., "Enantioselective conversion of meso-cyclic disulfides to chiral cyclic sulfides . . . " J of the Chem Society, Perkin Trans 1, No. 10 (2000) pp. 1595-1599.

Bhattacharya, S., et al., "Synthesis of Macrocyclic Diacy/Dialkyl Glycerols Containing Disulfide Tether and Studies . . . " J Org Chem vol. 63, No. 25 (1998) pp. 9232-9242.

Apitzsch, et al. "Uber Sulfide aus alfa,alfa1-Disulfhydryl-thio-gamma-pyron-beta,beta1- . . . ," Berichte der Deutschen Chemischen Gesellschaft, vol. 42 (1909) pp. 2940-2943.

Teplenicheva, Y.L., et al., "Ethyl 2-(alpha-hydroxyhexafluoroisopropyl)acrylate as a potential . . . " Russian Chemical Bulletin, vol. 46, No. 4 (1997) pp. 755-758.

Gala, D., et al., "A Practical Conversion of a Azetidinone to Penem: Synthesis of Sch 34343," Tetrahedron, vol. 48, No. 7, (1992) pp. 1175-1182.

Schonberg, A., et al., "Konstitution und Umsetzungen des Produktes aus Aceton-dicarbonsaure-diathylester . . . ," Chemische Berichte, vol. 99, No. 10 (1966) pp. 3327-3330.

Apitzsch, H., "Uber die Einwirkungvon Schwefelkohlenstoff und Atzkali auf Ketone," Berichte der Deutschen Chemischen Gesellschaft, vol. 41 (1908) pp. 4028-4039.

Fischer, G.C., et al., "Irreducible Analogues of Mevaldic Acid Coenzyme A Hemithioacetal as Potential Inhibitors, . . . " J Org Chem, vol. 50 No. 12 (1985) pp. 2011-2019.

Ferres, H., et al., "A diastereoselective sysnthesis of 4(RS), 6(SR)-mercaptomethylmevalonolactone, . . . " Tetrahedron Letters, vol. 24, No. 35 (1983) pp. 3769-3772.

Schwab, A.W., et al., "Hydrogen Sulfide Adducts of Methyl Oleate and Linoleate," J of the America Oil Chemists' Society, vol. 50 (1973) pp. 364-366.

Schwab, A.W., et al. "Free Radical Addition of Hydrogen Sulfide to Conjugated . . . ," J of the American Oil Chemists' Society, vol. 47 (1970) pp. 371-373.

Stokes et al., Fat Metabolism in higher plants, Archives of Biochemistry and Biophysics (1974), 162 (2), 638-48.

Olsen, Scand. Symp. Lipids, [Proc.], $11^{th}$ (1982), Meeting Date 1981, 173-8.

Peppard, Proceedings of the Congress—European Brewery Conventions (1979), $17^{th}$ 91-104.

Dyer, et al, The Kinetics of the Reactions of Phenyl Isocyanate with Thiols, J. Org. Chem., 26, Aug. 1961, 2919-2925.

Dyer, et al., The Kinetics of the Reactions of Phenyl Isocyanate with Certain Thiols, J. Am. Chem. Soc., 79, Aug. 13, 1957, 366-369.

Robins, Metal Ion Catalysis in Mercaptan Isocyanate Reactions, Adv. In Urethane Science and Tech., 12, 1993, 25-58.

Silva, et al, Recent Developments in Polyurethane Catalysis: Catalytic Mechanisms Review, Catalysis Reviews, 46, 2004, 31-52.

Office Action dated Jun. 18, 2008, 8 pages, U.S. Appl. No. 11/060,696, filed Feb. 17, 2005.

Office Action dated Jun. 27, 2008, 8 pages, U.S. Appl. No. 11/059,792, filed Feb. 17, 2005.

Office Action dated Mar. 19, 2009, 8 pages, U.S. Appl. No. 11/059,792, filed Feb. 17, 2005.

Office Action dated Sep. 24, 2008, 8 pages, U.S. Appl. No. 11/464,318, filed Aug. 14, 2008.

Office Action dated Jun. 24, 2008, 5 pages, U.S. Appl. No. 11/060,675, filed Feb. 17, 2005.

Office Action dated Dec. 21, 2007, 5 pages, U.S. Appl. No. 11/060,675, filed Feb. 17, 2005.

Office Action dated Jul. 16, 2007, 8 pages, U.S. Appl. No. 11/060,675, filed Feb. 17, 2005.

Office Action dated Dec. 19, 2006, 7 pages, U.S. Appl. No. 11/060,675, filed Feb. 17, 2005.

Office Action dated Jun. 23, 2008, 8 pages, U.S. Appl. No. 11/204,728, filed Aug. 16, 2005.

Blackman, et al. "Promoters for the Dropwise Condensation of Steam. Part I. Preparation of Compounds Containing Monofunctional Sulphur Groups," J chem. Soc, 1957, pp. 162-165.

Blackman, et al., "Promoters for the Dropwise Condensation of Steam. Part III. Preparation of Silicon and Phosphorus Compounds," J chem. Soc, 1957, pp. 169-171.

Blackman, et al. Promoters for the Dropwise Condensation of Steam. Part IV. Discussion of Dropwise Condensation and Testing of Compounds, J chem. Soc, 1957, pp. 171-176.

Dalton, Jr., et al., "Syntheses of some thiol esters for acylation of proteins," Australian Journal of Chemistry, 1981, vol. 34, pp. 759-764.

Database CAS citation 1947:9074 [retrieved Aug. 17, 2009] from STN; Columbus, OH, USA, 1 page.

Database CAS citation 1957:51648 [retrieved Aug. 17, 2009] from STN; Columbus, OH, USA, 1 page.

Hanefeld et al., "Bis-thiolurethane aus Isocyanaten and substituierten Alkan-sowie Benzoldithiolen," Archiv der Pharmazie, 1986, vol. 319, pp. 310-317.

*Polythiols based on Mercaptocarboxylic Acids - Types Properties and Applications. Bruno Bock Thio-Chemicals*, http://www.brunobock.org/modutes.php?name=Content&pa=showpage&pid=49, Apr. 18, 2006, 19 pages.

http://www.cognis.com/NR/rdonlyre/FDE0E9E1-DAE2-4950-B7FA-5EAF67B40C18/0Folder__26.pdf, Feb. 2007, Version 6, 8 pages.

Johnson, "A novel rearrangement of N-bromosuccinimide," Journal of the American Chemical Society, 1957, 79, 753-754.

Smith et al., "Urethans of 2-Mercaptoethanol," Journal of the American Chemical Society, 1959, vol. 81, No. 1, pp. 161-163.

Yamaguchi et al., "Synthesis of taxoids 4. Novel and versatile methods for preparation of new taxoids by employing cis- or trans-phenyl glycidic acid," Tetrahedron, 1999, vol. 55, pp. 1005-1016.

PCT International Search Report and Written Opinion for PCT/US2008/082843 mailed Mar. 13, 2009, 16 pages.

PCT International Search Report and Written Opinion for PCT/US2008/082841, mailed Feb. 18, 2009, 14 pages.

PCT International Search Report and Written Opinion for PCT/US2008/055455, mailed Jul. 29, 2008, 12 pages.

Final Office Action in U.S. Appl. No. 11/059,792 dated Jan. 7, 2010, 9 pages.

Final Office Action in U.S. Appl. No. 11/060,675 dated Jun. 9, 2009, 6 pages.

Final Office Action in U.S. Appl. No. 11/060,675 dated Mar. 3, 2009, 9 pages.

Non-final Office Action in U.S. Appl. No. 11/060,675 dated Aug. 21, 2009, 8 pages.

Final Office Action in U.S. Appl. No. 11/060,675 dated Apr. 9, 2010, 5 pages.

Final Office Action in U.S. Appl. No. 11/204,728 dated Jun. 4, 2009, 10 pages.

Non-Final Office Action in U.S. Appl. No. 11/204,728 dated Aug. 12, 2010, 7 pages.

Notice of Non-Compliant Amendment in U.S. Appl. No. 11/204,728 dated Feb. 19, 2009, 2 pages.

Final Office Action in U.S. Appl. No. 11/680,842 dated Sep. 22, 2010, 12 pages.

Non-final Office Action in U.S. Appl. No. 11/680,842 dated Mar. 5, 2010, 21 pages.

Final Office Action in U.S. Appl. No. 11/983,387 dated Mar. 1, 2010, 9 pages.

Non-final Office Action in U.S. Appl. No. 11/983,387 dated Aug. 20, 2009, 18 pages.

Non-final Office Action in U.S. Appl. No. 11/983,388 dated Oct. 26, 2010, 25 pages.

* cited by examiner

Table 2 – Preparation of Mercaptan-Hardened Epoxy Polymer Compositions – Control Sample Group

| Run Number | Curing Agent Identity | Curing Agent (g) | Epoxides Identity | Epoxide (g) | SH:Epoxide Molar Ratio | Catalyst Identity | Catalyst (g) | Gel Time (min) | Observations |
|---|---|---|---|---|---|---|---|---|---|
| 1 | None (Control) | - | Araldite® 506 | 1.72 | - | Versamine® H30 | 0.15 | 67 | very tacky solid |
| 2 | Capcure® 3-800 | 3.04 | Araldite® 506 | 1.74 | 0.940206 | Versamine® H30 | 0.20 | 15 | slight exotherm, not tacky |
| 3 | Capcure® 40 SEC HV | 2.50 | Araldite® 506 | 1.72 | 1.171875 | - | - | 2 | large exotherm, not tacky |
| 4 | Capcure® LOF | 3.11 | Araldite® 506 | 1.75 | 0.952041 | Versamine® H30 | 0.20 | 11 | slight exotherm, slightly tacky |
| 5 | Capcure® WR-6 | 1.95 | Araldite® 506 | 1.74 | 1.005155 | - | - | 15 | large exotherm, slightly tacky |
| 6 | None (Control) | - | Araldite® 506 | 1.72 | - | DBU | 0.15 | >12 hrs | mushy solid @ >12 hrs |
| 7 | Capcure® 3-800 | 3.23 | Araldite® 506 | 1.72 | 1.009375 | DBU | 0.16 | ~1 | large exotherm, tacky/rubbery |
| 8 | Capcure® 40 SEC HV | 2.20 | Araldite® 506 | 1.71 | 1.03125 | - | - | ~2 | large exotherm, tacky/rubbery |
| 9 | Capcure® LOF | 3.25 | Araldite® 506 | 1.71 | 1.015625 | DBU | 0.19 | 4 | slight exotherm, tacky/rubbery |
| 10 | Capcure® WR-6 | 1.90 | Araldite® 506 | 1.69 | 1 | - | - | 11 | large exotherm, tacky/rubbery |

FIG. 1

Table 3 – Preparation of Mercaptan-Hardened Epoxy Compositions

| Run Number | Curing Agent Identity | Curing Agent (g) | Epoxide Identity | Epoxide (g) | SH:Epoxide Molar Ratio | Catalyst Identity | Catalyst (g) | Gel Time (min) | Observations |
|---|---|---|---|---|---|---|---|---|---|
| 11 | MHSO | 3.83 | Araldite® 506 | 1.76 | 1.0059 | - | - | >2 hrs | long cure time, not tacky |
| 12 | MHSO | 3.85 | Araldite® 506 | 1.90 | 0.9443 | Versamine® H30 | 0.19 | 7 | large exotherm, not tacky |
| 13 | MHSO | 5.60 | Araldite® 506 | 1.81 | 0.9426 | - | - | >2 hrs | long cure time, slightly tacky |
| 14 | MHSO | 5.80 | Araldite® 506 | 1.76 | 0.9960 | Versamine® H30 | 0.23 | 10 | slight exotherm, not tacky |
| 15 | MSO | 2.96 | Araldite® 506 | 1.72 | 1.0175 | Versamine® H30 | 0.20 | >12 hrs | mushy solid @ >12 hrs |
| 16 | MSO | 4.13 | Araldite® 506 | 1.71 | 0.9895 | Versamine® H30 | 0.19 | >12 hrs | mushy solid @ >12 hrs |
| 17 | MSO | 5.60 | Araldite® 506 | 1.71 | 0.9917 | Versamine® H30 | 0.24 | >12 hrs | mushy solid @ >12 hrs |
| 18 | MHSO | - | Araldite® 506 | - | -1 | - | - | - | - |
| 19 | MHSO | 3.80 | Araldite® 506 | 1.72 | 1.0292 | DBU | 0.17 | 10 | slight exotherm, tacky/rubbery |
| 20 | MHSO | - | Araldite® 506 | - | - | - | - | - | - |
| 21 | MHSO | 5.60 | Araldite® 506 | 1.69 | 1.0021 | DBU | 0.23 | 1 | large exotherm, hard/tough |
| 22 | MSO | 2.94 | Araldite® 506 | 1.71 | 1.0106 | DBU | 0.14 | 25 | slight exotherm, mushy solid |
| 23 | MSO | 4.10 | Araldite® 506 | 1.71 | 0.9823 | DBU | 0.19 | >12 hrs | very tacky solid @ >12 hrs |
| 24 | MSO | 5.64 | Araldite® 506 | 1.74 | 0.9885 | DBU | 0.24 | >12 hrs | mushy solid @ >12 hrs |
| 25 | CMSO | 4.95 | Araldite® 506 | 1.73 | 1.0206 | DBU | 0.21 | 13 | slight exotherm, tacky solid |
| 26 | CMSO | 13.9 | Araldite® 506 | 1.72 | 1.0135 | DBU | 0.48 | 1 | slight exotherm, tough/rubbery |
| 27 | MHSO | 2.02 | Araldite® 506 | 3.41 | 0.9836 | DBU | 0.18 | >12 hrs | tacky/rubbery |
| 28 | MSO | 6.33 | Araldite® 506 | 1.74 | 0.9919 | DBU | 0.25 | DS | still liquid @ >12 hrs |

FIG. 2

Table 4 – Preparation and Testing, using PATTI Tests (According to ASTM D4541-02), for Quick Set Epoxy Compositions – Control Sample Group

| Sample ID. | Crosslinking Agent | Epoxide | Catalyst | Crosslinking Agent Amount (g) | Epoxide Amount (g) | XH:Epoxide Molar Ratio | Catalyst Amount (g) | Plate Material | Piston # | Adjusted Separation Pressure (psig) | Failure Type |
|---|---|---|---|---|---|---|---|---|---|---|---|
| CPC789-1A | Capcure® 3-800 | Araldite® 506 | Versamine® EH-30 | 2.25 | 3.29 | 0.95 | 0.30 | Carbon Steel | F-4 | 862.4 | C |
| CPC789-2A | Capcure® 3-800 | Araldite® 506 | Versamine® EH-30 | 2.25 | 3.29 | 0.95 | 0.31 | Aluminum | F-4 | 706.0 | A, C |
| CPC789-3A | Capcure® 3-800 | Araldite® GY 6010 | Versamine® EH-30 | 2.50 | 3.85 | 0.95 | 0.16 | Carbon Steel | F-4/F-8 | 1712.0 | C |
| CPC789-4A | Capcure® 3-800 | Araldite® GY 6010 | Versamine® EH-30 | 2.50 | 3.85 | 0.95 | 0.15 | Aluminum | F-4/F-8 | 1120.2 | C, A |
| CPC789-5A1 | Loctite® Quickset | N/A | N/A | N/A | N/A | | N/A | Carbon Steel | F-4/F-8 | 658.0 | C |
| CPC789-5A2 | Loctite® Quickset | N/A | N/A | N/A | N/A | | N/A | Aluminum | F-4 | 549.5 | A |
| CPC789-6A1 | Loctite® Plastic | N/A | N/A | N/A | N/A | | N/A | Carbon Steel | F-8 | 1493.7 | C |
| CPC789-6A2 | Loctite® Plastic | N/A | N/A | N/A | N/A | | N/A | Aluminum | F-4/F-8 | 936.3 | C, A |

FIG. 3

Table 5 – Preparation and Testing, using PATTI Tests (According to ASTM D4541-02), for Quick Set Epoxy Compositions

| Sample ID. | Crosslinking Agent | Epoxide | Catalyst | Crosslinking Agent Amount (g) | Epoxide Amount (g) | XH:Epoxide Molar Ratio | Catalyst Amount (g) | Plate Material | Piston # | Adjusted Separation Pressure (psig) | Failure Type |
|---|---|---|---|---|---|---|---|---|---|---|---|
| CPC789-1B | MHSO | Araldite® 506 | Versamine® EH-30 | 2.71 | 2.84 | 0.91 | 0.30 | Carbon Steel | F-8 | 500.7 | C |
| CPC789-2B | MHSO | Araldite® 506 | Versamine® EH-30 | 2.71 | 2.83 | 0.92 | 0.30 | Aluminum | F-4 | 932.7 | C |
| CPC789-3B | MHSO | Araldite® GY 6010 | Versamine® EH-30 | 2.50 | 2.75 | 0.92 | 0.26 | Carbon Steel | F-4 | 400.0 | C |
| CPC789-4B | MHSO | Araldite® GY 6010 | Versamine® EH-30 | 2.51 | 2.77 | 0.91 | 0.27 | Aluminum | F-4/F-8 | 457.7 | C |

FIG. 4

Polymer Film Quality using EH 30 catalyst (1 wt. %) & Heat Cure with Varying Solvent and Epoxy Resin Polymer Film Quality using 1.0 wt. % catalyst & Heat Cure in Butyl Acetate with Varying Catalyst and Epoxy Resin Film Adhesion using EH 30 catalyst (1 wt. %) & Heat Cure with Varying Solvent and Epoxy Resin Film Adhesion using EH30 Catalyst (1 wt. %) & Xylene Solvent with Varying Epoxy Resin and Cure Profile

TABLE 7

| Run | MSO (g) | MSO wt. % | Solvent | Solvent wt. % | Solvent wt. (g) | Epoxy Resin | Resin wt. (g) | Epoxide/SH mol ratio | Cat. | Cat. wt. (g) | Cat. Level (wt. %) | Cure Profile | Film | Adhesion |
|---|---|---|---|---|---|---|---|---|---|---|---|---|---|---|
| 1 | 4.014 | 66.0% | No Solvent | 0.0% | 0.0 | D.E.R.™ 330 | 2.006 | 1.04 | EH30 | 0.060 | 1.0% | Heat | 4 | 4 |
| 2 | 3.999 | 66.1% | No Solvent | 0.0% | 0.0 | D.E.R.™ 330 | 1.994 | 1.04 | EH30 | 0.061 | 1.0% | Ambient | 2 | 1 |
| 3 | 3.924 | 65.4% | No Solvent | 0.0% | 0.0 | D.E.R.™ 330 | 1.942 | 1.03 | EH30 | 0.134 | 2.2% | Heat | 4 | 4 |
| 4 | 3.897 | 65.9% | No Solvent | 0.0% | 0.0 | D.E.R.™ 330 | 1.896 | 1.01 | EH30 | 0.121 | 2.0% | Ambient | 2 | 1 |
| 5 | 3.997 | 65.0% | No Solvent | 0.0% | 0.0 | D.E.R.™ 330 | 2.080 | 1.08 | PMDT | 0.069 | 1.1% | Heat | 2 | 3 |
| 6 | 3.997 | 66.0% | No Solvent | 0.0% | 0.0 | D.E.R.™ 330 | 1.997 | 1.04 | PMDT | 0.062 | 1.0% | Ambient | 4 | 3 |
| 7 | 3.902 | 65.9% | No Solvent | 0.0% | 0.0 | D.E.R.™ 330 | 1.889 | 1.01 | PMDT | 0.129 | 2.2% | Heat | 2 | 3 |
| 8 | 3.901 | 66.0% | No Solvent | 0.0% | 0.0 | D.E.R.™ 330 | 1.894 | 1.01 | PMDT | 0.117 | 2.0% | Ambient | 4 | 3 |
| 9 | 4.002 | 64.3% | No Solvent | 0.0% | 0.0 | D.E.R.™ 330 | 2.070 | 1.08 | Res | 0.154 | 2.5% | Heat | 1 | 1 |
| 10 | 4.000 | 64.8% | No Solvent | 0.0% | 0.0 | D.E.R.™ 330 | 2.037 | 1.06 | Res | 0.132 | 2.1% | Ambient | 1 | 1 |
| 11 | 3.892 | 64.4% | No Solvent | 0.0% | 0.0 | D.E.R.™ 330 | 1.891 | 1.01 | Res | 0.260 | 4.3% | Heat | 4 | 3 |
| 12 | 3.908 | 64.3% | No Solvent | 0.0% | 0.0 | D.E.R.™ 330 | 1.915 | 1.02 | Res | 0.253 | 4.2% | Ambient | 1 | 1 |
| 13 | 3.214 | 52.4% | n-Butanol | 19.8% | 1.216 | D.E.R.™ 330 | 1.647 | 1.07 | EH30 | 0.060 | 1.0% | Heat | 5 | 4 |
| 14 | 3.200 | 52.6% | n-Butanol | 19.6% | 1.192 | D.E.R.™ 330 | 1.617 | 1.05 | EH30 | 0.070 | 1.2% | Ambient | 3 | 2 |
| 15 | 3.210 | 52.6% | n-Butanol | 20.0% | 1.221 | D.E.R.™ 330 | 1.553 | 1.01 | EH30 | 0.120 | 2.0% | Heat | 5 | 4 |
| 16 | 3.209 | 52.8% | n-Butanol | 20.0% | 1.217 | D.E.R.™ 330 | 1.522 | 0.99 | EH30 | 0.126 | 2.1% | Ambient | 3 | 2 |
| 17 | 3.186 | 52.3% | n-Butanol | 19.7% | 1.202 | D.E.R.™ 330 | 1.640 | 1.07 | PMDT | 0.064 | 1.1% | Heat | 3 | 4 |
| 18 | 3.192 | 51.9% | n-Butanol | 19.8% | 1.219 | D.E.R.™ 330 | 1.671 | 1.09 | PMDT | 0.072 | 1.2% | Ambient | 3 | 3 |
| 19 | 3.216 | 53.0% | n-Butanol | 20.3% | 1.231 | D.E.R.™ 330 | 1.493 | 0.97 | PMDT | 0.129 | 2.1% | Heat | 4 | 4 |
| 20 | 3.224 | 53.0% | n-Butanol | 19.9% | 1.209 | D.E.R.™ 330 | 1.511 | 0.98 | PMDT | 0.141 | 2.3% | Ambient | 4 | 3 |
| 21 | 3.236 | 51.8% | n-Butanol | 20.2% | 1.258 | D.E.R.™ 330 | 1.610 | 1.04 | Res | 0.138 | 2.2% | Heat | 1 | 1 |
| 22 | 3.209 | 51.8% | n-Butanol | 19.5% | 1.208 | D.E.R.™ 330 | 1.645 | 1.07 | Res | 0.138 | 2.2% | Ambient | 1 | 1 |
| 23 | 3.217 | 51.9% | n-Butanol | 19.4% | 1.201 | D.E.R.™ 330 | 1.526 | 0.99 | Res | 0.251 | 4.1% | Heat | 3 | 3 |
| 24 | 3.209 | 51.9% | n-Butanol | 19.6% | 1.211 | D.E.R.™ 330 | 1.517 | 0.98 | Res | 0.244 | 3.9% | Ambient | 1 | 1 |
| 25 | 3.199 | 52.4% | Butyl Acetate | 19.9% | 1.213 | D.E.R.™ 330 | 1.613 | 1.05 | EH30 | 0.082 | 1.3% | Heat | 4 | 4 |

FIG. 11A

TABLE 7

| Run | MSO (g) | MSO wt. % | Solvent | Solvent wt. % | Solvent wt. (g) | Epoxy Resin | Resin wt. (g) | Epoxide/SH mol ratio | Cat. | Cat. wt. (g) | Cat. Level (wt. %) | Cure Profile | Film Adhesion |
|---|---|---|---|---|---|---|---|---|---|---|---|---|---|
| 26 | 3.203 | 52.6% | Butyl Acetate | 19.9% | 1.211 | D.E.R.™ 330 | 1.619 | 1.05 | EH30 | 0.059 | 1.0% | Ambient | 3 |
| 27 | 3.214 | 52.5% | Butyl Acetate | 19.8% | 1.210 | D.E.R.™ 330 | 1.522 | 0.99 | EH30 | 0.174 | 2.8% | Heat | 4 |
| 28 | 3.211 | 53.0% | Butyl Acetate | 20.0% | 1.211 | D.E.R.™ 330 | 1.500 | 0.97 | EH30 | 0.131 | 2.2% | Ambient | 3 |
| 29 | 3.202 | 52.4% | Butyl Acetate | 19.7% | 1.203 | D.E.R.™ 330 | 1.638 | 1.07 | PMDT | 0.067 | 1.1% | Heat | 4 |
| 30 | 3.191 | 52.6% | Butyl Acetate | 19.8% | 1.202 | D.E.R.™ 330 | 1.602 | 1.05 | PMDT | 0.073 | 1.2% | Ambient | 3 |
| 31 | 3.207 | 52.9% | Butyl Acetate | 20.1% | 1.221 | D.E.R.™ 330 | 1.508 | 0.98 | PMDT | 0.125 | 2.1% | Heat | 4 |
| 32 | 3.217 | 52.3% | Butyl Acetate | 19.9% | 1.222 | D.E.R.™ 330 | 1.570 | 1.02 | PMDT | 0.145 | 2.4% | Ambient | 3 |
| 33 | 3.223 | 52.4% | Butyl Acetate | 19.4% | 1.194 | D.E.R.™ 330 | 1.605 | 1.04 | Res | 0.128 | 2.1% | Heat | 1 |
| 34 | 3.217 | 51.6% | Butyl Acetate | 19.4% | 1.208 | D.E.R.™ 330 | 1.670 | 1.08 | Res | 0.134 | 2.2% | Ambient | 1 |
| 35 | 3.189 | 51.3% | Butyl Acetate | 19.8% | 1.228 | D.E.R.™ 330 | 1.549 | 1.01 | Res | 0.250 | 4.0% | Heat | 3 |
| 36 | 3.239 | 52.4% | Butyl Acetate | 19.2% | 1.188 | D.E.R.™ 330 | 1.507 | 0.97 | Res | 0.246 | 4.0% | Ambient | 1 |
| 37 | 2.402 | 38.7% | Xylene | 40.8% | 2.530 | D.E.R.™ 330 | 1.206 | 1.05 | EH30 | 0.067 | 1.1% | Heat | 3 |
| 38 | 2.424 | 39.2% | Xylene | 39.1% | 2.415 | D.E.R.™ 330 | 1.278 | 1.10 | EH30 | 0.059 | 1.0% | Ambient | 3 |
| 39 | 2.416 | 38.6% | Xylene | 39.2% | 2.456 | D.E.R.™ 330 | 1.257 | 1.08 | EH30 | 0.138 | 2.2% | Heat | 3 |
| 40 | 2.392 | 38.9% | Xylene | 38.8% | 2.389 | D.E.R.™ 330 | 1.254 | 1.09 | EH30 | 0.118 | 1.9% | Ambient | 2 |
| 41 | 2.423 | 39.5% | Xylene | 39.3% | 2.416 | D.E.R.™ 330 | 1.238 | 1.06 | PMDT | 0.064 | 1.0% | Heat | 3 |
| 42 | 2.427 | 39.5% | Xylene | 39.8% | 2.448 | D.E.R.™ 330 | 1.214 | 1.04 | PMDT | 0.057 | 0.9% | Ambient | 2 |
| 43 | 2.397 | 38.4% | Xylene | 39.5% | 2.468 | D.E.R.™ 330 | 1.261 | 1.10 | PMDT | 0.122 | 2.0% | Heat | 4 |
| 44 | 2.402 | 38.5% | Xylene | 38.9% | 2.426 | D.E.R.™ 330 | 1.287 | 1.12 | PMDT | 0.126 | 2.0% | Ambient | 2 |
| 45 | 2.400 | 39.1% | Xylene | 39.1% | 2.400 | D.E.R.™ 330 | 1.195 | 1.04 | Res | 0.140 | 2.3% | Heat | 1 |
| 46 | 2.409 | 38.6% | Xylene | 38.8% | 2.422 | D.E.R.™ 330 | 1.265 | 1.09 | Res | 0.147 | 2.4% | Ambient | 1 |
| 47 | 2.418 | 38.3% | Xylene | 37.9% | 2.390 | D.E.R.™ 330 | 1.256 | 1.08 | Res | 0.242 | 3.8% | Heat | 4 |
| 48 | 2.416 | 38.4% | Xylene | 38.7% | 2.434 | D.E.R.™ 330 | 1.195 | 1.03 | Res | 0.248 | 3.9% | Ambient | 1 |
| 49 | 3.904 | 65.0% | No Solvent | 0.0% | 0.000 | D.E.R.™ 331 | 2.048 | 1.09 | EH30 | 0.054 | 0.9% | Heat | 3 |
| 50 | 3.882 | 64.1% | No Solvent | 0.0% | 0.000 | D.E.R.™ 331 | 2.082 | 1.12 | EH30 | 0.092 | 1.5% | Ambient | 3 |
| 51 | 3.894 | 64.4% | No Solvent | 0.0% | 0.000 | D.E.R.™ 331 | 2.018 | 1.08 | EH30 | 0.130 | 2.2% | Heat | 1 |
| 52 | 3.910 | 64.2% | No Solvent | 0.0% | 0.000 | D.E.R.™ 331 | 2.017 | 1.07 | EH30 | 0.165 | 2.7% | Ambient | 3 |

FIG. 11B

TABLE 7

| Run | MSO (g) | MSO wt. % | Solvent | Solvent wt. % | Solvent wt. (g) | Epoxy Resin | Resin wt. (g) | Epoxide/SH mol ratio | Cat. | Cat. wt. (g) | Cat. Level (wt. %) | Cure Profile | Film Adhesion |
|---|---|---|---|---|---|---|---|---|---|---|---|---|---|
| 53 | 3.901 | 64.8% | No Solvent | 0.0% | 0.000 | D.E.R.™ 331 | 2.056 | 1.10 | PMDT | 0.067 | 1.1% | Heat | 3 |
| 54 | 3.912 | 65.5% | No Solvent | 0.0% | 0.000 | D.E.R.™ 331 | 2.001 | 1.07 | PMDT | 0.057 | 1.0% | Ambient | 2 |
| 55 | 3.897 | 63.7% | No Solvent | 0.0% | 0.000 | D.E.R.™ 331 | 2.089 | 1.12 | PMDT | 0.128 | 2.1% | Heat | 3 |
| 56 | 3.930 | 64.8% | No Solvent | 0.0% | 0.000 | D.E.R.™ 331 | 2.017 | 1.07 | PMDT | 0.117 | 1.9% | Ambient | 3 |
| 57 | 3.908 | 64.1% | No Solvent | 0.0% | 0.000 | D.E.R.™ 331 | 2.029 | 1.08 | Res | 0.157 | 2.6% | Heat | 1 |
| 58 | 3.888 | 63.8% | No Solvent | 0.0% | 0.000 | D.E.R.™ 331 | 2.008 | 1.08 | Res | 0.194 | 3.2% | Ambient | 1 |
| 59 | 3.896 | 63.5% | No Solvent | 0.0% | 0.000 | D.E.R.™ 331 | 1.993 | 1.07 | Res | 0.243 | 4.0% | Heat | 2 |
| 60 | 3.926 | 62.4% | No Solvent | 0.0% | 0.000 | D.E.R.™ 331 | 2.064 | 1.09 | Res | 0.298 | 4.7% | Ambient | 1 |
| 61 | 3.097 | 51.8% | n-Butanol | 20.3% | 1.210 | D.E.R.™ 331 | 1.608 | 1.08 | EH30 | 0.060 | 1.0% | Heat | 3 |
| 62 | 3.126 | 51.9% | n-Butanol | 20.0% | 1.207 | D.E.R.™ 331 | 1.630 | 1.09 | EH30 | 0.065 | 1.1% | Ambient | 3 |
| 63 | 3.108 | 51.0% | n-Butanol | 19.5% | 1.191 | D.E.R.™ 331 | 1.653 | 1.11 | EH30 | 0.148 | 2.4% | Heat | 3 |
| 64 | 3.129 | 51.1% | n-Butanol | 19.9% | 1.221 | D.E.R.™ 331 | 1.655 | 1.10 | EH30 | 0.122 | 2.0% | Ambient | 3 |
| 65 | 3.117 | 51.4% | n-Butanol | 20.2% | 1.227 | D.E.R.™ 331 | 1.629 | 1.09 | PMDT | 0.090 | 1.5% | Heat | 4 |
| 66 | 3.125 | 52.0% | n-Butanol | 20.0% | 1.199 | D.E.R.™ 331 | 1.605 | 1.07 | PMDT | 0.075 | 1.2% | Ambient | 3 |
| 67 | 3.116 | 50.8% | n-Butanol | 20.0% | 1.229 | D.E.R.™ 331 | 1.628 | 1.09 | PMDT | 0.157 | 2.6% | Heat | 3 |
| 68 | 3.103 | 50.3% | n-Butanol | 20.7% | 1.275 | D.E.R.™ 331 | 1.627 | 1.09 | PMDT | 0.162 | 2.6% | Ambient | 4 |
| 69 | 3.117 | 51.3% | n-Butanol | 19.9% | 1.208 | D.E.R.™ 331 | 1.631 | 1.09 | Res | 0.122 | 2.0% | Heat | 1 |
| 70 | 3.120 | 51.0% | n-Butanol | 19.5% | 1.195 | D.E.R.™ 331 | 1.673 | 1.12 | Res | 0.129 | 2.1% | Ambient | 1 |
| 71 | 3.102 | 49.5% | n-Butanol | 19.2% | 1.202 | D.E.R.™ 331 | 1.710 | 1.15 | Res | 0.253 | 4.0% | Heat | 2 |
| 72 | 3.105 | 49.7% | n-Butanol | 19.5% | 1.222 | D.E.R.™ 331 | 1.680 | 1.13 | Res | 0.244 | 3.9% | Ambient | 1 |
| 73 | 3.098 | 51.4% | Butyl Acetate | 19.9% | 1.203 | D.E.R.™ 331 | 1.655 | 1.11 | EH30 | 0.076 | 1.3% | Heat | 4 |
| 74 | 3.112 | 51.6% | Butyl Acetate | 19.8% | 1.195 | D.E.R.™ 331 | 1.670 | 1.12 | EH30 | 0.059 | 1.0% | Ambient | 2 |
| 75 | 3.100 | 51.3% | Butyl Acetate | 19.9% | 1.204 | D.E.R.™ 331 | 1.615 | 1.09 | EH30 | 0.120 | 2.0% | Heat | 4 |
| 76 | 3.114 | 51.5% | Butyl Acetate | 19.8% | 1.197 | D.E.R.™ 331 | 1.622 | 1.08 | EH30 | 0.119 | 2.0% | Ambient | 2 |
| 77 | 3.116 | 52.0% | Butyl Acetate | 19.9% | 1.196 | D.E.R.™ 331 | 1.616 | 1.08 | PMDT | 0.067 | 1.1% | Heat | 4 |
| 78 | 3.095 | 51.7% | Butyl Acetate | 20.1% | 1.202 | D.E.R.™ 331 | 1.631 | 1.10 | PMDT | 0.060 | 1.0% | Ambient | 2 |
| 79 | 3.091 | 51.0% | Butyl Acetate | 19.9% | 1.203 | D.E.R.™ 331 | 1.629 | 1.10 | PMDT | 0.137 | 2.3% | Heat | 4 |

FIG. 11C

TABLE 7

| Run | MSO (g) | MSO wt. % | Solvent | Solvent wt. % | Solvent wt. (g) | Epoxy Resin | Resin wt. (g) | Epoxide/SH mol ratio | Cat. | Cat. wt. (g) | Cat. Level (wt. %) | Cure Profile | Film Adhesion |
|---|---|---|---|---|---|---|---|---|---|---|---|---|---|
| 80 | 3.134 | 51.0% | Butyl Acetate | 19.7% | 1.214 | D.E.R.™ 331 | 1.671 | 1.11 | PMDT | 0.132 | 2.1% | Ambient | 4 | 2 |
| 81 | 3.103 | 50.8% | Butyl Acetate | 19.6% | 1.197 | D.E.R.™ 331 | 1.683 | 1.13 | Res | 0.122 | 2.0% | Heat | 1 | 1 |
| 82 | 3.095 | 51.2% | Butyl Acetate | 19.7% | 1.191 | D.E.R.™ 331 | 1.626 | 1.09 | Res | 0.132 | 2.2% | Ambient | 1 | 1 |
| 83 | 3.101 | 50.0% | Butyl Acetate | 19.5% | 1.213 | D.E.R.™ 331 | 1.643 | 1.10 | Res | 0.248 | 4.0% | Heat | 4 | 3 |
| 84 | 3.109 | 49.9% | Butyl Acetate | 19.2% | 1.198 | D.E.R.™ 331 | 1.681 | 1.13 | Res | 0.242 | 3.9% | Ambient | 1 | 1 |
| 85 | 2.408 | 39.5% | Xylene | 39.4% | 2.400 | D.E.R.™ 331 | 1.238 | 1.07 | EH30 | 0.053 | 0.9% | Heat | 4 | 4 |
| 86 | 2.432 | 39.7% | Xylene | 39.6% | 2.425 | D.E.R.™ 331 | 1.210 | 1.04 | EH30 | 0.058 | 0.9% | Ambient | 2 | 1 |
| 87 | 2.307 | 37.7% | Xylene | 39.1% | 2.390 | D.E.R.™ 331 | 1.300 | 1.17 | EH30 | 0.116 | 1.9% | Heat | 3 | 4 |
| 88 | 2.473 | 39.6% | Xylene | 38.4% | 2.401 | D.E.R.™ 331 | 1.252 | 1.05 | EH30 | 0.122 | 2.0% | Ambient | 3 | 3 |
| 89 | 2.415 | 39.3% | Xylene | 39.4% | 2.418 | D.E.R.™ 331 | 1.233 | 1.06 | PMDT | 0.075 | 1.2% | Heat | 3 | 3 |
| 90 | 2.393 | 39.5% | Xylene | 39.8% | 2.407 | D.E.R.™ 331 | 1.189 | 1.03 | PMDT | 0.062 | 1.0% | Ambient | 3 | 3 |
| 91 | 2.323 | 37.9% | Xylene | 40.0% | 2.453 | D.E.R.™ 331 | 1.217 | 1.09 | PMDT | 0.138 | 2.3% | Heat | 3 | 3 |
| 92 | 2.316 | 37.9% | Xylene | 39.4% | 2.406 | D.E.R.™ 331 | 1.222 | 1.10 | PMDT | 0.170 | 2.8% | Ambient | 3 | 2 |
| 93 | 2.402 | 38.6% | Xylene | 38.4% | 2.393 | D.E.R.™ 331 | 1.308 | 1.13 | Res | 0.122 | 2.0% | Heat | 1 | 1 |
| 94 | 2.414 | 38.9% | Xylene | 39.2% | 2.430 | D.E.R.™ 331 | 1.218 | 1.05 | Res | 0.138 | 2.2% | Ambient | 1 | 1 |
| 95 | 2.308 | 37.1% | Xylene | 38.6% | 2.397 | D.E.R.™ 331 | 1.255 | 1.13 | Res | 0.256 | 4.1% | Heat | 4 | 3 |
| 96 | 2.304 | 37.0% | Xylene | 39.6% | 2.462 | D.E.R.™ 331 | 1.191 | 1.08 | Res | 0.264 | 4.2% | Ambient | 1 | 1 |
| 97 | 4.091 | 67.4% | No Solvent | 0.0% | 0.000 | D.E.R.™ 354 | 1.910 | 0.97 | EH30 | 0.068 | 1.1% | Heat | 3 | 2 |
| 98 | 4.111 | 67.6% | No Solvent | 0.0% | 0.000 | D.E.R.™ 354 | 1.885 | 0.95 | EH30 | 0.082 | 1.3% | Ambient | 2 | 2 |
| 99 | 4.010 | 65.9% | No Solvent | 0.0% | 0.000 | D.E.R.™ 354 | 1.946 | 1.01 | EH30 | 0.131 | 2.2% | Heat | 2 | 2 |
| 100 | 4.036 | 66.2% | No Solvent | 0.0% | 0.000 | D.E.R.™ 354 | 1.940 | 1.00 | EH30 | 0.121 | 2.0% | Ambient | 2 | 2 |
| 101 | 4.096 | 66.7% | No Solvent | 0.0% | 0.000 | D.E.R.™ 354 | 1.980 | 1.01 | PMDT | 0.069 | 1.1% | Heat | 2 | 3 |
| 102 | 4.099 | 67.4% | No Solvent | 0.0% | 0.000 | D.E.R.™ 354 | 1.915 | 0.97 | PMDT | 0.071 | 1.2% | Ambient | 3 | 3 |
| 103 | 4.014 | 66.2% | No Solvent | 0.0% | 0.000 | D.E.R.™ 354 | 1.902 | 0.99 | PMDT | 0.151 | 2.5% | Heat | 2 | 3 |
| 104 | 4.009 | 66.1% | No Solvent | 0.0% | 0.000 | D.E.R.™ 354 | 1.936 | 1.01 | PMDT | 0.120 | 2.0% | Ambient | 3 | 3 |
| 105 | 4.091 | 65.3% | No Solvent | 0.0% | 0.000 | D.E.R.™ 354 | 2.036 | 1.04 | Res | 0.137 | 2.2% | Heat | 1 | 1 |
| 106 | 4.091 | 66.7% | No Solvent | 0.0% | 0.000 | D.E.R.™ 354 | 1.905 | 0.97 | Res | 0.141 | 2.3% | Ambient | 1 | 1 |

FIG. 11D

TABLE 7

| Run | MSO (g) | MSO wt. % | Solvent | Solvent wt. % | Solvent wt. (g) | Epoxy Resin | Resin wt. (g) | Epoxide/SH mol ratio | Cat. | Cat. wt. (g) | Cat. Level (wt. %) | Cure Profile | Film Adhesion |
|-----|---------|-----------|---------|---------------|-----------------|-------------|---------------|----------------------|------|--------------|--------------------|--------------|---------------|
| 107 | 3.986 | 64.8% | No Solvent | 0.0% | 0.000 | D.E.R.™ 354 | 1.922 | 1.00 | Res | 0.239 | 3.9% | Heat | 1 | 1 |
| 108 | 4.016 | 65.1% | No Solvent | 0.0% | 0.000 | D.E.R.™ 354 | 1.898 | 0.98 | Res | 0.259 | 4.2% | Ambient | 1 | 1 |
| 109 | 3.311 | 54.1% | n-Butanol | 19.6% | 1.199 | D.E.R.™ 354 | 1.533 | 0.96 | EH30 | 0.074 | 1.2% | Heat | 3 | 3 |
| 110 | 3.330 | 54.2% | n-Butanol | 19.9% | 1.221 | D.E.R.™ 354 | 1.511 | 0.95 | EH30 | 0.081 | 1.3% | Ambient | 2 | 2 |
| 111 | 3.203 | 51.5% | n-Butanol | 21.1% | 1.314 | D.E.R.™ 354 | 1.542 | 1.00 | EH30 | 0.155 | 2.5% | Heat | 4 | 4 |
| 112 | 3.200 | 52.8% | n-Butanol | 19.8% | 1.203 | D.E.R.™ 354 | 1.542 | 1.00 | EH30 | 0.118 | 1.9% | Ambient | 2 | 2 |
| 113 | 3.304 | 54.3% | n-Butanol | 19.9% | 1.209 | D.E.R.™ 354 | 1.500 | 0.95 | PMDT | 0.073 | 1.2% | Heat | 4 | 4 |
| 114 | 3.320 | 54.2% | n-Butanol | 19.6% | 1.201 | D.E.R.™ 354 | 1.542 | 0.97 | PMDT | 0.061 | 1.0% | Ambient | 3 | 3 |
| 115 | 3.190 | 52.7% | n-Butanol | 19.8% | 1.200 | D.E.R.™ 354 | 1.552 | 1.01 | PMDT | 0.116 | 1.9% | Heat | 3 | 4 |
| 116 | 3.198 | 52.9% | n-Butanol | 19.8% | 1.196 | D.E.R.™ 354 | 1.515 | 0.99 | PMDT | 0.137 | 2.3% | Ambient | 3 | 3 |
| 117 | 3.309 | 54.0% | n-Butanol | 19.6% | 1.204 | D.E.R.™ 354 | 1.495 | 0.94 | Res | 0.120 | 2.0% | Heat | 1 | 1 |
| 118 | 3.331 | 53.8% | n-Butanol | 19.5% | 1.208 | D.E.R.™ 354 | 1.503 | 0.94 | Res | 0.148 | 2.4% | Ambient | 1 | 1 |
| 119 | 3.218 | 51.8% | n-Butanol | 19.5% | 1.214 | D.E.R.™ 354 | 1.507 | 0.98 | Res | 0.278 | 4.5% | Heat | 3 | 3 |
| 120 | 3.227 | 51.6% | n-Butanol | 19.7% | 1.231 | D.E.R.™ 354 | 1.541 | 0.99 | Res | 0.253 | 4.0% | Ambient | 1 | 1 |
| 121 | 3.302 | 54.7% | Butyl Acetate | 19.7% | 1.192 | D.E.R.™ 354 | 1.492 | 0.94 | EH30 | 0.054 | 0.9% | Heat | 2 | 3 |
| 122 | 3.326 | 54.3% | Butyl Acetate | 19.5% | 1.194 | D.E.R.™ 354 | 1.528 | 0.96 | EH30 | 0.073 | 1.2% | Ambient | 3 | 3 |
| 123 | 3.210 | 52.0% | Butyl Acetate | 20.0% | 1.235 | D.E.R.™ 354 | 1.608 | 1.04 | EH30 | 0.124 | 2.0% | Heat | 2 | 3 |
| 124 | 3.215 | 52.6% | Butyl Acetate | 19.6% | 1.198 | D.E.R.™ 354 | 1.584 | 1.03 | EH30 | 0.120 | 2.0% | Ambient | 2 | 3 |
| 125 | 3.303 | 54.2% | Butyl Acetate | 19.7% | 1.206 | D.E.R.™ 354 | 1.527 | 0.96 | PMDT | 0.069 | 1.1% | Heat | 2 | 3 |
| 126 | 3.324 | 54.2% | Butyl Acetate | 19.7% | 1.206 | D.E.R.™ 354 | 1.541 | 0.97 | PMDT | 0.065 | 1.1% | Ambient | 3 | 3 |
| 127 | 3.192 | 52.7% | Butyl Acetate | 19.8% | 1.200 | D.E.R.™ 354 | 1.518 | 0.99 | PMDT | 0.146 | 2.4% | Heat | 2 | 3 |
| 128 | 3.227 | 52.6% | Butyl Acetate | 19.7% | 1.206 | D.E.R.™ 354 | 1.564 | 1.01 | PMDT | 0.133 | 2.2% | Ambient | 3 | 3 |
| 129 | 3.302 | 53.8% | Butyl Acetate | 19.5% | 1.193 | D.E.R.™ 354 | 1.504 | 0.95 | Res | 0.133 | 2.2% | Heat | 2 | 2 |
| 130 | 3.317 | 53.5% | Butyl Acetate | 19.5% | 1.210 | D.E.R.™ 354 | 1.534 | 0.96 | Res | 0.137 | 2.2% | Ambient | 1 | 1 |
| 131 | 3.205 | 52.0% | Butyl Acetate | 19.6% | 1.205 | D.E.R.™ 354 | 1.502 | 0.98 | Res | 0.250 | 4.1% | Heat | 1 | 2 |
| 132 | 3.219 | 51.3% | Butyl Acetate | 19.5% | 1.223 | D.E.R.™ 354 | 1.573 | 1.02 | Res | 0.264 | 4.2% | Ambient | 1 | 1 |
| 133 | 2.398 | 39.9% | Xylene | 40.2% | 2.417 | D.E.R.™ 354 | 1.122 | 0.97 | EH30 | 0.080 | 1.3% | Heat | 4 | 3 |

FIG. 11E

TABLE 7

| Run | MSO (g) | MSO wt. % | Solvent | Solvent wt. % | Solvent wt. (g) | Epoxy Resin | Resin wt. (g) | Epoxide/SH mol ratio | Cat. | Cat. wt. (g) | Cat. Level (wt. %) | Cure Profile | Film Adhesion |
|---|---|---|---|---|---|---|---|---|---|---|---|---|---|
| 134 | 2.419 | 40.1% | Xylene | 39.8% | 2.402 | D.E.R.™ 354 | 1.148 | 0.99 | EH30 | 0.060 | 1.0% | Ambient | 1 |
| 135 | 2.407 | 39.9% | Xylene | 39.6% | 2.389 | D.E.R.™ 354 | 1.105 | 0.96 | EH30 | 0.137 | 2.3% | Heat | 4 |
| 136 | 2.415 | 39.7% | Xylene | 39.5% | 2.407 | D.E.R.™ 354 | 1.149 | 0.99 | EH30 | 0.118 | 1.9% | Ambient | 1 |
| 137 | 2.414 | 40.0% | Xylene | 40.9% | 2.466 | D.E.R.™ 354 | 1.090 | 0.94 | PMDT | 0.059 | 1.0% | Heat | 3 |
| 138 | 2.422 | 40.1% | Xylene | 39.8% | 2.403 | D.E.R.™ 354 | 1.138 | 0.98 | PMDT | 0.071 | 1.2% | Ambient | 1 |
| 139 | 2.412 | 38.6% | Xylene | 39.0% | 2.431 | D.E.R.™ 354 | 1.240 | 1.07 | PMDT | 0.158 | 2.5% | Heat | 3 |
| 140 | 2.393 | 39.4% | Xylene | 39.4% | 2.393 | D.E.R.™ 354 | 1.149 | 1.00 | PMDT | 0.132 | 2.2% | Ambient | 1 |
| 141 | 2.417 | 40.2% | Xylene | 39.8% | 2.392 | D.E.R.™ 354 | 1.086 | 0.94 | Res | 0.116 | 1.9% | Heat | 2 |
| 142 | 2.397 | 39.0% | Xylene | 40.1% | 2.470 | D.E.R.™ 354 | 1.151 | 1.00 | Res | 0.135 | 2.2% | Ambient | 1 |
| 143 | 2.403 | 38.1% | Xylene | 39.6% | 2.500 | D.E.R.™ 354 | 1.161 | 1.01 | Res | 0.247 | 3.9% | Heat | 2 |
| 144 | 2.406 | 38.5% | Xylene | 39.0% | 2.440 | D.E.R.™ 354 | 1.160 | 1.00 | Res | 0.246 | 3.9% | Ambient | 1 |

FIG. 11F

Table 8 – MHSO Epoxy Polymer Properties

| Run | MHSO (g) | Epoxy Resin | Epoxy Wt. (g) | Epoxide/SH mol ratio | Catalyst | Catalyst wt. (g) | Catalyst Wt. % | Young's Modulus (psi) | Tensile Strength (psi) | % Elongation | Toughness (lb-ft/in$^2$) |
|---|---|---|---|---|---|---|---|---|---|---|---|
| 1 | 48.82 | GY285 | 26.54 | 1.34 | EH30 | 0.30 | 0.40 | 458.3 | 182.3 | 48.9 | 57.5 |
| 2 | 41.56 | GY285 | 33.46 | 1.98 | N-AEP | 2.27 | 2.93 | 1203.4 | 675.9 | 56.1 | 232.3 |
| 3 | 48.82 | GY285 | 26.31 | 1.33 | N-AEP | 2.27 | 2.93 | 329.2 | 247.6 | 75.2 | 108.5 |
| 4 | 41.56 | GY285 | 33.44 | 1.98 | N-AEP | 2.99 | 3.84 | 1701.2 | 845.8 | 51.1 | 267.3 |
| 5 | 48.82 | GY285 | 26.18 | 1.32 | N-AEP | 3.09 | 3.96 | 379.6 | 274.8 | 87.8 | 135.9 |
| 6 | 39.59 | D.E.R. 331 | 36.19 | 2.03 | BDMA | 0.24 | 0.32 | 11024.5 | 1498.9 | 69.9 | 587.7 |

FIG. 12

MERCAPTAN-HARDENED EPOXY POLYMER COMPOSITIONS AND PROCESSES FOR MAKING AND USING SAME

CROSS REFERENCE TO RELATED APPLICATIONS

This application claims the benefit of U.S. Provisional Patent Application Ser. No. 60/708,610 entitled "Polythioepoxy Polymer Compositions and Processes for Making and Using Same," which was filed on Aug. 16, 2005 and hereby is incorporated by reference in its entirety.

PARTIES TO A JOINT RESEARCH AGREEMENT

Chevron Phillips Chemical Company, LP, a Delaware limited partnership, and Agrium, a general partnership registered in Alberta, Canada, are parties to a Joint Research Agreement.

BACKGROUND OF THE INVENTION

1. Field of the Invention

The invention relates to mercaptan-hardened epoxy polymer compositions generally made from a reaction of thiol ester compositions and an epoxide. The invention also relates to the processes for preparing such compositions and uses for the compositions.

2. Description of Related Art

The chemical industry strives to make products, such as polymers, foams, and fuels, with less expensive feedstocks that are in abundant supply. As the fossil fuels slowly deplete over time, alternative sources are always being sought as replacements for fuels. Additionally, the chemical industry continuously strives to produce products and use feedstocks that are environmentally friendly in order to reduce potential hazards and risks related to safety and environmental issues.

SUMMARY OF THE INVENTION

The present invention provides a novel polymer composition that is produced by reacting a thiol ester composition with an epoxide composition. In embodiments, the thiol ester composition can be a hydroxy thiol ester (hydroxy thiol ester composition); alternatively, a crosslinked thiol ester (crosslinked thiol ester composition); alternatively, a mercaptanized unsaturated ester (mercaptanized unsaturated ester composition); alternatively, a mercaptanized epoxidized ester (mercaptanized epoxidized ester composition); or alternatively, a crosslinked mercaptanized unsaturated ester (crosslinked mercaptanized unsaturated ester composition). The epoxide compositions described herein can be used to prepare the polymer composition. The thiol ester compositions used to produce the polymer compositions of the present invention can be described as a crosslinking agent or a crosslinker.

The polymer compositions of the present invention have desirable physical properties that make the compositions useful in various applications. For example, in some embodiments, the polymer of the present invention has a glass transition temperature ranging between −100° C. to 250° C. Other advantageous physical properties are described herein.

The present invention also provides an adhesive polymer composition as another embodiment. The adhesive polymer comprises a reaction product of the thiol ester composition and the epoxide composition. In some embodiments, the epoxide composition comprises at least two epoxide groups.

In addition to the polymers, methods of making the polymers are also provided as embodiments of the present invention. In an embodiment, the thiol ester composition is contacted with the epoxide composition to form a mixture. In an embodiment, the mixture is then heated to produce the polymer. In some embodiments, a catalyst is used to produce the polymer.

In an aspect, a process for using the adhesive polymer composition to bond two substrates together is provided. In some embodiments, the substrates are metal. In some embodiments, the two substrates can be the same material; or alternatively, the two substrates can be different materials.

The polymer compositions described herein can be used in various applications. For example, the polymer compositions can be used as adhesives or as sealants. The physical properties of the polymer compositions can be customized to suit a particular use. As an example, if the desired application for the polymer composition is as a sealant, the polymer composition can be prepared so that the polymer composition has an elongation value in a desired range that makes the polymer composition suitable for use as a sealant.

BRIEF DESCRIPTION OF THE DRAWING

FIG. 1 contains Table 2 that includes data related to the control sample group used to compare with mercaptan-hardened epoxy polymer compositions made in accordance with embodiments of the present invention;

FIG. 2 contains Table 3 that includes data related to mercaptan-hardened epoxy polymer compositions made in accordance with embodiments of the present invention;

FIG. 3 contains Table 4 that includes data related to the control sample group for preparation and testing, using the Pneumatic Adhesion Tensile Testing Instrument (PATTI) Tests (according to ASTM D4541-02), for quick set epoxy compositions to compare with quickset epoxy compositions made in accordance with embodiments of the present invention;

FIG. 4 contains Table 5 that includes data related to the preparation and testing, using PATTI Tests (according to ASTM D4541-02), for quick set epoxy compositions made in accordance with embodiments of the present invention

FIGS. 11A-11F contain Table 7 that includes data related to mercaptan-hardened epoxy polymer compositions made in accordance with embodiments of the present invention; and FIG. 12 contains Table 8 that includes data related to physical properties of mercaptohydroxy or mercaptanized epoxidized soybean oil (MHSO) epoxy polymer compositions made in accordance with embodiments of the present invention.

DETAILED DESCRIPTION OF THE INVENTION

Figure 5:
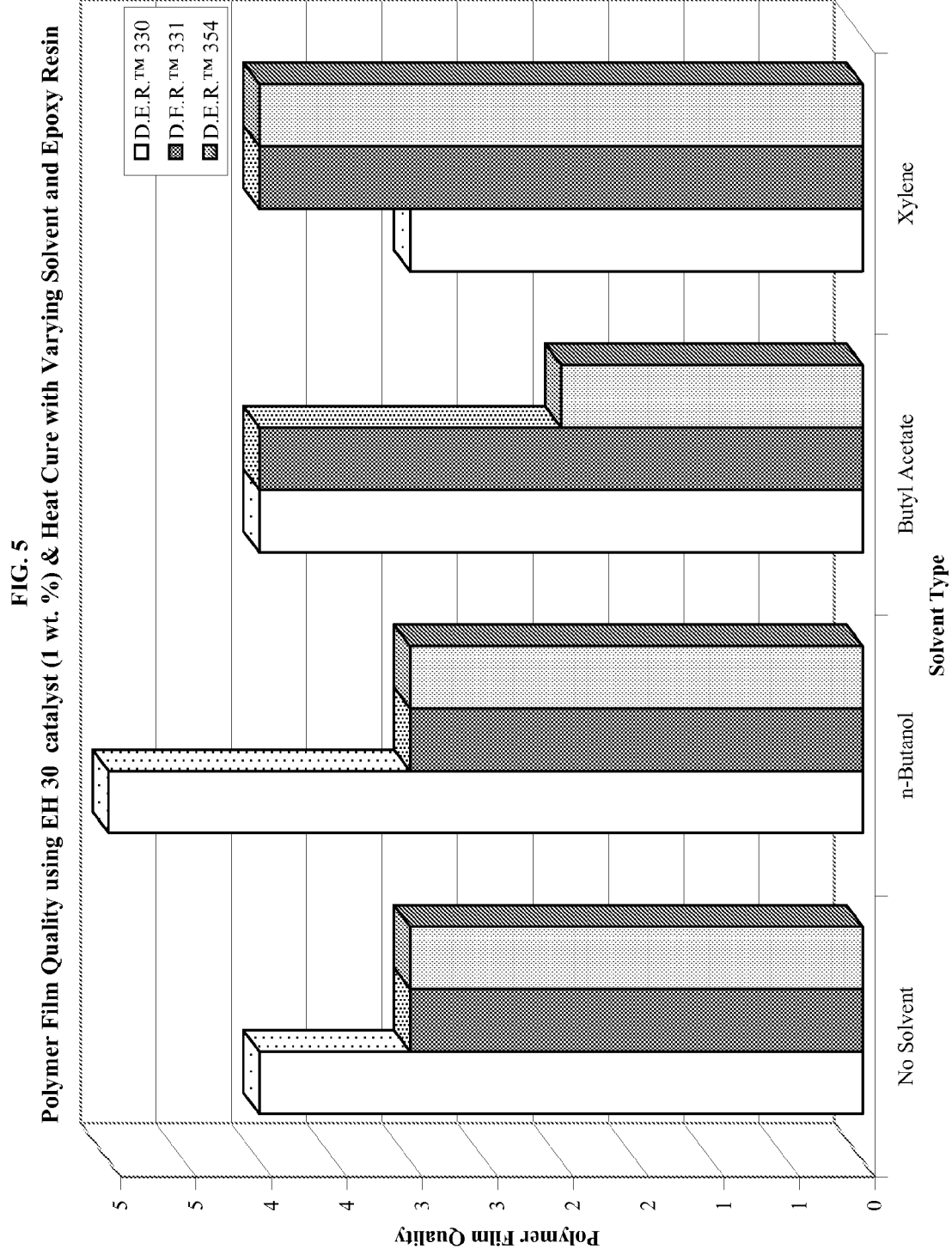
FIG. 5 is a graph showing the effect of epoxy resin type and solvent on mercaptan-hardened epoxy polymer film quality when using a mercaptanized soybean oil as an epoxy crosslinking agent in accordance with embodiments of the present invention.

In this specification "natural" refers to materials obtained, by any method, from naturally occurring fruits, nuts, vegetables, plants and animals. As an example, natural source oil refers to source oils extracted, and optionally purified, from naturally occurring fruits, nuts, vegetables, plants and animals. Additionally, unsaturated natural source oil refers to unsaturated source oils extracted, and optionally purified, from naturally occurring fruits, nuts, vegetables, plants, and animals. As another example, the unsaturated natural source oil can be derived from genetically modified nuts, vegetables, plant, and animal sources. As yet another example, the unsaturated natural source oil comprises a triglyceride derived from genetically modified nuts, vegetables, plant, and animal sources.

In this specification, "natural source raw material" refers to materials obtained by extraction, chemical breakdown, or chemical processing of "natural" materials. A non-limiting example includes natural source oils that can be extracted from naturally occurring fruits, nuts, vegetables, plants and animals. As another non-limiting example, glycerol and carboxylic acids or carboxylic acid esters, saturated or unsaturated, can be produced and isolated by the chemical processing of triglycerides extracted from naturally occurring fruits, nuts, vegetables, plants, and animals.

In this specification "synthetic" refers to materials produced from chemical building blocks not directly derived from natural sources. For example, synthetic unsaturated ester oil can be produced by the reaction of synthetic ethylene glycol and a synthetic carboxylic acid, i.e. acrylic acid or propionic acid. Other types of synthetic materials will be apparent to those of skill in the art and are to be considered within the scope of the present invention.

Regardless of the definitions of natural and synthetic, the materials described herein can be produced from a combination of natural and synthetic materials, "semi-synthetic." As a non-limiting example, the unsaturated ester oils described in this specification can be obtained or produced from a combination of synthetic and natural source raw materials. For example, the unsaturated ester oil can be produced by the reaction of synthetic ethylene glycol and oleic acid isolated from a natural source oil. Alternatively, the unsaturated ester oil can be produced from the reaction of glycerol isolated from natural source oils and a synthetic carboxylic acid, i.e. acrylic acid. Alternatively, the unsaturated ester oil can be produced from glycerol and oleic acid isolated from natural source oils.

In this specification, "thiol ester composition" refers to an ester composition that includes "thiol ester molecules." The thiol ester molecule has at least one thiol group and at least one ester group within the thiol ester molecule.

In this specification, "hydroxy thiol ester composition" refers to an ester composition that includes "hydroxy thiol ester molecules." The hydroxy thiol ester molecule has at least one thiol group, at least one ester group, and at least one hydroxy or alcohol group within the hydroxy thiol ester molecule. In an aspect, the alcohol group and the thiol group can be combined in the same group, which is referred to as an "α-hydroxy thiol group."

In this specification, "unsaturated ester composition" refers to an ester composition that includes unsaturated ester molecules. The unsaturated ester molecules have at least one ester group and at least one carbon-carbon double bond within the unsaturated ester molecule.

In this specification, "epoxidized unsaturated ester composition" refers to an ester composition that has been produced by epoxidizing an unsaturated ester composition.

Mercapten-Hardened Epoxy Polymer Compositions

In an aspect, the polymer of the present invention can be described as a polymer produced from the thiol ester composition and an epoxide composition. In embodiments, the polymer composition can be called a mercaptan-hardened epoxy polymer or a mercaptan-crosslinked epoxy polymer or a polythioepoxy polymer. Generally, the thiol ester composition and the epoxide composition are independent elements of the polymer. Therefore, the polymer can be described as a polymer produced from any combination of the thiol ester composition element described herein and the epoxide composition element described herein. In aspects, the polymer can be linear. In other aspects, the polymer composition can be crosslinked. When the polymer composition is crosslinked, either the thiol ester composition comprises thiol ester molecules having greater than 2 thiol groups per thiol ester molecule or the epoxide composition comprises epoxide molecules having at least 2 epoxide groups per epoxide molecule. Alternatively, when the polymer composition is crosslinked, the thiol ester composition comprises thiol ester molecules having greater than 2 thiol groups per thiol ester molecule and the epoxide composition comprises epoxide molecules having at least 2 epoxide groups per epoxide molecule.

In embodiments, the thiol ester composition utilized to produce the polymer composition of the present invention can comprise a mercaptanized unsaturated ester; alternatively, a mercaptanized epoxidized ester; alternatively; a hydroxy thiol ester; or alternatively, a crosslinked thiol ester. In non-limiting embodiments, the thiol ester can be a mercaptanized natural source oil; alternatively, mercaptanized epoxidized natural source oil; alternatively, crosslinked mercaptanized natural source oil; or alternatively, crosslinked mercaptanized epoxidized natural source oil. In particular non-limiting embodiments, the thiol ester can be mercaptanized soybean oil; alternatively, mercaptanized castor oil; alternatively, mercaptanized epoxidized soybean oil; or alternatively, crosslinked mercaptanized soybean oil. Other thiol ester compositions are described herein and can generally be utilized to describe the polymer compositions produced from a thiol ester composition and an epoxide composition. Additionally, other aspects of the thiol ester materials (e.g. average number of thiol groups per thiol ester molecule, thiol sulfur content, etc.) are described herein and can be utilized to further describe the thiol ester composition.

Generally, the epoxide composition can be any epoxide composition described herein. In some embodiments, the epoxide composition is a polyol glycidyl ether composition. In an aspect the polyol glycidyl ether composition can comprise aliphatic polyol glycidyl ethers; alternatively, cycloaliphatic polyol glycidyl ethers; alternatively, aromatic glycidyl ethers; alternatively, bisphenol glycidyl ethers; or alternatively, novolak polyglycidyl ethers. In embodiments, the epoxide composition can comprise a trimethylolethane triglycidyl ether; alternatively, pentaerythritol tetraglycidyl ether; alternatively, dipentaerythritol tetraglycidyl ether; alternatively, sorbitol tetraglycidyl ether; alternatively, sorbitol hexaglycidyl ether; alternatively, bisphenol A diglycidyl ether; alternatively, a bisphenol F diglycidyl ether; alternatively, a formaldehyde-phenol novolak polyglycidyl ether; alternatively, a formaldehyde-cresol novolak polyglycidyl ether; or alternatively, a formaldehyde-catechol novolak polyglycidyl ether. Other epoxide compositions are described herein and can generally be utilized to describe the polymer compositions produced from the thiol ester composition and the epoxide composition. Additionally, other aspects of the epoxide materials (e.g. the number or average number of epoxide groups per epoxide molecule, etc.) are described herein and can be utilized to further describe the epoxide composition.

Generally, the thiol ester composition and the epoxide composition are independent elements of the mercaptan-hardened epoxy polymer composition. Therefore, the mercaptan-hardened epoxy polymer composition can be described as a polymer produced from any combination of the thiol ester composition described herein and the epoxide composition described herein.

In embodiments, the polymer can be described as a polymer produced by contacting the thiol ester composition with the epoxide composition comprising an epoxide having at least two epoxide groups; or alternatively, a polyol glycidyl ether composition comprising a polyol glycidyl ether having at least two epoxide groups. In some embodiments, the polymer can be described as a polymer produced by contacting the thiol ester composition with the epoxide composition comprising a bisphenol diglycidyl ether; or alternatively, a novolak polyglycidyl ether. In other embodiments, the polymer can be described as a polymer produced by contacting the thiol ester composition with the epoxide composition comprising a bisphenol A diglycidyl ether, a bisphenol F diglycidyl ether, a formaldehyde-phenol novolak polyglycidyl ether, a formaldehyde-cresol novolak polyglycidyl ether, a formaldehyde-catechol novolak polyglycidyl ether, or any combination thereof. In yet other embodiments, the polymer can be described as a polymer produced by contacting the thiol ester composition with an epoxide composition comprising a bisphenol A diglycidyl ether; alternatively, a bisphenol F diglycidyl ether; alternatively, a formaldehyde-phenol novolak polyglycidyl ether; alternatively, a formaldehyde-cresol novolak polyglycidyl ether; or alternatively, a formaldehyde-catechol novolak polyglycidyl ether.

In embodiments, the polymer can be described as a polymer produced by contacting the mercaptanized unsaturated ester composition with the epoxide composition comprising an epoxide having at least two epoxide groups; or alternatively, the polyol glycidyl ether composition comprising a polyol glycidyl ether having at least two epoxide groups. In some embodiments, the polymer can be described as a polymer produced by contacting the mercaptanized unsaturated ester composition with the epoxide composition comprising the bisphenol diglycidyl ether; or alternatively, a novolak polyglycidyl ether. In other embodiments, the polymer can be described as a polymer produced by contacting the mercaptanized unsaturated ester composition with the epoxide composition comprising a bisphenol A diglycidyl ether, a bisphenol F diglycidyl ether, a formaldehyde-phenol novolak polyglycidyl ether, a formaldehyde-cresol novolak polyglycidyl ether, a formaldehyde-catechol novolak polyglycidyl ether, or any combination thereof In yet other embodiments, the polymer can be described as a polymer produced by contacting the mercaptanized unsaturated ester composition with the epoxide composition comprising the bisphenol A diglycidyl ether; alternatively, the bisphenol F diglycidyl ether; alternatively, the formaldehyde-phenol novolak polyglycidyl ether; alternatively, the formaldehyde-cresol novolak polyglycidyl ether; or alternatively, the formaldehyde-catechol novolak polyglycidyl ether.

In embodiments, the polymer can be described as a polymer produced by contacting the mercaptanized soybean oil composition with the epoxide composition comprising an epoxide having at least two epoxide groups; or alternatively, a polyol glycidyl ether composition comprising a polyol glycidyl ether having at least two epoxide groups. In some embodiments, the polymer can be described as a polymer produced by contacting the mercaptanized soybean oil composition with the epoxide composition comprising the bisphenol diglycidyl ether; or alternatively, the novolak polyglycidyl ether. In other embodiments, the polymer can be described as a polymer produced by contacting the mercaptanized soybean oil composition with the epoxide composition comprising a bisphenol A diglycidyl ether, a bisphenol F diglycidyl ether, a formaldehyde-phenol novolak polyglycidyl ether, a formaldehyde-cresol novolak polyglycidyl ether, a formaldehyde-catechol novolak polyglycidyl ether, or any combination thereof In yet other embodiments, the polymer can be described as a polymer produced by contacting the mercaptanized soybean oil composition with the epoxide composition comprising a bisphenol A diglycidyl ether; alternatively, a bisphenol F diglycidyl ether; alternatively, a formaldehyde-phenol novolak polyglycidyl ether; alternatively, a formaldehyde-cresol novolak polyglycidyl ether; or alternatively, a formaldehyde-catechol novolak polyglycidyl ether.

In embodiments, the polymer can be described as a polymer produced by contacting the mercaptanized castor oil composition with the epoxide composition comprising an epoxide having at least two epoxide groups; or alternatively, the polyol glycidyl ether composition comprising the polyol glycidyl ether having at least two epoxide groups. In some embodiments, the polymer can be described as a polymer produced by contacting the mercaptanized castor oil composition with an epoxide composition comprising the bisphenol diglycidyl ether; or alternatively, the novolak polyglycidyl ether. In other embodiments, the polymer can be described as a polymer produced by contacting the mercaptanized castor oil composition with an epoxide composition comprising the bisphenol A diglycidyl ether, the bisphenol F diglycidyl ether, the formaldehyde-phenol novolak polyglycidyl ether, the formaldehyde-cresol novolak polyglycidyl ether, the formaldehyde-catechol novolak polyglycidyl ether, or any combination thereof In yet other embodiments, the polymer can be described as a polymer produced by contacting the mercaptanized castor oil composition with an epoxide composition comprising the bisphenol A diglycidyl ether; alternatively, the bisphenol F diglycidyl ether; alternatively, the formaldehyde-phenol novolak polyglycidyl ether; alternatively, the formaldehyde-cresol novolak polyglycidyl ether; or alternatively, the formaldehyde-catechol novolak polyglycidyl ether.

In embodiments, the polymer can be described as a polymer produced by contacting the mercaptanized epoxidized soybean oil composition with the epoxide composition comprising an epoxide having at least two epoxide groups; or alternatively, a polyol glycidyl ether composition comprising a polyol glycidyl ether having at least two epoxide groups. In some embodiments, the polymer can be described as a polymer produced by contacting the mercaptanized epoxidized soybean oil composition with an epoxide composition comprising a bisphenol diglycidyl ether; or alternatively, a novolak polyglycidyl ether. In other embodiments, the polymer can be described as a polymer produced by contacting the mercaptanized epoxidized soybean oil composition with an epoxide composition comprising a bisphenol A diglycidyl ether, a bisphenol F diglycidyl ether, a formaldehyde-phenol novolak polyglycidyl ether, a formaldehyde-cresol novolak polyglycidyl ether, a formaldehyde-catechol novolak polyglycidyl ether, or any combination thereof In yet other embodiments, the polymer can be described as a polymer produced by contacting the mercaptanized epoxidized soybean oil composition with an epoxide composition comprising a bisphenol A diglycidyl ether; alternatively, a bisphenol F diglycidyl ether; alternatively, a formaldehyde-phenol novolak polyglycidyl ether; alternatively, a formaldehyde-cresol novolak polyglycidyl ether; or alternatively, a formaldehyde-catechol novolak polyglycidyl ether.

In embodiments, the polymer can be described as a polymer produced by contacting a crosslinked mercaptanized soybean oil composition with an epoxide composition comprising an epoxide having at least two epoxide groups; or alternatively, a polyol glycidyl ether composition comprising a polyol glycidyl ether having at least two epoxide groups. In some embodiments, the polymer can be described as a polymer produced by contacting a crosslinked mercaptanized soybean oil composition with an epoxide composition comprising a bisphenol diglycidyl ether; or alternatively, a novolak polyglycidyl ether. In other embodiments, the polymer can be described as a polymer produced by contacting a crosslinked mercaptanized soybean oil composition with an epoxide composition comprising a bisphenol A diglycidyl ether, a bisphenol F diglycidyl ether, a formaldehyde-phenol novolak polyglycidyl ether, a formaldehyde-cresol novolak polyglycidyl ether, a formaldehyde-catechol novolak polyglycidyl ether, or any combination thereof In yet other embodiments, the polymer can be described as a polymer produced by contacting a crosslinked mercaptanized soybean oil composition with an epoxide composition comprising a bisphenol A diglycidyl ether; alternatively, a bisphenol F diglycidyl ether; alternatively, a formaldehyde-phenol novolak polyglycidyl ether; alternatively, a formaldehyde-cresol novolak polyglycidyl ether; or alternatively, a formaldehyde-catechol novolak polyglycidyl ether.

One skilled in the art will readily recognize other possible combinations of thiol ester compositions and epoxide compositions based upon the present application.

In an aspect, the thiol ester composition and the epoxide composition are contacted at a mercaptan to epoxide molar ratio ranging from 0.8 to 1.15. In other embodiments, the thiol ester composition and the epoxide composition are contacted at a mercaptan to epoxide molar ratio ranging from 0.9 to 1.10; or alternatively, from 0.95 to 1.05. In further embodiments, the thiol ester composition and the epoxide composition are contacted at a mercaptan to epoxide molar ratio of about 1.

When the thiol ester composition further comprises a hydroxy (or alcohol group) both the mercaptan group and the hydroxy group can react with the epoxide group. One of ordinary skill in the art realizes that, in this situation, both the mercaptan group and the hydroxy group can react with the epoxide group, but generally, recognizes that the thiol group is more reactive than the hydroxy group. Thus, the mercaptan-hardened epoxy polymer can be formed by contacting the thiol ester composition and the epoxide composition in a molar ratio based upon the mercaptan to epoxide molar ratio or based upon the mercaptan plus hydroxy to epoxide molar ratio (i.e. SH+OH:epoxide molar ratio or XH:epoxide molar ratio). In some embodiments when the thiol ester composition further comprises a hydroxy group (e.g. mercaptanized epoxidized natural source oil, mercaptanized epoxidized soybean oil, or mercaptanized castor oil, among others), the thiol ester composition and the epoxide composition are contacted at a mercaptan to epoxide molar ratio ranging from 0.8 to 1.15; alternatively, from 0.9 to 1.10; or alternatively, from 0.95 to 1.05. In other embodiments when the thiol ester composition further comprises a hydroxy group, the thiol ester composition and the epoxide composition are contacted at a mercaptan plus hydroxy to epoxide molar ratio ranging from 0.6 to 1.20; alternatively, from 0.8 to 1.15; alternatively, 0.9 to 1.10; or alternatively, from 0.95 to 1.05.

In embodiments, the mercaptan-hardened epoxy polymer composition of the present invention can be described as a product produced by any process described herein capable of producing the mercaptan-hardened epoxy polymer composition and can be further described as being produced using any embodiments of the processes described herein.

The mercaptan-hardened epoxy polymer composition has physical properties that are advantageous in many applications. For example, in embodiments, the mercaptan-hardened epoxy polymer composition can have a glass transition temperature, Tg, ranging between −100° C. and 250° C. In some aspects, the glass transition temperature ranges from −50° C. to 200° C.; alternatively, from 0° C. to 150° C.; alternatively, from 50° C. to 100° C.; or alternatively, from −50° C. to 50° C. In some aspects, the glass transition temperature ranges from −50° C. to 0° C.; alternatively, from 0° C. to 50° C.; alternatively, from 50° C. to 100° C.; alternatively, from 100° C. to 150° C.; or alternatively, from 150° C. to 200° C.

Besides the glass transition temperature, the mercaptan-hardened epoxy composition of the present invention can have other desirable properties. For example, the mercaptan-hardened epoxy composition of the present invention can have desirable Young's modulus, tensile strength, and elongations at break, which can be measured using ASTM D638-03. In embodiments, the mercaptan-hardened epoxy composition can have a stiffness (Young's modulus) greater than 10 psi; or alternatively, ranging from 10 psi to 1,000,000 psi. In some embodiments, the mercaptan-hardened epoxy composition has a Young's modulus ranging from 600 to 300,000 psi; alternatively, from 700 to 20,000 psi; or alternatively, 20,000 to 200,000 psi. In an aspect, the mercaptan-hardened epoxy composition can have a Young's modulus ranging from 10 psi to 4,000 psi. In some embodiments, the mercaptan-hardened epoxy composition has a Young's modulus ranging from 90,000 to 600,000 psi. In embodiments, the mercaptan-hardened epoxy composition can have a tensile strength (as measured using ASTM D638-03) greater than 10 psi; or alternatively, ranging from 10 psi to 8,000 psi. In some embodiments, the mercaptan-hardened epoxy composition has a tensile strength ranging from 300 to 6,000 psi; or alternatively, from 300 to 1,000 psi. In some embodiments, the mercaptan-hardened epoxy composition can have a tensile strength ranging from 1,000 to 5,000 psi; or alternatively, ranging from 4,000 to 7,500 psi. In an aspect, the mercaptan-hardened epoxy composition can have an elongation at break (as measured using ASTM D638-03) less than 100 percent; or alternatively, greater than 100 percent. In embodiments, the mercaptan-hardened epoxy composition can have an elongation at break less than 10 percent; or alternatively, ranging from 10 percent to 100 percent. In embodiments, the mercaptan-hardened epoxy composition can have any combination of the Young's modulus, tensile strength, and elongation at break described herein.

The polymer compositions described herein can be used in various applications. For example, the polymer compositions can be used as adhesives or as sealants. The physical properties of the polymer compositions can be customized to suit a particular use. As an example, if the desired application for the polymer composition is as a sealant, the polymer composition can be prepared so that the polymer composition has an elongation at break value in a desired range that makes the polymer composition suitable for use as a sealant.

Mercaptan-Crosslinked Epoxy Adhesive Composition

In an aspect, the present invention provides an adhesive composition. In an embodiment, the adhesive composition is a mercaptan-crosslinked epoxy composition or alternatively a mercaptan-crosslinked epoxy adhesive. In embodiments, the mercaptan-crosslinked epoxy adhesive composition comprises the reaction product of a thiol ester composition and an epoxide composition.

The thiol ester composition component of the mercaptan-crosslinked epoxy adhesive composition can be any thiol ester composition comprising thiol ester described herein. In an embodiment, the thiol ester composition can be a hydroxy thiol ester composition; or alternatively, a crosslinked thiol ester composition. In some embodiments, the thiol ester composition comprises a mercaptanized unsaturated ester; or alternatively, a mercaptanized natural source oil. In some non-limiting embodiments, the mercaptanized natural source oil can be mercaptanized soybean oil; or alternatively, mercaptanized castor oil. In an embodiment, the hydroxy thiol ester composition comprises a mercaptanized epoxidized ester; or alternatively, a mercaptanized epoxidized natural source oil. In some embodiments, the hydroxy thiol ester composition comprises mercaptanized epoxidized soybean oil, mercaptanized castor oil, or mixtures thereof. In other embodiments, the hydroxy thiol ester composition comprises mercaptanized epoxidized soybean oil; or alternatively, mercaptanized castor oil. In an embodiment, the crosslinked thiol ester composition comprises a crosslinked mercaptanized unsaturated ester; alternatively, a crosslinked mercaptanized natural source oil; alternatively, a crosslinked mercaptanized epoxidized ester composition; or alternatively, a crosslinked mercaptanized epoxidized natural source oil. In some non-limiting embodiments, the crosslinked thiol ester composition can be crosslinked mercaptanized soybean oil; alternatively, crosslinked mercaptanized castor oil; or alternatively, crosslinked mercaptanized epoxidized soybean oil. Additional properties of the thiol ester compositions and/or the thiol ester molecules (e.g. number or average number of thiol groups per thiol ester molecule, weight percent thiol sulfur, among others), hydroxy thiol ester compositions and/or hydroxy thiol ester molecules (e.g. thiol to hydroxy molar ratio, number or average number of thiol groups per hydroxy thiol ester molecule, weight percent thiol sulfur, among others), and crosslinked thiol ester composition and/or the crosslinked thiol ester molecules (e.g. number or average number of thiol groups per crosslinked thiol ester molecule, weight percent thiol sulfur, among others) are described herein and are generally appropriate to further describe the applicable thiol ester compositions.

Generally, the epoxide composition utilized to form the mixture for the mercaptan-crosslinked epoxy adhesive comprises an epoxide having at least two epoxide groups; or alternatively, comprises epoxide molecules having an average of at least two epoxide groups per epoxide molecule. In embodiments, the epoxide composition utilized to form the mixture for the mercaptan-crosslinked epoxy adhesive can be a glycidyl ether composition comprising a glycidyl ether having at least two glycidyl ether groups; or alternatively, comprising glycidyl ether molecules having an average of at least two glycidyl ether groups per glycidyl ether molecule. In embodiments, the glycidyl ether composition can comprise a polyol glycidyl ether, a bisphenol diglycidyl ether, or a novolak polyglycidyl ether. In some embodiments, the adhesive polymer can be produced by forming a mixture comprising a thiol ester composition with a glycidyl ether composition comprising a bisphenol diglycidyl ether. In embodiments, the bisphenol diglycidyl ether can be bisphenol A diglycidyl ether, bisphenol F diglycidyl ether, or a combination thereof. In other embodiments, the bisphenol diglycidyl ether can be bisphenol A diglycidyl ether; or alternatively, bisphenol F diglycidyl ether. Additional properties of the epoxide compositions, epoxide molecules, glycidyl ether compositions, and/or glycidyl ether molecules (e.g. number of epoxide groups, average number of epoxide groups per epoxide molecule, number of glycidyl ether groups, average number of glycidyl ether groups per glycidyl ether, among others) are described herein and are generally appropriate to further describe the applicable hydroxy thiol ester compositions.

The thiol ester composition and the epoxide composition are independent elements in the mercaptan-crosslinked epoxy adhesive composition reaction product. Therefore, the mercaptan-crosslinked epoxy adhesive compositions can comprise the reaction product of any combination of the thiol ester composition described herein and the epoxide composition described herein.

In embodiments, the mercaptan-crosslinked epoxy adhesive comprises the reaction product of a thiol ester composition with the epoxide composition comprising an epoxide having at least two epoxide groups; alternatively, comprises epoxide molecules having an average of at least two epoxide groups per epoxide molecule; alternatively, a polyol glycidyl ether composition comprising a polyol glycidyl ether having at least two glycidyl ether groups; or alternatively, comprising glycidyl ether molecules having an average of at least two glycidyl ether groups per epoxide molecule. In some embodiments, the mercaptan-crosslinked epoxy adhesive comprises the reaction product of a thiol ester composition with a glycidyl ether composition comprising a polyol glycidyl ether; alternatively, a bisphenol diglycidyl ether; or alternatively, a novolak polyglycidyl ether. In other embodiments, the mercaptan-crosslinked epoxy adhesive comprises the reaction product of a thiol ester composition with a glycidyl ether composition comprising bisphenol A diglycidyl ether, bisphenol F diglycidyl ether, or any combination thereof. In yet other embodiments, the mercaptan-crosslinked epoxy adhesive comprises the reaction product of a thiol ester composition with a glycidyl ether composition comprising bisphenol A diglycidyl ether; or alternatively, bisphenol F diglycidyl ether.

In embodiments, the mercaptan-crosslinked epoxy adhesive comprises the reaction product of a mercaptanized unsaturated ester composition with an epoxide composition comprising an epoxide having at least two epoxide groups; alternatively, comprises epoxide molecules having an average of at least two epoxide groups per epoxide molecule; alternatively, a polyol glycidyl ether composition comprising a polyol glycidyl ether having at least two glycidyl ether groups; or alternatively, comprising glycidyl ether molecules having an average of at least two glycidyl ether groups per epoxide molecule. In some embodiments, the mercaptan-crosslinked epoxy adhesive comprises the reaction product of a mercaptanized unsaturated ester composition with a glycidyl ether composition comprising a polyol glycidyl ether; alternatively, a bisphenol diglycidyl ether; or alternatively, a novolak polyglycidyl ether. In other embodiments, the mercaptan-crosslinked epoxy adhesive comprises the reaction product of a mercaptanized unsaturated ester composition with a glycidyl ether composition comprising bisphenol A diglycidyl ether, bisphenol F diglycidyl ether, or any combination thereof. In yet other embodiments, the mercaptan-crosslinked epoxy adhesive comprises the reaction product of a mercaptanized unsaturated ester composition with a glycidyl ether composition comprising bisphenol A diglycidyl ether; or alternatively, bisphenol F diglycidyl ether.

In embodiments, the mercaptan-crosslinked epoxy adhesive comprises the reaction product of a mercaptanized natural source oil composition with an epoxide composition comprising an epoxide having at least two epoxide groups; alternatively, comprises epoxide molecules having an average of at least two epoxide groups per epoxide molecule; alternatively, a polyol glycidyl ether composition comprising a polyol glycidyl ether having at least two glycidyl ether groups; or alternatively, comprising glycidyl ether molecules having an average of at least two glycidyl ether groups per epoxide molecule. In some embodiments, the mercaptan-crosslinked epoxy adhesive comprises the reaction product of a mercaptanized natural source oil composition with a glycidyl ether composition comprising a polyol glycidyl ether; alternatively, a bisphenol diglycidyl ether; or alternatively, a novolak polyglycidyl ether. In other embodiments, the mercaptan-crosslinked epoxy adhesive comprises the reaction product of a mercaptanized natural source oil composition with a glycidyl ether composition comprising bisphenol A diglycidyl ether, bisphenol F diglycidyl ether, or any combination thereof. In yet other embodiments, the mercaptan-crosslinked epoxy adhesive comprises the reaction product of a mercaptanized natural source oil composition with a glycidyl ether composition comprising bisphenol A diglycidyl ether; or alternatively, bisphenol F diglycidyl ether.

In embodiments, the mercaptan-crosslinked epoxy adhesive comprises the reaction product of a mercaptanized soybean oil composition with an epoxide composition comprising an epoxide having at least two epoxide groups; alternatively, comprises epoxide molecules having an average of at least two epoxide groups per epoxide molecule; alternatively, a polyol glycidyl ether composition comprising a polyol glycidyl ether having at least two glycidyl ether groups; or alternatively, comprising glycidyl ether molecules having an average of at least two glycidyl ether groups per epoxide molecule. In some embodiments, the mercaptan-crosslinked epoxy adhesive comprises the reaction product of a mercaptanized soybean oil composition with a glycidyl ether composition comprising a polyol glycidyl ether; alternatively, a bisphenol diglycidyl ether; or alternatively, a novolak polyglycidyl ether. In other embodiments, the mercaptan-crosslinked epoxy adhesive comprises the reaction product of a mercaptanized soybean oil composition with a glycidyl ether composition comprising bisphenol A diglycidyl ether, bisphenol F diglycidyl ether, or any combination thereof. In yet other embodiments, the mercaptan-crosslinked epoxy adhesive comprises the reaction product of a mercaptanized soybean oil composition with a glycidyl ether composition comprising bisphenol A diglycidyl ether; or alternatively, bisphenol F diglycidyl ether.

In embodiments, the mercaptan-crosslinked epoxy adhesive comprises the reaction product of a hydroxy thiol ester composition with the epoxide composition comprising an epoxide having at least two epoxide groups; alternatively, comprises epoxide molecules having an average of at least two epoxide groups per epoxide molecule; alternatively, a polyol glycidyl ether composition comprising a polyol glycidyl ether having at least two glycidyl ether groups; or alternatively, comprising glycidyl ether molecules having an average of at least two glycidyl ether groups per epoxide molecule. In some embodiments, the mercaptan-crosslinked epoxy adhesive comprises the reaction product of a hydroxy thiol ester composition with a glycidyl ether composition comprising a polyol glycidyl ether; alternatively, a bisphenol diglycidyl ether; or alternatively, a novolak polyglycidyl ether. In other embodiments, the mercaptan-crosslinked epoxy adhesive comprises the reaction product of a hydroxy thiol ester composition with a glycidyl ether composition comprising bisphenol A diglycidyl ether, bisphenol F diglycidyl ether, or any combination thereof. In yet other embodiments, the mercaptan-crosslinked epoxy adhesive comprises the reaction product of a hydroxy thiol ester composition with a glycidyl ether composition comprising bisphenol A diglycidyl ether; or alternatively, bisphenol F diglycidyl ether.

In embodiments, the mercaptan-crosslinked epoxy adhesive comprises the reaction product of a mercaptanized epoxidized ester with an epoxide composition comprising an epoxide having at least two epoxide groups; alternatively, comprises epoxide molecules having an average of at least two epoxide groups per epoxide molecule; alternatively, a polyol glycidyl ether composition comprising a polyol glycidyl ether having at least two glycidyl ether groups; or alternatively, comprising glycidyl ether molecules having an average of at least two glycidyl ether groups per epoxide molecule. In some embodiments, the mercaptan-crosslinked epoxy adhesive comprises the reaction product of a mercaptanized epoxidized ester composition with a glycidyl ether composition comprising a polyol glycidyl ether; alternatively, a bisphenol diglycidyl ether; or alternatively, a novolak polyglycidyl ether. In other embodiments, the mercaptan-crosslinked epoxy adhesive comprises the reaction product of a mercaptanized epoxidized ester composition with a glycidyl ether composition comprising bisphenol A diglycidyl ether, bisphenol F diglycidyl ether, or any combination thereof. In yet other embodiments, the mercaptan-crosslinked epoxy adhesive comprises the reaction product of a mercaptanized epoxidized ester composition with a glycidyl ether composition comprising bisphenol A diglycidyl ether; or alternatively, bisphenol F diglycidyl ether.

In embodiments, the mercaptan-crosslinked epoxy adhesive comprises the reaction product of a mercaptanized epoxidized natural source oil with an epoxide composition comprising an epoxide having at least two epoxide groups; alternatively, comprises epoxide molecules having an average of at least two epoxide groups per epoxide molecule; alternatively, a polyol glycidyl ether composition comprising a polyol glycidyl ether having at least two glycidyl ether groups; or alternatively, comprising glycidyl ether molecules having an average of at least two glycidyl ether groups per epoxide molecule. In some embodiments, the mercaptan-crosslinked epoxy adhesive comprises the reaction product of a mercaptanized epoxidized natural source oil with a glycidyl ether composition comprising a polyol glycidyl ether; alternatively, a bisphenol diglycidyl ether; or alternatively, a novolak polyglycidyl ether. In other embodiments, the mercaptan-crosslinked epoxy adhesive comprises the reaction product of a mercaptanized epoxidized natural source oil composition with a glycidyl ether composition comprising bisphenol A diglycidyl ether, bisphenol F diglycidyl ether, or any combination thereof. In yet other embodiments, the mercaptan-crosslinked epoxy adhesive comprises the reaction product of a mercaptanized epoxidized natural source oil composition with a glycidyl ether composition comprising bisphenol A diglycidyl ether; or alternatively, bisphenol F diglycidyl ether.

In embodiments, the mercaptan-crosslinked epoxy adhesive comprises the reaction product of a mercaptanized epoxidized soybean oil with an epoxide composition comprising an epoxide having at least two epoxide groups; alternatively, comprises epoxide molecules having an average of at least two epoxide groups per epoxide molecule; alternatively, a polyol glycidyl ether composition comprising a polyol glycidyl ether having at least two glycidyl ether groups; or alternatively, comprising glycidyl ether molecules having an average of at least two glycidyl ether groups per epoxide molecule. In some embodiments, the mercaptan-crosslinked epoxy adhesive comprises the reaction product of a mercaptanized epoxidized soybean oil composition with a glycidyl ether composition comprising a polyol glycidyl ether; alternatively, a bisphenol diglycidyl ether; or alternatively, a novolak polyglycidyl ether. In other embodiments, the mercaptan-crosslinked epoxy adhesive comprises the reaction product of a mercaptanized epoxidized soybean oil composition with a glycidyl ether composition comprising bisphenol A diglycidyl ether, bisphenol F diglycidyl ether, or any combination thereof In yet other embodiments, the mercaptan-crosslinked epoxy adhesive comprises the reaction product of a mercaptanized epoxidized soybean oil composition with a glycidyl ether composition comprising bisphenol A diglycidyl ether; or alternatively, bisphenol F diglycidyl ether.

In embodiments, the mercaptan-crosslinked epoxy adhesive comprises the reaction product of a mercaptanized castor oil with an epoxide composition comprising an epoxide having at least two epoxide groups; alternatively, comprises epoxide molecules having an average of at least two epoxide groups per epoxide molecule; alternatively, a polyol glycidyl ether composition comprising a polyol glycidyl ether having at least two glycidyl ether groups; or alternatively, comprising glycidyl ether molecules having an average of at least two glycidyl ether groups per epoxide molecule. In some embodiments, the mercaptan-crosslinked epoxy adhesive comprises the reaction product of a mercaptanized castor oil composition with a glycidyl ether composition comprising a polyol glycidyl ether; alternatively, a bisphenol diglycidyl ether; or alternatively, a novolak polyglycidyl ether. In other embodiments, the mercaptan-crosslinked epoxy adhesive comprises the reaction product of a mercaptanized castor oil composition with a glycidyl ether composition comprising bisphenol A diglycidyl ether, bisphenol F diglycidyl ether, or any combination thereof. In yet other embodiments, the mercaptan-crosslinked epoxy adhesive comprises the reaction product of a mercaptanized castor oil composition with a glycidyl ether composition comprising bisphenol A diglycidyl ether; or alternatively, bisphenol F diglycidyl ether.

Various mechanical strength tests can be used to determine specific properties related to adhesive materials. In embodiments, the mercaptan-crosslinked epoxy adhesive composition of the current invention has an adjusted separation pressure of greater than 350 psig. The adjusted separation pressure can be determined using ASTM method D4541-02, which determines the pull-off strength of coatings using portable adhesion testers. In some embodiments, the mercaptan-crosslinked epoxy adhesive composition of the current invention has an adjusted separation pressure of greater than 500 psig; alternatively, greater than 800 psig; or alternatively, greater than 900 psig.

In some adhesive applications, the adhesive compositions can fail either due to inadequate bonding to the chosen surface (i.e. adhesive failure) or due to inadequate cohesion between the molecules of the adhesive composition (i.e. cohesive failure). In embodiments, the mercaptan-crosslinked epoxy adhesive of the current invention has an adjusted cohesive separation pressure of greater than 350 psig; alternatively, greater than 500 psig; alternatively, greater than 800 psig; or alternatively, greater than 900 psig. The mercaptan-crosslinked epoxy adhesive of the current invention has an adjusted adhesive separation pressure of greater than 500 psig; alternatively, greater than 800 psig; or alternatively, greater than 900 psig.

To form and maintain an adhesive seal, adhesive compositions typically are cured. In an aspect, the mercaptan-crosslinked epoxy adhesive composition is curable at a temperature ranging from ranging from 10° C. to 40° C.; or alternatively, from 20° C. to 30° C. In other embodiments, the mixture can be cured at about ambient temperature. Other suitable curing profiles are described in the Example Section herein.

Process of Making the Mercaptan-Hardened Epoxy Polymer Composition

In an aspect, a method of making the mercaptan-hardened epoxy polymer composition of the present invention comprises contacting a thiol ester composition and an epoxide composition. In an embodiment of the present invention, the method of producing the mercaptan-hardened epoxy composition comprises contacting the thiol ester composition and the epoxide composition to produce a mixture and curing the mixture to produce the mercaptan-hardened epoxy polymer. In some embodiments, the thiol ester composition and/or the epoxide composition contain a solvent. In other embodiments, heat is needed to cure the thiol ester composition and the epoxide composition. In an embodiment, including a solvent with the thiol ester composition and/or the epoxide composition lowers the temperature needed to cure the mercaptan-hardened epoxy polymer or can even allow the mercaptan-hardened epoxy polymer to cure at ambient temperature.

Generally, the thiol ester composition utilized to form the mixture can be any thiol ester composition described herein. In embodiments, the thiol ester composition can be the hydroxy thiol ester composition; alternatively, the crosslinked thiol ester composition; alternatively, the mercaptanized unsaturated ester composition; or alternatively, the mercaptanized epoxidized ester composition. In other embodiments, the thiol ester can be the mercaptanized natural source oil; alternatively, the mercaptanized epoxidized natural source oil; alternatively, the crosslinked mercaptanized natural source oil; or alternatively, the crosslinked mercaptanized epoxidized natural source oil. In further non-limiting embodiments, the thiol ester composition can be the mercaptanized soybean oil; alternatively, the mercaptanized castor oil; alternatively, the mercaptanized epoxidized soybean oil; or alternatively, the crosslinked mercaptanized soybean oil. Other thiol ester compositions are described herein and can generally be utilized to produce the mercaptan-hardened epoxy polymer compositions. Additionally, other aspects of the thiol ester materials (e.g. average number of thiol groups per thiol ester molecule, thiol sulfur content, etc.) are described herein and can be utilized to further describe the thiol ester compositions. Besides the thiol ester compositions described herein, other suitable thiol ester compositions will be apparent to those persons having ordinary skill in the art, can be used, and are to be considered within the scope of the present invention.

Generally, the epoxide composition utilized to form the mixture can comprise, singly or in any combination, any epoxide described herein. In an embodiment, the epoxide composition is a polyol glycidyl ether composition. In an aspect, the polyol glycidyl ether composition can comprise aliphatic polyol glycidyl ethers; alternatively, cycloaliphatic polyol glycidyl ethers; alternatively, aromatic glycidyl ethers; alternatively, bisphenol glycidyl ethers; or alternatively, novolak glycidyl ethers. In embodiments, the epoxide composition can comprise a trimethylolethane triglycidyl ether; alternatively, a pentaerythritol tetraglycidyl ether; alternatively, a dipentaerythritol tetraglycidyl ether; alternatively, a sorbitol tetraglycidyl ether; alternatively, a sorbitol hexaglycidyl ether; alternatively, a bisphenol A diglycidyl ether; alternatively, a bisphenol F diglycidyl ether; alternatively, a formaldehyde-phenol novolak polyglycidyl ether; alternatively, a formaldehyde-cresol novolak polyglycidyl ether; or alternatively, a formaldehyde-catechol novolak polyglycidyl ether. Other epoxide compositions are described herein and can generally be utilized to describe the polymer compositions produced from the thiol ester composition and the epoxide composition. Additionally, other aspects of the epoxide materials (e.g. number or average number of epoxide groups per epoxide molecule, etc.) are described herein and can be utilized to further describe the epoxide compositions.

Generally, the thiol ester composition and the epoxide composition are independent elements in the method of making the mercaptan-hardened epoxy polymer compositions. Therefore, the mercaptan-hardened epoxy polymer composition can be made by forming a mixture comprising any combination of the thiol ester composition described herein and the epoxide composition described herein.

In embodiments, the mercaptan-hardened epoxy polymer can be produced by forming a mixture comprising the thiol ester composition with the epoxide composition comprising an epoxide having at least two epoxide groups; or alternatively, a polyol glycidyl ether composition comprising a polyol glycidyl ether having at least two epoxide groups. In some embodiments, the mercaptan-hardened epoxy polymer composition can be produced by forming a mixture comprising the thiol ester composition with the epoxide composition comprising bisphenol diglycidyl ether or novolak polyglycidyl ether. In other embodiments, the mercaptan-hardened epoxy polymer composition can be produced by forming a mixture comprising the thiol ester composition with the epoxide composition comprising bisphenol A diglycidyl ether, bisphenol F diglycidyl ether, formaldehyde-phenol novolak polyglycidyl ether, formaldehyde-cresol novolak polyglycidyl ether, formaldehyde-catechol novolak polyglycidyl ether, or any combination thereof. In yet other embodiments, the mercaptan-hardened epoxy polymer composition can be produced by forming a mixture comprising the thiol ester composition with the epoxide composition comprising bisphenol A diglycidyl ether; alternatively, bisphenol F diglycidyl ether; alternatively, formaldehyde-phenol novolak polyglycidyl ether; alternatively, formaldehyde-cresol novolak polyglycidyl ether; or alternatively, formaldehyde-catechol novolak polyglycidyl ether.

In embodiments, the mercaptan-hardened epoxy polymer composition can be produced by forming a mixture comprising the mercaptanized unsaturated ester composition with the epoxide composition comprising an epoxide having at least two epoxide groups; or alternatively, the polyol glycidyl ether composition comprising the polyol glycidyl ether having at least two epoxide groups. In some embodiments, the mercaptan-hardened epoxy polymer composition can be produced by forming a mixture comprising the mercaptanized unsaturated ester composition with the epoxide composition comprising bisphenol diglycidyl ether or novolak polyglycidyl ether. In other embodiments, the mercaptan-hardened epoxy polymer can be produced by forming a mixture comprising the mercaptanized unsaturated ester composition with the epoxide composition comprising bisphenol A diglycidyl ether, bisphenol F diglycidyl ether, formaldehyde-phenol novolak polyglycidyl ether, formaldehyde-cresol novolak polyglycidyl ether, formaldehyde-catechol novolak polyglycidyl ether, or any combination thereof In yet other embodiments, the mercaptan-hardened epoxy polymer can be produced by forming a mixture comprising the mercaptanized unsaturated ester composition with the epoxide composition comprising bisphenol A diglycidyl ether; alternatively, bisphenol F diglycidyl ether; alternatively, formaldehyde-phenol novolak polyglycidyl ether; alternatively, formaldehyde-cresol novolak polyglycidyl ether; or alternatively, formaldehyde-catechol novolak polyglycidyl ether.

In embodiments, the mercaptan-hardened epoxy polymer can be produced by forming a mixture comprising the mercaptanized soybean oil composition with the epoxide composition comprising an epoxide having at least two epoxide groups; or alternatively, a polyol glycidyl ether composition comprising a polyol glycidyl ether having at least two epoxide groups. In some embodiments, the mercaptan-hardened epoxy polymer can be produced by forming a mixture comprising the mercaptanized soybean oil composition with the epoxide composition comprising bisphenol diglycidyl ether or novolak polyglycidyl ether. In other embodiments, the mercaptan-hardened epoxy polymer can be produced by forming a mixture comprising the mercaptanized soybean oil composition with the epoxide composition comprising bisphenol A diglycidyl ether, bisphenol F diglycidyl ether, formaldehyde-phenol novolak polyglycidyl ether, formaldehyde-cresol novolak polyglycidyl ether, formaldehyde-catechol novolak polyglycidyl ether, or any combination thereof In yet other embodiments, the mercaptan-hardened epoxy polymer can be produced by forming a mixture comprising the mercaptanized soybean oil composition with the epoxide composition comprising bisphenol A diglycidyl ether; alternatively, bisphenol F diglycidyl ether; alternatively, formaldehyde-phenol novolak polyglycidyl ether; alternatively, formaldehyde-cresol novolak polyglycidyl ether; or alternatively, formaldehyde-catechol novolak polyglycidyl ether.

In embodiments, the mercaptan-hardened epoxy polymer can be produced by forming a mixture comprising the mercaptanized castor oil composition with the epoxide composition comprising an epoxide having at least two epoxide groups; or alternatively, a polyol glycidyl ether composition comprising a polyol glycidyl ether having at least two epoxide groups. In some embodiments, the mercaptan-hardened epoxy polymer can be produced by forming a mixture comprising the mercaptanized castor oil composition with the epoxide composition comprising bisphenol diglycidyl ether or novolak polyglycidyl ether. In other embodiments, the mercaptan-hardened epoxy polymer can be produced by forming a mixture comprising the mercaptanized castor oil composition with the epoxide composition comprising bisphenol A diglycidyl ether, bisphenol F diglycidyl ether, formaldehyde-phenol novolak polyglycidyl ether, formaldehyde-cresol novolak polyglycidyl ether, formaldehyde-catechol novolak polyglycidyl ether, or any combination thereof In yet other embodiments, the mercaptan-hardened epoxy polymer can be produced by forming a mixture comprising the mercaptanized castor composition with the epoxide composition comprising bisphenol A diglycidyl ether; alternatively, bisphenol F diglycidyl ether; alternatively, formaldehyde-phenol novolak polyglycidyl ether; alternatively, formaldehyde-cresol novolak polyglycidyl ether; or alternatively, formaldehyde-catechol novolak polyglycidyl ether.

In embodiments, the mercaptan-hardened epoxy polymer can be produced by forming a mixture comprising the mercaptanized epoxidized soybean oil composition with the epoxide composition comprising an epoxide having at least two epoxide groups; or alternatively, a polyol glycidyl ether composition comprising a polyol glycidyl ether having at least two epoxide groups. In some embodiments, the mercaptan-hardened epoxy polymer can be produced by forming a mixture comprising the mercaptanized epoxidized soybean oil composition with the epoxide composition comprising bisphenol diglycidyl ether or novolak polyglycidyl ether. In other embodiments, the mercaptan-hardened epoxy polymer can be produced by forming a mixture comprising the mercaptanized epoxidized soybean oil composition with the epoxide composition comprising bisphenol A diglycidyl ether, bisphenol F diglycidyl ether, formaldehyde-phenol novolak polyglycidyl ether, formaldehyde-cresol novolak polyglycidyl ether, formaldehyde-catechol novolak polyglycidyl ether, or any combination thereof In yet other embodiments, the mercaptan-hardened epoxy polymer can be produced by forming a mixture comprising the mercaptanized epoxidized soybean oil composition with the epoxide composition comprising bisphenol A diglycidyl ether; alternatively, bisphenol F diglycidyl ether; alternatively, formaldehyde-phenol novolak polyglycidyl ether; alternatively, formaldehyde-cresol novolak polyglycidyl ether; or alternatively, formaldehyde-catechol novolak polyglycidyl ether.

In embodiments, the mercaptan-hardened epoxy polymer can be produced by forming a mixture comprising the crosslinked mercaptanized soybean oil composition with the epoxide composition comprising an epoxide having at least two epoxide groups; or alternatively, a polyol glycidyl ether composition comprising a polyol glycidyl ether having at least two epoxide groups. In some embodiments, the mercaptan-hardened epoxy polymer can be produced by forming a mixture comprising the crosslinked mercaptanized soybean oil composition with the epoxide composition comprising bisphenol diglycidyl ether or novolak polyglycidyl ether. In other embodiments, the mercaptan-hardened epoxy polymer can be produced by forming a mixture comprising a crosslinked mercaptanized soybean oil composition with the epoxide composition comprising bisphenol A diglycidyl ether, bisphenol F diglycidyl ether, formaldehyde-phenol novolak polyglycidyl ether, formaldehyde-cresol novolak polyglycidyl ether, formaldehyde-catechol novolak polyglycidyl ether, or any combination thereof In yet other embodiments, the mercaptan-hardened epoxy polymer can be produced by forming a mixture comprising the crosslinked mercaptanized soybean oil composition with the epoxide composition comprising a bisphenol A diglycidyl ether; alternatively, bisphenol F diglycidyl ether; alternatively, formaldehyde-phenol novolak polyglycidyl ether; alternatively, formaldehyde-cresol novolak polyglycidyl ether; or alternatively, formaldehyde-catechol novolak polyglycidyl ether.

In an aspect, the mixture further comprises a catalyst. In embodiments, the catalyst can be contacted with the mixture comprising the thiol ester composition and the epoxide composition. In other embodiments, the catalyst can be added to the thiol ester composition prior to contacting the thiol ester composition with the epoxide composition. In yet other embodiments, the catalyst can be a component of the thiol ester composition.

In embodiments, the catalyst can be an amine. In some embodiments, the catalyst is a primary amine; alternatively, a secondary amine; or alternatively, a tertiary amine. In other embodiments the catalyst can be aliphatic amine; or alternatively, an aromatic amine. In other embodiments, the catalyst can be a polyetheramine; or alternatively, a polyalkylene amine. In yet other embodiments, the amine catalyst can be a polyamine comprising at least two amine groups. In some amine catalyst embodiments, the catalyst can be 1,8-diazabicyclo[5,4,0]undec-7-ene [DBU—CAS#6674-22-2]; alternatively, 1,4-diazabicyclo[2.2.2]octane [DABCO—CAS#280-57-9]); or alternatively, triethylamine. Alternatively, a phenolic catalyst can be utilized. Generally, the class of phenolic catalyst comprises material having at least one hydroxy group attached to a carbon atom of a benzene ring. Non-limiting examples of phenolic catalysts, include phenol, resorcinol catechol, 1,4-benzenediol, resorcinol monobenzoate, and their substituted derivatives. Persons of ordinary skill in the art will readily know other suitable phenolic catalysts that can be used in the present invention.

In some applications it can be advantageous catalyze the formation of the mercaptan-hardened epoxy composition by the application of ultraviolet radiation (ultraviolet light). In an embodiment, the catalyst can be a compound that produces a Lewis acid when exposed to (irradiated with) ultraviolet radiation (light). Generally, these ultraviolet initiation catalysts comprise a catalytic-effective amount of at least one ionic salt of an organometallic complex cation selected from elements of Periodic Table Groups IVB, VB, VIB, VIIB, and VIII. In an embodiment, the ionic salts having the formula:

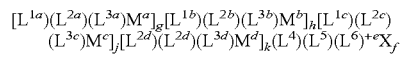

wherein $M^a$, $M^b$, $M^c$, and $M^d$ represent metal atoms that can be the same or different selected from the elements of periodic Groups IVB, VB, VIB, VIIB, and VIII; L represents the attendant ligands; e is an integer having a value of 1, 2, or 3, which is the residual electrical charge of the complex cation; X is a halogen-containing complex anion of a metal or metalloid; f is an integer of 1 to 3 and represents the number of complex anions required to neutralize the charge e on the complex cation; and g, h, j, and k independently are 0 or 1, with at least one of them being equal to 1. The photoinitiator can be a mononuclear, binuclear, trinuclear or tetranuclear complex compound comprising the metallic atoms and the attendant ligands, L. The ligands can be any compound having an accessible unsaturated group, e.g., an ethylenic group, an acetylenic group, or an aromatic group, which have π-electrons regardless of the total molecular weight of the compound. Applicable compounds are further described in U.S. Pat. No. 5,089,536 (which is incorporated herein by reference) and the references therein. Useful compounds include, but are not limited to, cyclopentadienyl iron (II) hexafluoroantimonate, cyclopentadienyl iron (II) hexafluorophosphonate, cyclopentadienyl iron (II) hexafluoroarsenate, cumene-cyclopentadienyl iron(II) hexafluorophosphate, xylene-cyclopentadienyl iron(II)-tris(trifluoromethylsulfonyl) methide and the like. Other suitable types of catalysts useful in the present invention will be apparent to those of ordinary skill in the art and are to be considered within the scope of the present invention.

Generally, the catalyst is utilized when the mixture comprising the thiol ester composition and the epoxide does not cure under the desired conditions. In embodiments, the catalyst can comprise less than 10 weight percent of the mixture. In other embodiments, the catalyst comprises from 1 to 10 percent by weight of the mixture. Alternatively, when the catalyst is combined with the thiol ester composition prior to contacting the thiol ester composition with the epoxide composition, the catalyst can comprise less than 20 percent by weight of the thiol ester composition. In other embodiments, the catalyst can comprise from 1 to 20 percent by weight of the thiol ester composition. The amount of the ultraviolet initiation catalysts range generally from 0.05 to 10.0 parts by weight; alternatively, from 0.075 to 7.0 parts by weight; alternatively, from 0.1 to 4.0 parts by weight; or alternatively, from 1.0 to 2.5 parts by weight. The amount of the ultraviolet initiation catalysts range is based upon 100 parts by weight of the epoxy resin.

In an aspect, the method of making the mercaptan-hardened epoxy polymer comprises curing the mixture at a temperature ranging from 0° C. to 100° C. In embodiments; the mixture is cured at a temperature ranging from 5° C. to 80° C.; alternatively, ranging from 10° C. to 60° C.; or alternatively, ranging from 10° C. to 40° C. In some embodiments, the mixture can be cured at about ambient temperature. Other suitable curing profiles are described in the Example section herein.

In an aspect, the thiol ester composition and the epoxide composition are contacted at a mercaptan to epoxide molar ratio ranging from 0.8 to 1.15. In other embodiments, the thiol ester composition and the epoxide composition are contacted at a mercaptan to epoxide molar ratio ranging from 0.9 to 1.10; or alternatively, from 0.95 to 1.05. In further embodiments, the thiol ester composition and the epoxide composition are contacted at a mercaptan to epoxide molar ratio of about 1.

When the thiol ester composition further comprises a hydroxy (or alcohol group) both the mercaptan group and the hydroxy group can react with the epoxide group. One of ordinary skill in the art realizes that, in this situation, both the mercaptan group and the hydroxy group can react with the epoxide group, but generally, recognizes that the thiol group is more reactive than the hydroxy group. Thus, the mercaptan-hardened epoxy polymer can be formed by contacting the thiol ester composition and the epoxide composition in a molar ratio based upon the mercaptan to epoxide molar ratio or based upon the mercaptan plus hydroxy to epoxide molar ratio (i.e. SH+OH:epoxide molar ratio or XH:epoxide molar ratio). In some embodiments when the thiol ester composition further comprises a hydroxy group (e.g. mercaptanized epoxidized natural source oil, mercaptanized epoxidized soybean oil, or mercaptanized castor oil, among others), the thiol ester composition and the epoxide composition are contacted at a mercaptan to epoxide molar ratio ranging from 0.8 to 1.15; alternatively, from 0.9 to 1.10; or alternatively, from 0.95 to 1.05. In other embodiments when the thiol ester composition further comprises a hydroxy group, the thiol ester composition and the epoxide composition are contacted at a mercaptan plus hydroxy to epoxide molar ratio ranging from 0.6 to 1.20; alternatively, from 0.8 to 1.15; alternatively, from 0.9 to 1.10; or alternatively, from 0.95 to 1.05.

Generally, the solvent is utilized when the mixture comprising the thiol ester composition and the epoxide does not cure under the desired conditions. In embodiments, the solvent has similar polarity and viscosity properties to those of the thiol ester compositions. In an aspect, the solvents have relatively low vapor pressures. In some embodiments, the solvents have vapor pressures greater than 1 mm Hg at 20° C. In some embodiments, the solvent is selected from the group consisting of alcohols, esters, ethers, ketones, aromatic hydrocarbons, hydrocarbons, and combinations thereof. In an embodiment the solvent is an alcohol; alternatively, an ester; alternatively, an ether; alternatively, an aromatic hydrocarbon; or alternatively, a hydrocarbon. The alcohol solvent can be any alcohol having a vapor pressure greater than 1 mm Hg at 20° C., such as methanol, ethanol, 1-propanol, 2-propanol (isopropanol), 1-butanol, 2-butanol, 2-methyl-1-propanol (isobutyl alcohol), 2-methyl-2-proanol(tert-butanol), 1-pentanol, 2-pentanol, or combinations thereof. The ester solvent can be any ester having a vapor pressure greater than 1 mm Hg at 20° C., such as methyl acetate, ethyl acetate, n-propyl acetate, isopropyl acetate, n-butyl acetate, or combinations thereof. The ether solvent can be any ether having a vapor pressures greater than 1 mm Hg at 20° C., such as dimethyl ether, methyl ethyl ether, diethyl ether, diisopropyl ether, dibutyl ether, or combinations thereof. The ketone solvent can be any ketone having a vapor pressures greater than 1 mm Hg at 20° C., such as acetone, 2-butanone(methyl ethyl ketone), 3-methyl-2-butanone, 2-pentanone, 3-pentanone, 4-methyl-2-pentanone(methyl isobutyl ketone), or combinations thereof. The aromatic solvent can be any aromatic hydrocarbon having a vapor pressures greater than 1 mm Hg at 20° C., such as toluene, xylene(ortho, meta, para or mixtures thereof), or combinations thereof. The hydrocarbon solvent can be any hydrocarbon having a vapor pressure greater than 1 mm Hg at 20° C., such as pentane, hexane(s), cyclohexane, heptane(s), octane, or combinations thereof. In some embodiments, the solvent can contain two or more functional groups, e.g. butoxy ethanol, diacetone alcohol, or cellosolve acetate, among others. In an aspect, the solvent can be n-butanol, butoxy ethanol, diacetone alcohol, or combinations thereof. In some embodiments, the solvent is selected from the group consisting of n-butanol, n-butyl acetate, xylene, MIBK (methyl isobutyl ketone), acetone, n-butyl acetate, butoxy ethanol, diacetone alcohol, MIBK/toluene, cellosolve acetate, and combinations thereof. Other suitable solvents will be apparent to those of skill in the art and are to be considered within the scope of the present invention.

Process of Making an Adhesive Mercaptan-Crosslinked Epoxy Composition

In an aspect, the present invention provides for a method of making an adhesive polymer composition. In embodiments, the adhesive polymer composition is an adhesive mercaptan-crosslinked epoxy composition. In some embodiments, the method of making the adhesive polymer composition comprises contacting a thiol ester composition and an epoxide composition to form a mixture. In yet other embodiments of the present invention, the method of producing the adhesive polymer composition comprises contacting the thiol ester composition and the epoxide composition to produce a mixture and curing the mixture to produce the adhesive polymer. In further the embodiments, a catalyst is added to the mixture or is added to the thiol ester composition prior contacting the thiol ester composition and the epoxide composition. In some embodiments, the thiol ester composition and/or the epoxide composition can comprise any solvent described herein for producing the mercaptan-hardened epoxy polymer.

Generally, the thiol ester composition can be any hydroxy thiol ester composition described herein. In an embodiment, the thiol ester composition can be a hydroxy thiol ester composition; or alternatively, a crosslinked thiol ester composition. In some embodiments, the thiol ester composition comprises a mercaptanized unsaturated ester; or alternatively, a mercaptanized natural source oil. In some non-limiting embodiments, the mercaptanized natural source oil can be mercaptanized soybean oil; or alternatively, mercaptanized castor oil. In some embodiments, the hydroxy thiol ester composition comprises a mercaptanized epoxidized ester composition; alternatively, a mercaptanized epoxidized natural source oil. In other embodiments, the hydroxy thiol ester composition comprises mercaptanized epoxidized soybean oil, mercaptanized castor oil, or mixtures thereof In yet other embodiments, the hydroxy thiol ester composition comprises mercaptanized epoxidized soybean oil; or alternatively, mercaptanized castor oil. In an embodiment, the crosslinked thiol ester composition comprises a crosslinked mercaptanized unsaturated ester; alternatively, a crosslinked mercaptanized natural source oil; alternatively, a crosslinked mercaptanized epoxidized ester composition; or alternatively, a crosslinked mercaptanized epoxidized natural source oil. In some non-limiting embodiments, the crosslinked thiol ester composition can be crosslinked mercaptanized soybean oil; alternatively, crosslinked mercaptanized castor oil; or alternatively, crosslinked mercaptanized epoxidized soybean oil. Additional properties of the thiol ester compositions and/or the thiol ester molecules (e.g. number or average number of thiol groups per thiol ester molecule, weight percent thiol sulfur, among others), hydroxy thiol ester compositions and/or hydroxy thiol ester molecules (e.g. thiol to hydroxy molar ratio, number or average number of thiol groups per hydroxy thiol ester molecule, weight percent thiol sulfur, among others), and crosslinked thiol ester composition and/or the crosslinked thiol ester molecules (e.g. number or average number of thiol groups per crosslinked thiol ester molecule, weight percent thiol sulfur, among others) are described herein and are generally appropriate to further describe the applicable thiol ester compositions.

Generally, the epoxide composition utilized to form the mixture for the mercaptan-crosslinked epoxy adhesive comprises an epoxide having at least two epoxide groups; or alternatively, comprises epoxide molecules having an average of at least two epoxide groups per epoxide molecule. In embodiments, the epoxide composition utilized to form the mixture for the mercaptan-crosslinked epoxy adhesive can be a glycidyl ether composition comprising a glycidyl ether having at least two glycidyl ether groups; or alternatively, comprising glycidyl ether molecules having an average of at least two glycidyl ether groups per glycidyl ether molecule. In embodiments, the glycidyl ether composition can comprise a polyol glycidyl ether, a bisphenol diglycidyl ether, or a novolak polyglycidyl ether. In some embodiments, the adhesive polymer can be produced by forming a mixture comprising a thiol ester composition with a glycidyl ether composition comprising a bisphenol diglycidyl ether. In embodiments, the bisphenol diglycidyl ether can be bisphenol A diglycidyl ether, bisphenol F diglycidyl ether, or a combination thereof. In other embodiments, the bisphenol diglycidyl ether can be bisphenol A diglycidyl ether; or alternatively, a bisphenol F diglycidyl ether. Additional properties of the epoxide compositions, epoxide molecules, glycidyl ether compositions, and/or glycidyl ether molecules (e.g. number of epoxide groups, average number of epoxide groups per epoxide molecule, number of glycidyl ether groups, average number of glycidyl ether groups per glycidyl ether, among others) are described herein and are generally appropriate to further describe the applicable hydroxy thiol ester compositions.

The thiol ester composition and the epoxide composition are independent elements in the method of making the mercaptan-crosslinked epoxy adhesive compositions. Therefore, the mercaptan-crosslinked epoxy adhesive compositions can be produced by forming a mixture comprising any combination of the thiol ester composition described herein and the epoxide composition described herein.

In embodiments, the mercaptan-crosslinked epoxy adhesive can be produced by forming a mixture comprising a thiol ester composition with an epoxide composition comprising an epoxide having at least two epoxide groups; alternatively, comprises epoxide molecules having an average of at least two epoxide groups per epoxide molecule; alternatively, a polyol glycidyl ether composition comprising a polyol glycidyl ether having at least two glycidyl ether groups; or alternatively, comprising glycidyl ether molecules having an average of at least two glycidyl ether groups per epoxide molecule. In some embodiments, the mercaptan-crosslinked epoxy adhesive can be produced by forming a mixture comprising a thiol ester composition with a glycidyl ether composition comprising a polyol glycidyl ether; alternatively, a bisphenol diglycidyl ether; or alternatively, a novolak polyglycidyl ether. In other embodiments, the mercaptan-crosslinked epoxy adhesive can be produced by forming a mixture comprising a thiol ester composition with a glycidyl ether composition comprising bisphenol A diglycidyl ether, bisphenol F diglycidyl ether, or any combination thereof. In yet other embodiments, the mercaptan-crosslinked epoxy adhesive can be produced by forming a mixture comprising a thiol ester composition with a glycidyl ether composition comprising bisphenol A diglycidyl ether or bisphenol F diglycidyl ether.

In embodiments, the mercaptan-crosslinked epoxy adhesive can be produced by forming a mixture comprising a mercaptanized unsaturated ester composition with an epoxide composition comprising an epoxide having at least two epoxide groups; alternatively, comprises epoxide molecules having an average of at least two epoxide groups per epoxide molecule; alternatively, a polyol glycidyl ether composition comprising a polyol glycidyl ether having at least two glycidyl ether groups; or alternatively, comprising glycidyl ether molecules having an average of at least two glycidyl ether groups per epoxide molecule. In some embodiments, the mercaptan-crosslinked epoxy adhesive can be produced by forming a mixture comprising a mercaptanized unsaturated ester composition with a glycidyl ether composition comprising a polyol glycidyl ether; alternatively, a bisphenol diglycidyl ether; or alternatively, a novolak polyglycidyl ether. In other embodiments, the mercaptan-crosslinked epoxy adhesive can be produced by forming a mixture comprising a mercaptanized unsaturated ester composition with a glycidyl ether composition comprising bisphenol A diglycidyl ether, bisphenol F diglycidyl ether, or any combination thereof In yet other embodiments, the mercaptan-crosslinked epoxy adhesive can be produced by forming a mixture comprising a mercaptanized unsaturated thiol ester composition with a glycidyl ether composition comprising bisphenol A diglycidyl ether or bisphenol F diglycidyl ether.

In embodiments, the mercaptan-crosslinked epoxy adhesive can be produced by forming a mixture comprising a mercaptanized natural source oil composition with an epoxide composition comprising an epoxide having at least two epoxide groups; alternatively, comprises epoxide molecules having an average of at least two epoxide groups per epoxide molecule; alternatively, a polyol glycidyl ether composition comprising a polyol glycidyl ether having at least two glycidyl ether groups; or alternatively, comprising glycidyl ether molecules having an average of at least two glycidyl ether groups per epoxide molecule. In some embodiments, the mercaptan-crosslinked epoxy adhesive can be produced by forming a mixture comprising a mercaptanized natural source oil composition with a glycidyl ether composition comprising a polyol glycidyl ether; alternatively, a bisphenol diglycidyl ether; or alternatively, a novolak polyglycidyl ether. In other embodiments, the mercaptan-crosslinked epoxy adhesive can be produced by forming a mixture comprising a mercaptanized natural source oil composition with a glycidyl ether composition comprising bisphenol A diglycidyl ether, bisphenol F diglycidyl ether, or any combination thereof. In yet other embodiments, the mercaptan-crosslinked epoxy adhesive can be produced by forming a mixture comprising a mercaptanized natural source oil composition with a glycidyl ether composition comprising bisphenol A diglycidyl ether or bisphenol F diglycidyl ether.

In embodiments, the mercaptan-crosslinked epoxy adhesive can be produced by forming a mixture comprising a mercaptanized soybean oil composition with an epoxide composition comprising an epoxide having at least two epoxide groups; alternatively, comprises epoxide molecules having an average of at least two epoxide groups per epoxide molecule; alternatively, a polyol glycidyl ether composition comprising a polyol glycidyl ether having at least two glycidyl ether groups; or alternatively, comprising glycidyl ether molecules having an average of at least two glycidyl ether groups per epoxide molecule. In some embodiments, the mercaptan-crosslinked epoxy adhesive can be produced by forming a mixture comprising a mercaptanized soybean oil composition with a glycidyl ether composition comprising a polyol glycidyl ether; alternatively, a bisphenol diglycidyl ether; or alternatively, a novolak polyglycidyl ether. In other embodiments, the mercaptan-crosslinked epoxy adhesive can be produced by forming a mixture comprising a mercaptanized soybean oil composition with a glycidyl ether composition comprising bisphenol A diglycidyl ether, bisphenol F diglycidyl ether, or any combination thereof In yet other embodiments, the mercaptan-crosslinked epoxy adhesive can be produced by forming a mixture comprising a mercaptanized soybean oil composition with a glycidyl ether composition comprising bisphenol A diglycidyl ether or bisphenol F diglycidyl ether.

In embodiments, the mercaptan-crosslinked epoxy adhesive can be produced by forming a mixture comprising a hydroxy thiol ester composition with an epoxide composition comprising an epoxide having at least two epoxide groups; alternatively, comprises epoxide molecules having an average of at least two epoxide groups per epoxide molecule; alternatively, a polyol glycidyl ether composition comprising a polyol glycidyl ether having at least two glycidyl ether groups; or alternatively, comprising glycidyl ether molecules having an average of at least two glycidyl ether groups per epoxide molecule. In some embodiments, the mercaptan-crosslinked epoxy adhesive can be produced by forming a mixture comprising a hydroxythiol ester composition with a glycidyl ether composition comprising a polyol glycidyl ether; alternatively, a bisphenol diglycidyl ether; or alternatively, a novolak polyglycidyl ether. In other embodiments, the mercaptan-crosslinked epoxy adhesive polymer can be produced by forming a mixture comprising a hydroxythiol ester composition with a glycidyl ether composition comprising bisphenol A diglycidyl ether, bisphenol F diglycidyl ether, or any combination thereof. In yet other embodiments, the mercaptan-crosslinked epoxy adhesive can be produced by forming a mixture comprising a hydroxy thiol ester composition with a glycidyl ether composition comprising bisphenol A diglycidyl ether or bisphenol F diglycidyl ether.

In embodiments, the mercaptan-crosslinked epoxy adhesive can be produced by forming a mixture comprising a mercaptanized epoxidized ester with an epoxide composition comprising an epoxide having at least two epoxide groups; alternatively, comprises epoxide molecules having an average of at least two epoxide groups per epoxide molecule; alternatively, a polyol glycidyl ether composition comprising a polyol glycidyl ether having at least two glycidyl ether groups; or alternatively, comprising glycidyl ether molecules having an average of at least two glycidyl ether groups per epoxide molecule. In some embodiments, the mercaptan-crosslinked epoxy adhesive can be produced by forming a mixture comprising a mercaptanized epoxidized ester composition with a glycidyl ether composition comprising a polyol glycidyl ether; alternatively, a bisphenol diglycidyl ether; or alternatively, a novolak polyglycidyl ether. In other embodiments, the mercaptan-crosslinked epoxy adhesive can be produced by forming a mixture comprising a mercaptanized epoxidized ester composition with a glycidyl ether composition comprising bisphenol A diglycidyl ether, bisphenol F diglycidyl ether, or any combination thereof. In yet other embodiments, the mercaptan-crosslinked epoxy adhesive can be produced by forming a mixture comprising a mercaptanized epoxidized ester composition with a glycidyl ether composition comprising bisphenol A diglycidyl ether or bisphenol F diglycidyl ether.

In embodiments, the mercaptan-crosslinked epoxy adhesive can be produced by forming a mixture comprising a mercaptanized epoxidized natural source oil with an epoxide composition comprising an epoxide having at least two epoxide groups; alternatively, comprises epoxide molecules having an average of at least two epoxide groups per epoxide molecule; alternatively, a polyol glycidyl ether composition comprising a polyol glycidyl ether having at least two glycidyl ether groups; or alternatively, comprising glycidyl ether molecules having an average of at least two glycidyl ether groups per epoxide molecule. In some embodiments, the mercaptan-crosslinked epoxy adhesive can be produced by forming a mixture comprising a mercaptanized epoxidized natural source oil with a glycidyl ether composition comprising a polyol glycidyl ether; alternatively, a bisphenol diglycidyl ether; or alternatively, a novolak polyglycidyl ether. In other embodiments, the mercaptan-crosslinked epoxy adhesive can be produced by forming a mixture comprising a mercaptanized epoxidized natural source oil composition with a glycidyl ether composition comprising bisphenol A diglycidyl ether, bisphenol F diglycidyl ether, or any combination thereof. In yet other embodiments, the mercaptan-crosslinked epoxy adhesive can be produced by forming a mixture comprising a mercaptanized epoxidized natural source oil composition with a glycidyl ether composition comprising bisphenol A diglycidyl ether or bisphenol F diglycidyl ether.

In embodiments, the mercaptan-crosslinked epoxy adhesive can be produced by forming a mixture comprising a mercaptanized epoxidized soybean oil with epoxide composition comprising an epoxide having at least two epoxide groups; alternatively, comprises epoxide molecules having an average of at least two epoxide groups per epoxide molecule; alternatively, a polyol glycidyl ether composition comprising a polyol glycidyl ether having at least two glycidyl ether groups; or alternatively, comprising glycidyl ether molecules having an average of at least two glycidyl ether groups per epoxide molecule. In some embodiments, the mercaptan-crosslinked epoxy adhesive can be produced by forming a mixture comprising a mercaptanized epoxidized soybean oil composition with a glycidyl ether composition comprising a polyol glycidyl ether; alternatively, a bisphenol diglycidyl ether; or alternatively, a novolak polyglycidyl ether. In other embodiments, the mercaptan-crosslinked epoxy adhesive can be produced by forming a mixture comprising a mercaptanized epoxidized soybean oil composition with a glycidyl ether composition comprising bisphenol A diglycidyl ether, bisphenol F diglycidyl ether, or any combination thereof. In yet other embodiments, the mercaptan-crosslinked epoxy adhesive can be produced by forming a mixture comprising a mercaptanized epoxidized soybean oil composition with a glycidyl ether composition comprising bisphenol A diglycidyl ether or bisphenol F diglycidyl ether.

In embodiments, the mercaptan-crosslinked epoxy adhesive can be produced by forming a mixture comprising a mercaptanized castor oil with an epoxide composition comprising an epoxide having at least two epoxide groups; alternatively, comprises epoxide molecules having an average of at least two epoxide groups per epoxide molecule; alternatively, a polyol glycidyl ether composition comprising a polyol glycidyl ether having at least two glycidyl ether groups; or alternatively, comprising glycidyl ether molecules having an average of at least two glycidyl ether groups per epoxide molecule. In some embodiments, the mercaptan-crosslinked epoxy adhesive can be produced by forming a mixture comprising a mercaptanized castor oil composition with a glycidyl ether composition comprising a polyol glycidyl ether; alternatively, a bisphenol diglycidyl ether; or alternatively, a novolak polyglycidyl ether. In other embodiments, the mercaptan-crosslinked epoxy adhesive can be produced by forming a mixture comprising a mercaptanized castor oil composition with a glycidyl ether composition comprising bisphenol A diglycidyl ether, bisphenol F diglycidyl ether, or any combination thereof. In yet other embodiments, the mercaptan-crosslinked epoxy adhesive can be produced by forming a mixture comprising a mercaptanized castor oil composition with a glycidyl ether composition comprising bisphenol A diglycidyl ether or bisphenol F diglycidyl ether.

In an aspect, the mixture further comprises a catalyst. In embodiments, the catalyst can be contacted with the mixture comprising the thiol ester composition and the epoxide composition. In other embodiments, the catalyst can be added to the thiol ester composition prior to contacting the thiol ester composition with the epoxide composition. In yet other embodiments, the catalyst can be a component of the thiol ester composition.

In embodiments, the catalyst can be an amine. In some embodiments, the catalyst is a primary amine; alternatively, a secondary amine; or alternatively, a tertiary amine. In other embodiments, the catalyst can be aliphatic amine; or alternatively, an aromatic amine. In other embodiments, the catalyst can be a polyetheramine; or alternatively, a polyalkylene amine. In yet other embodiments, the amine catalyst can be a polyamine comprising at least two amine groups. In some amine catalyst embodiments, the catalyst can be 1,8-diazabicyclo[5,4,0]undec-7-ene [DBU—CAS#6674-22-2]; alternatively, 1,4-diazabicyclo[2.2.2]octane [DABCO—CAS#280-57-9]); or alternatively, triethylamine. Alternatively, a phenolic catalyst can be utilized. Generally, the class of phenolic catalyst comprises material having at least one hydroxy group attached to a carbon atom of a benzene. Non-limiting examples of phenolic catalysts, include phenol, resorcinol catechol, 1,4-benzenediol, resorcinol monobenzoate, and their substituted derivatives. Persons of ordinary skill in the art will readily know other useful phenolic catalysts. In other embodiments, the catalyst can be a compound that produces a Lewis acid when exposed to (irradiated with) ultraviolet radiation (light) as described herein.

Generally, the catalyst is utilized when the mixture comprising the thiol ester composition and the epoxide does not cure under the desired conditions. In embodiments, the catalyst can comprise less than 10 weight percent of the mixture. In other embodiments, the catalyst comprises from 1 to 10 percent by weight of the mixture. Alternatively, when the catalyst is combined with the thiol ester composition prior to contacting the thiol ester composition with the epoxide composition, the catalyst can comprise less than 20 percent by weight of the thiol ester composition. In other embodiments, the catalyst can comprise from 1 to 20 percent by weight of the thiol ester composition. The amount of the ultraviolet initiation catalysts range generally from 0.05 to 10.0 parts by weight; alternatively, from 0.075 to 7.0 parts by weight; alternatively, from 0.1 to 4.0 parts by weight; or alternatively, from 1.0 to 2.5 parts by weight. The amount of the ultraviolet initiation catalysts range is based upon 100 parts by weight of the epoxy resin.

In embodiments, the adhesive polymer composition is produced by contacting the thiol ester composition and the epoxide composition at a molar ratio ranging from 0.8 to 1.15. In other embodiments, the adhesive polymer composition is produced by contacting the thiol ester composition and the epoxide composition at a molar ratio ranging from 0.9 to 1.10; or alternatively, from 0.95 to 1.05. In further embodiments, the adhesive polymer composition is produced by contacting the thiol ester composition and the epoxide composition at a molar ratio of about 1.

In some adhesive polymer composition embodiments, the thiol ester composition further can comprise a hydroxy (or alcohol group) in addition to the mercaptan group. One of ordinary skill in the art realizes that, in this situation, both the mercaptan group and the hydroxy group can react with the epoxide group, but generally, recognizes that the thiol group is more reactive than the hydroxy group. Thus, the adhesive polymer composition can be formed by contacting the thiol ester composition and the epoxide composition in a molar ratio based upon the mercaptan to epoxide molar ratio or based upon the mercaptan plus hydroxy to epoxide molar ratio (i.e. SH+OH:epoxide molar ratio or XH:epoxide molar ratio). In some embodiments when the thiol ester composition further comprises a hydroxy group (e.g. mercaptanized epoxidized natural source oil, mercaptanized epoxidized soybean oil, or mercaptanized castor oil, among others), the adhesive polymer composition is produced by contacting the thiol ester composition and the epoxide composition at a mercaptan to epoxide molar ratio ranging from 0.8 to 1.15; alternatively, from 0.9 to 1.10; or alternatively, from 0.95 to 1.05. In other embodiments when the thiol ester composition further comprises a hydroxy group, the adhesive polymer composition is produced by contacting the thiol ester composition and the epoxide composition at a mercaptan plus hydroxy to epoxide molar ratio ranging from 0.6 to 1.20; alternatively, from 0.8 to 1.15; alternatively, from 0.9 to 1.10; or alternatively, from 0.95 to 1.05.

In an aspect, the method of making the mercaptan-hardened epoxy polymer comprises curing the mixture at a temperature ranging from 0° C. to 100° C. In embodiments; the mixture is cured at a temperature ranging from 5° C. to 80° C.; alternatively, ranging from 10° C. to 60° C.; or alternatively, ranging from 10° C. to 40° C. In some embodiments, the mixture can be cured at about ambient temperature. Other suitable curing profiles are described in the Example section herein.

Process of using the Adhesive Mercaptan-Crosslinked Epoxy Polymer Composition

Adhesives can be used to secure or attach various substrates together. As an example, the adhesive composition of present invention can be used to bond together two substrates. To bond the two substrates together, the adhesive composition is applied onto a surface of a first substrate. Once the adhesive composition has been placed on the surface of the first substrate, a surface of a second substrate is affixed or joined in an abutting relationship with the composition-applied surface of the first substrate to form an assembly. At this point, the assembly will have three layers, namely the first substrate, the adhesive composition, followed by the second substrate. A pressure is then applied and maintained on the assembly in a joined relationship for a time sufficient to allow the adhesive composition to cure. Once the composition has cured, the pressure can be removed. Once the pressure is removed, the assembly will stay intact until a force is applied to it that surpasses the bonding strength (adhesive and/or cohesive) of the cured adhesive composition.

In some embodiments, it can be beneficial to allow the adhesive composition to at least partially cure prior to joining the composition-applied surface of the first substrate and the surface of the second substrate together. Once the adhesive composition is applied to the surface of the first substrate, i.e. to form a first composition-applied surface, the surface of the second substrate is not affixed to the surface of the first substrate until after a time period sufficient to allow the composition to at least partially cure has lapsed.

In some aspects, it can be beneficial to add the adhesive composition to the surface of both substrates. For example, the adhesive composition can be added onto the surface of the second substrate, i.e. to form a second composition-applied surface, prior to joining the first composition-applied surface to the surface of the second substrate. In an aspect, it can be beneficial to allow the composition to at least partially cure on the surfaces of both substrates prior to joining the first composition-applied surface and the second composition-applied surface. After a time period sufficient to allow the composition to at least partially cure has lapsed, the two substrates can be joined as described.

The adhesive composition of the present invention can be used to adhere various types of substrates together. In some embodiments, the two substrates comprise the same material; or alternatively, the two substrates are different materials. In some embodiments, the two substrates to be adhered together can be metal. In an embodiment, the metal can be aluminum, carbon steel, and the like. Other suitable uses of adhesive materials will be apparent to those persons having ordinary skill in the art and are to be considered within the scope of the present invention. For example, it is believed that the bonding methods described herein can be used on ceramics, glass, and other suitable substrates, as will be apparent to those of skill in the art.

Although the examples described herein refer to bonding two substrates together, two or more substrates can be used and bonded together, as will be understood by those of skill in the art. As another variation, different types of adhesives and substrates can be used in conjunction with the adhesive compositions and substrates described herein. Other suitable variations will be apparent to those of skill in the art and are to be considered within the scope of the present invention.

Method of Bonding Two Substrates

In an aspect, the compositions described herein can be utilized to bond two substrates. In an embodiment, the method of bonding two substrates comprises separately applying a thiol ester composition and an epoxide composition onto the surface of a first substrate, joining a surface of the second substrate in an abutting relationship with the applied surface of the first substrate to form an assembly. In some embodiments, the thiol ester composition and the epoxide composition are mixed on the surface of the substrate(s). In other embodiments, the thiol ester composition and the epoxide composition are mixed just prior to application to the surface of the substrate(s). Once the assembly is formed, the assembly comprises three layers, namely the first substrate, the adhesive composition, followed by the second substrate. A pressure is then applied and maintained on the assembly in a joined relationship for a time sufficient to allow the adhesive composition to cure. Once the adhesive composition has cured, the pressure can be removed. Once the pressure is removed, the assembly will stay intact until a force is applied to it that surpasses the bonding strength (adhesive and/or cohesive) of the cured adhesive composition.

In some embodiments, it can be beneficial to allow the adhesive composition comprising the thiol ester composition and the epoxide composition to at least partially cure prior to joining the applied surface of the first substrate and the surface of the second substrate together. Once the thiol ester composition and the epoxide composition are applied to the surface of the first substrate, the surface of the second substrate is not affixed to the surface of the first substrate until after a time period sufficient to allow the composition to at least partially cure has lapsed.

In some aspects, it can be beneficial to add the thiol ester composition and the epoxide composition to the surface of both substrates. For example, the thiol ester composition and the epoxide composition can be added onto the surface of the second substrate prior to joining the applied surface of the first substrate to the applied surface of the second substrate. In some embodiments, the thiol ester composition and the epoxide composition are mixed on the surface of the one or more of the substrates. In other embodiments, the thiol ester composition and the epoxide composition are mixed just prior to application to the surface of one or more of the substrates. In an aspect, it can be beneficial to allow the adhesive composition on one or both of the applied surfaces to at least partially cure prior to joining the applied surface of the first substrate and the applied surface of the second substrate. After a time period sufficient to allow the adhesive composition to at least partially cure has lapsed, the two substrates can be joined as described.

In other embodiments, the method of bonding two substrates comprises applying a thiol ester composition onto the surface of a first substrate, applying an epoxide composition onto the surface of a second substrate, joining the applied surface of the first substrate to the applied surface of the second substrate in an abutting relationship to form an assembly. The thiol ester composition and the epoxide composition form an adhesive composition. Once the assembly is formed, the assembly comprises three layers, namely the first substrate, the adhesive composition, followed by the second substrate. A pressure is then applied and maintained on the assembly in a joined relationship for a time sufficient to allow the adhesive composition to cure. Once one or both of the compositions has cured, the pressure can be removed. Once the pressure is removed, the assembly will stay intact until a force is applied to it that surpasses the bonding strength of the cured adhesive composition.

The methods of bonding two substrates together described herein can be used to adhere various types of substrates together. In an embodiment, the two substrates to be adhered together can be metal. For example, the metal can be aluminum, carbon steel, and the like. In some embodiments, the two substrates are the same material; or alternatively, the two substrates are different materials. It is believed that the bonding methods described herein can be used on other substrates, besides metals. For example, it is believed that the bonding methods can be used on ceramics, glass, and other suitable substrates that will be apparent to those of skill in the art.

As previously described, more than two substrates can be bonded together using the compositions and methods described herein. The compositions and methods described herein can also be used in conjunction with other adhesive systems.

Besides bonding substrates together, other suitable uses of the adhesive materials described herein will be apparent to those persons having ordinary skill in the art and are to be considered within the scope of the present invention, as previously described.

Although the examples described herein refer to bonding two substrates together, two or more substrates can be used and bonded together, as will be understood by those of skill in the art. As another variation, different types of adhesives and substrates can be used in conjunction with the adhesive compositions and substrates described herein. Other suitable variations will be apparent to those of skill in the art and are to be considered within the scope of the present invention.

Feedstocks

Thiol Ester Composition

The thiol ester composition used as a feedstock to produce the polymers described herein can be described using a number of different methods. Functionally, the thiol ester can be described by the type of functional groups present in the thiol ester. In the functional description, the thiol ester composition minimally contains molecules having at least one ester group and at least one thiol group. In other embodiments, the thiol ester composition can include thiol esters with and without additional groups, such as hydroxy groups, and/or polysulfide linkages —$S_x$— wherein x is an integer greater than 1. When the thiol ester contains the hydroxy group, the thiol ester is referred to as a hydroxy thiol ester. When the thiol ester has a polysulfide linkages —$S_x$— wherein x is an integer greater than 1, the thiol ester can be referred to as a crosslinked thiol ester. When the thiol ester has a hydroxy group and a polysulfide group —$S_x$— wherein x is an integer greater than 1, the thiol ester can be referred to as a crosslinked hydroxy thiol ester.

Alternatively, the thiol ester can be described using a name that indicates the method by which it was formed. For example, a thiol ester referred to as a mercaptanized unsaturated ester refers to a thiol ester produced by reacting hydrogen sulfide with an unsaturated ester. The mercaptanized unsaturated ester can be further described utilizing the functional descriptors of the thiol esters present in the mercaptanized unsaturated ester. For example, in two non-limiting examples, a mercaptanized soybean oil can be further described by a combination of the number of ester groups and the number of thiol groups among other thiol ester aspects present in the mercaptanized soybean oil, while a mercaptanized castor oil can be further described by a combination of the number of ester groups, number of thiol groups, the number of hydroxy groups, among other thiol ester aspects present in the mercaptanized castor oil.

In an aspect, the thiol ester composition of the present invention can be produced by reacting any unsaturated ester with hydrogen sulfide, as described in U.S. patent application Ser. Nos. 11/060,675; 11/060,696; 11/059,792; and 11/059,647 (hereinafter "the '675 Applications"), the disclosure of which is incorporated by reference in its entirety. When the thiol ester composition is produced by reacting an unsaturated ester with hydrogen sulfide, the material produced can be referred to as the mercaptanized unsaturated ester. Because the unsaturated esters can contain multiple carbon-carbon double bonds per unsaturated ester molecule, carbon-carbon double bond reactivity and statistical probability dictate that each thiol ester molecule of the feedstock thiol ester composition produced from the unsaturated ester composition will not have the same number of thiol groups, number of unreacted carbon-carbon double bonds, number of cyclic sulfides, molar ratio of carbon-carbon double bonds to thiol groups, molar ratio of cyclic sulfides to thiol groups, and/or other quantities of functional groups and molar ratios disclosed herein as the unsaturated ester. Additionally, the unsaturated esters can also comprise a mixture of individual unsaturated esters having a different number of carbon-carbon double bonds and/or ester groups. Thus, many of these properties will be described as an average number of groups per thiol ester molecule within the thiol ester composition or average ratio per thiol ester molecule within the thiol ester composition. In other embodiments, it is desired to control the thiol sulfur content present in the thiol ester. Because it is difficult to ensure that the hydrogen sulfide reacts with every carbon-carbon double bond within the unsaturated ester, certain molecules of thiol ester can have more or less thiol groups than other molecules. Thus, the weight percent of thiol groups is stated as an average across all thiol ester molecules of the thiol ester composition.

When the thiol ester is crosslinked, the thiol ester is referred to as a crosslinked thiol ester or a crosslinked hydroxy thiol ester, depending upon the compositions used to produce the crosslinked thiol ester. Each of these types of thiol ester compositions are described herein. Hydroxy thiol esters, crosslinked hydroxy thiol esters, mercaptanized unsaturated esters, mercaptanized epoxidized esters, crosslinked mercaptanized unsaturated esters, and crosslinked mercaptanized epoxidized esters are all considered to be thiol ester compositions. Many of the same attributes that are used to describe the thiol ester compositions, such as the molar ratios and other independent descriptive elements described herein, are equally applicable to many of the different types of thiol ester compositions described herein.

Generally, the thiol ester compositions can be described as comprising one or more separate or discreet functional groups of the thiol ester molecule and/or thiol ester composition. These independent functional groups can include: the number of (or average number of) ester groups per thiol ester molecule, the number of (or average number of) thiol groups per thiol ester molecule, the number of (or average number of) unreacted carbon-carbon double bonds per thiol ester molecule, the average thiol sulfur content of the thiol ester composition, the percentage (or average percentage) of sulfide linkages per thiol ester molecule, and the percentage (or average percentage) of cyclic sulfide groups per thiol ester molecule. Additionally, the thiol ester compositions can be described using individual or a combination of ratios including the ratio of double bonds to thiol groups, the ratio of cyclic sulfides to mercaptan groups, and the like. As separate elements, these functional groups of the thiol composition will be described separately.

Minimally, the thiol ester contains thiol ester molecules having at least one ester group and one thiol group per thiol ester molecule. In embodiments, the thiol ester can be prepared from unsaturated esters. Therefore, in some embodiments, the thiol ester can contain the same number of ester groups as the unsaturated esters from which they are prepared, as described herein. In an embodiment, the thiol ester molecules can have an average of at least 1.5 ester groups per thiol ester molecule. Alternatively, the thiol ester molecules can have an average of at least 2 ester groups per thiol ester molecule; alternatively, an average of at least 2.5 ester groups per thiol ester molecule; or alternatively, an average of at least 3 ester groups per thiol ester molecule. In other embodiments, the thiol esters can have an average of from 1.5 to 8 ester groups per thiol ester molecule; alternatively, an average of from 2 to 7 ester groups per thiol ester molecule; alternatively, an average of from 2.5 to 5 ester groups per thiol ester molecule; or alternatively, an average of from 3 to 4 ester groups per thiol ester molecule. In yet other embodiments, the thiol ester can comprise an average of about 3 ester groups per thiol ester molecule or alternatively, an average of about 4 ester groups per thiol ester molecule.

Minimally, the thiol ester comprises one or an average of at least one thiol group per thiol ester molecule. In an embodiment, the thiol ester molecules can have an average of at least 1.5 thiol groups per thiol ester molecule; alternatively, an average of at least 2 thiol groups per thiol ester molecule; alternatively, an average of at least 2.5 thiol groups per thiol ester molecule; or alternatively, an average of at least 3 thiol groups per thiol ester molecule. In other embodiments, the thiol ester molecules can have an average of from 1.5 to 9 thiol groups per thiol ester molecule; alternatively, an average of from 3 to 8 thiol groups per thiol ester molecule; alternatively, an average of from 2 to 4 thiol groups per thiol ester molecule; or alternatively, an average of from 4 to 8 thiol groups per thiol ester molecule.

In an aspect, the thiol ester can be described using the number of thiol groups present in the thiol ester. For example, a thiol ester referred to as a trimercaptan thiol ester can be a thiol ester containing an average of between 2.5 to 3.5 thiol groups per thiol ester molecule. Alternatively, the trimercaptan thiol ester can contain an average of between 2.75 to 3.25 thiol groups per thiol ester molecule. As another example, a thiol ester referred to as a dimercaptan thiol ester can be a thiol ester containing an average of between 1.5 to 2.5 thiol groups per thiol ester molecule; or alternatively, between 1.75 and 2.25 thiol groups per thiol ester molecule.

In other embodiments, the thiol ester can be further described by the average amount of thiol sulfur present in the thiol ester. In an embodiment, the thiol ester molecules have an average of at least 5 weight percent thiol sulfur per thiol ester molecule; alternatively, an average of at least 10 weight percent thiol sulfur per thiol ester molecule; or alternatively, an average of greater than 15 weight percent thiol sulfur per thiol ester molecule. In an embodiment, the thiol ester molecules have an average of from 5 to 25 weight percent thiol sulfur per thiol ester molecule; alternatively, an average of from 5 to 20 weight percent thiol sulfur per thiol ester molecule; alternatively, an average of from 6 to 15 weight percent thiol sulfur per thiol ester molecule; or alternatively, an average of from 8 to 10 weight percent thiol sulfur per thiol ester molecule.

Generally, the location of the thiol group of the thiol ester is not particularly important and will be dictated by the method used to produce the thiol ester. In embodiments wherein the thiol ester is produced by contacting an unsaturated ester with hydrogen sulfide (a mercaptanized unsaturated ester), the position of the thiol group will be dictated by the position of the carbon-carbon double bond. When the carbon-carbon double bond is an internal carbon-carbon double bond, the method of producing the thiol ester will result in a secondary thiol group. When the double bond is located at a terminal position, it is possible to choose reaction conditions to produce a thiol ester comprising either a primary thiol group or a secondary thiol group.

Some methods of producing the thiol ester composition can additionally create sulfur-containing functional groups other than a thiol group. For example, in some thiol ester production methods, an introduced thiol group can react with a carbon-carbon double bond within the same unsaturated ester to produce a sulfide linkage. When the reaction is with a double bond of a second unsaturated ester, a simple sulfide linkage is produced. In some instances, the second carbon-carbon double bond is located in the same unsaturated ester molecule. When the thiol group reacts with a second carbon-carbon double bond within the same unsaturated ester molecule, a sulfide linkage is produced. In some instances, the carbon-carbon double bond can be within a second ester group of the unsaturated ester molecule. While in other instances, the carbon-carbon double bond can be within the same ester group of the unsaturated ester molecule.

When the thiol group reacts with the carbon-carbon double bond in a second ester group of the same unsaturated ester molecule, the sulfide contains at least one ester group within a ring structure. In some embodiments when the thiol group reacts with the carbon-carbon double bond in a second ester group of the same unsaturated ester molecule, the sulfide contains two ester groups within a ring structure. Within this specification, the first type of sulfide containing an ester group within the ring structure is referred to as a simple sulfide. When the thiol group reacts with the carbon-carbon double bond within the same ester group, the sulfide does not contain an ester group within the ring structure. Within this specification, this second type of sulfide is referred to as a cyclic sulfide. In the cyclic sulfide case, the sulfide linkage produces a cyclic sulfide functionality within a single ester group of the thiol ester. The cyclic sulfide rings that can be produced include a tetrahydrothiopyran ring, a thietane ring, or a thiophane ring (tetrahydrothiophene ring).

In some embodiments, it is desirable to control the average amount of sulfur present as cyclic sulfide in the thiol ester. In an embodiment, the average amount of sulfur present as cyclic sulfide in the thiol ester molecules comprises less than 30 mole percent. Alternatively, the average amount of sulfur present as cyclic sulfide in the thiol esters can comprise less than 20 mole percent; alternatively, less than 10 mole percent; alternatively, less than 5 mole percent; or alternatively, less than 2 mole percent. In other embodiments, it is desirable to control the molar ratio of cyclic sulfides to thiol groups. In an embodiment, the average molar ratio of cyclic sulfide groups to thiol groups per thiol ester can be less than 1.5. Alternatively, the average molar ratio of cyclic sulfide groups to thiol groups per thiol ester can be less than 1; alternatively, less than 0.5; alternatively, less than 0.25; or alternatively, less than 0.1. In some embodiments, the ratio of cyclic sulfide groups to thiol groups per thiol ester can range from 0 to 1; or alternatively, the average molar ratio of cyclic sulfide groups to thiol groups per thiol ester can range between 0.05 and 1.

In some instances it is desirable to have carbon-carbon double bonds present in the thiol ester composition, while in other embodiments it can be desirable to minimize the number of carbon-carbon double bonds present in the thiol ester composition. The presence of carbon-carbon double bonds in the thiol ester can be stated as an average molar ratio of carbon-carbon double bonds to thiol-sulfur. In an embodiment, the average ratio of the remaining unreacted carbon-carbon double bond in the thiol ester composition to thiol sulfur can be less than 1.5 per thiol ester molecule. Alternatively, the average ratio of carbon-carbon double bond to thiol sulfur can be less than 1.2 per thiol ester molecule; alternatively, less than 1.0 per thiol ester molecule; alternatively, less than 0.75 per thiol ester molecule; alternatively, less than 0.5 per thiol ester molecule; alternatively, less than 0.2 per thiol ester molecule; or alternatively, less than 0.1 per thiol ester molecule.

In particular embodiments, the thiol ester is produced from unsaturated ester compositions (i.e. a mercaptanized unsaturated ester). Because the unsaturated ester has particular compositions having a certain number of ester groups present, the product thiol ester composition will have about the same number of ester groups per thiol ester molecule as the unsaturated ester. Other, independent thiol ester properties disclosed herein can be used to further describe the thiol ester composition.

In an aspect, the thiol ester can be referred to as a mercaptanized unsaturated ester. In these embodiments, the unsaturated ester described herein and/or the unsaturated ester functional descriptions disclosed herein can be utilized to further indicate and/or further describe a particular mercaptanized ester. In a few non-limiting examples, the thiol ester produced by contacting a natural source oil with hydrogen sulfide can be referred to as mercaptanized natural source oil, the thiol ester produced by contacting a soybean oil with hydrogen sulfide can be referred to as mercaptanized soybean oil, and the thiol ester produced by contacting a castor oil with hydrogen sulfide can be referred to as mercaptanized castor oil. Additional properties of the unsaturated ester oils disclosed herein can also be utilized to further describe the unsaturated ester oil and the mercaptanized ester oil.

In some embodiments, the thiol ester molecules are produced from unsaturated esters having an average of less than 25 weight percent of side chains having 3 contiguous methylene interrupted carbon-carbon double bonds, as described herein. In some embodiments, greater than 40 percent of the thiol ester molecule total side chains can include sulfur. In some embodiments, greater than 60 percent of the thiol ester molecule total side chains can include sulfur. In other embodiments, greater than 50, 70, or 80 percent of the thiol ester molecule total side chains can include sulfur.

In an embodiment, the thiol ester is a thiol containing natural source oil, as described herein. When the thiol ester is a thiol containing natural source oil, functional groups that are present in the thiol containing natural source oil can be described in a "per thiol ester molecule" basis or in a "per triglyceride" basis. The thiol containing natural source oil can have substantially the same properties as the thiol ester composition, such as the molar ratios and other independent descriptive elements described herein.

The average number of thiol groups per triglyceride in the thiol containing natural source oil is greater than about 1.5. In some embodiments, the average number of thiol groups per triglyceride can range from about 1.5 to about 9.

The mercaptanized unsaturated ester composition can also be described as a product produced by the process comprising contacting hydrogen sulfide and an unsaturated ester composition. In other words, the unsaturated ester composition is mercaptanized to form the mercaptanized unsaturated ester composition. The mercaptanized unsaturated ester composition can also be described using a molecular weight or an average molecular weight of the side chains. All of the attributes used to describe the thiol ester composition can also be used to describe the mercaptanized unsaturated ester composition.

Hydroxy Thiol Ester Composition

In an aspect, the thiol ester composition used as a feedstock to produce the polymers described herein can be a hydroxy thiol ester. The hydroxy thiol ester can be described using a number of methods. Functionally, the hydroxy thiol ester can be described by the types of functional groups present in the hydroxy thiol ester. In this functional description, the hydroxy thiol ester composition minimally contains molecules having at least one ester group, at least one thiol group, and at least one hydroxy group. In other embodiments, the hydroxy thiol ester composition can include other functional groups. For example, the hydroxy thiol ester can also include polysulfide linkages —$S_x$— wherein x is an integer greater than 1. When the thiol ester has a hydroxy group and a polysulfide group —$S_x$— wherein x is an integer greater than 1, the thiol ester can be referred to as crosslinked hydroxy thiol ester.

Alternatively, the hydroxy thiol ester can be described using a name that indicates the method by which it was formed. For example, a hydroxy thiol ester that is called a mercaptanized epoxidized ester refers to a hydroxy thiol ester produced by reacting hydrogen sulfide with an epoxidized unsaturated ester. The mercaptanized epoxidized ester can be further described utilizing functional group descriptor(s) of the groups present in the mercaptanized epoxidized ester. For example, a hydroxy thiol ester produced by reacting hydrogen sulfide with a mercaptanized epoxidized ester will produce an α-hydroxy thiol group and the mercaptanized epoxidized ester can be called an α-hydroxy thiol ester or be described as containing α-hydroxy thiol groups. Compounds that fit the hydroxy thiol ester composition description do not always fit the mercaptanized epoxidized ester description or the α-hydroxy thiol ester description. For example, mercaptanized castor oil can be described using some of the hydroxy thiol ester definitions by virtue of having at least one ester group, at least one thiol group, and at least one hydroxy group. However, mercaptanized castor oil is not a mercaptanized epoxidized ester because it is produced by contacting castor oil, which contains hydroxy groups and a carbon-carbon double bond, with hydrogen sulfide and not by reacting hydrogen sulfide with epoxidized castor oil. However, mercaptanized epoxidized castor oil is a mercaptanized epoxidized ester oil by virtue of its formation by contacting hydrogen sulfide with epoxidized castor oil.

The feedstock thiol ester compositions can also contain a hydroxy or alcohol group. When the thiol ester composition includes the hydroxy group, the thiol ester composition is referred to herein as the hydroxy thiol ester composition. The quantity or number of alcohol groups present in the hydroxy thiol ester composition can be independent of the quantity of other functional groups present in the hydroxy thiol ester composition (e.g. thiol groups, ester groups, sulfides, cyclic sulfides, etc.). Additionally, the weight percent of thiol sulfur and functional group ratios (e.g. molar ratio of cyclic sulfides to thiol groups, molar ratio of epoxide groups to thiol groups, molar ratio of epoxide groups to α-hydroxy thiol groups and other disclosed quantities of functional groups and their molar ratios to the thiol groups) are separate or discreet elements that can be used to describe the hydroxy thiol ester composition. The hydroxy thiol ester composition can be described using any combination of the hydroxy thiol ester composition separate functional groups or ratios disclosed herein.

In an embodiment, the hydroxy thiol ester composition can be produced by reacting hydrogen sulfide with an epoxidized unsaturated ester composition as described in the '675 Applications. When the thiol ester composition is produced by reacting hydrogen sulfide with an epoxidized unsaturated ester, the material produced can be called a mercaptanized epoxidized ester. Because the epoxidized unsaturated ester can contain multiple epoxide groups, epoxide group reactivity and statistical probability dictate that not all hydroxy thiol ester molecules of the hydroxy thiol ester composition will have the same number of hydroxy groups, thiol groups, α-hydroxy thiol groups, sulfides, cyclic sulfides, molar ratio of cyclic sulfides to thiol groups, molar ratio of epoxide groups to thiol groups, molar ratio of epoxide groups to α-hydroxy thiol groups, weight percent thiol sulfur, and/or other disclosed quantities of functional groups and their molar ratios in the epoxidized unsaturated ester composition. Thus, many of these properties will be discussed as an average number or ratio per hydroxy thiol ester molecule. In other embodiments, it is desired to control the content of thiol sulfur present in the hydroxy thiol ester. Because it is difficult to ensure that the hydrogen sulfide reacts with every epoxide group within the epoxidized unsaturated ester, certain hydroxy thiol ester molecules can have more or less thiol groups than other molecules within the hydroxy thiol ester composition. Thus, the weight percent of thiol groups can be stated as an average weight percent across all hydroxy thiol ester molecules.

As an embodiment of the present invention, the hydroxy thiol ester composition includes hydroxy thiol ester molecules that have an average of at least 1 ester group and an average of at least 1 α-hydroxy thiol group per hydroxy thiol ester molecule. As an embodiment of the present invention, the hydroxy thiol ester composition includes hydroxy thiol ester molecules that have an average of at least 1.5 ester groups and an average of at least 1.5 α-hydroxy thiol groups per hydroxy thiol ester molecule.

Alternatively, in some embodiments, the hydroxy thiol ester comprises at least one ester, at least one thiol group, and at least one hydroxy group. Thus, in some embodiments, the hydroxy thiol ester composition includes hydroxy thiol ester molecules that have an average of at least 1.5 ester groups, an average of at least 1.5 thiol groups, and an average of at least 1.5 hydroxy groups per hydroxy thiol molecule.

In embodiments, the hydroxy thiol ester can be prepared from the epoxidized unsaturated ester or the unsaturated ester. Thus, the hydroxy thiol ester can contain the same number of ester groups as the epoxidized unsaturated ester or unsaturated ester. In an embodiment, the hydroxy thiol ester molecules have an average of at least 1.5 ester groups per hydroxy thiol ester molecule. Alternatively, the hydroxy thiol ester molecules have an average of at least 2 ester groups per hydroxy thiol ester molecule; alternatively, an average of at least 2.5 ester groups per hydroxy thiol ester molecule; or alternatively, an average of at least 3 ester groups per hydroxy thiol ester molecule. In other embodiments, the hydroxy thiol esters have an average of from 1.5 to 8 ester groups per hydroxy thiol ester molecule; alternatively, an average of from 2 to 7 ester groups per hydroxy thiol ester molecule; alternatively, an average of from 2.5 to 5 ester groups per hydroxy thiol ester molecule; or alternatively, an average of from 3 to 4 ester groups per hydroxy thiol ester molecule. In yet other embodiments, the α-hydroxy thiol ester comprises an average of 3 ester groups per hydroxy thiol ester molecule; or alternatively, an average of 4 ester groups per hydroxy thiol ester molecule.

In some embodiments, the hydroxy group and the thiol group are combined in the same group (i.e. when the hydroxy thiol ester is produced from the epoxidized unsaturated ester), the group can be referred to as an α-hydroxy thiol group. In other embodiments, the thiol group and the hydroxy or alcohol group are not in the same group (i.e. when the hydroxy thiol ester is produced from an unsaturated ester comprising hydroxy groups, such as castor oil). In this instance, the presence of the alcohol group is not dependent upon the formation of the thiol group. For example, as another embodiment of the present invention, the hydroxy thiol ester composition includes hydroxy thiol ester molecules. The hydroxy thiol ester molecules have an average of at least 1.5 ester groups, an average of at least 1.5 thiol groups, and an average of at least 1.5 alcohol groups per hydroxy thiol ester molecule.

Minimally, in some embodiments, the hydroxy thiol ester comprises at least one thiol group per hydroxy thiol ester molecule. In an embodiment, the hydroxy thiol ester molecules can have an average of at least 1.5 thiol groups per hydroxy thiol ester molecule; alternatively, an average of at least 2 thiol groups per hydroxy thiol ester molecule; alternatively, an average of at least 2.5 thiol groups per hydroxy thiol ester molecule; or alternatively, an average of at least 3 thiol groups per hydroxy thiol ester molecule. In other embodiments, the hydroxy thiol ester molecules can have an average of from 1.5 to 9 thiol groups per hydroxy thiol ester molecule; alternatively, an average of from 3 to 8 thiol groups per hydroxy thiol ester molecule; alternatively, an average of from 2 to 4 thiol groups per hydroxy thiol ester molecule; or alternatively, an average of from 4 to 8 thiol groups per hydroxy thiol ester.

Minimally, in some embodiments, the hydroxy thiol ester composition comprises an average of at least 1 hydroxy or alcohol group per hydroxy thiol ester molecule. In some embodiments, the hydroxy thiol ester composition can have an average of at least 1.5 hydroxy groups per hydroxy thiol ester molecule; alternatively, an average of at least 2 hydroxy groups per hydroxy thiol ester molecule; alternatively, an average of at least 2.5 hydroxy groups per hydroxy thiol ester molecule; or alternatively, an average of at least 3 hydroxy groups per hydroxy thiol ester molecule. In other embodiments, the thiol ester composition can have an average of from 1.5 to 9 hydroxy groups per hydroxy thiol ester molecule; alternatively, an average of from 3 to 8 hydroxy groups per hydroxy thiol ester molecule; alternatively, an average of from 2 to 4 hydroxy groups per hydroxy thiol ester molecule; or alternatively, an average of from 4 to 8 hydroxy groups per hydroxy thiol ester molecule.

In yet other embodiments, the number of hydroxy groups can be stated as an average molar ratio of hydroxy groups to thiol groups. Minimally, in some embodiments, the molar ratio of hydroxy groups to thiol groups can be at least 0.25. In some embodiments, the molar ratio of hydroxy groups to thiol groups can be at least 0.5; alternatively, at least 0.75; alternatively, at least 1.0; alternatively, at least 1.25; or alternatively, at least 1.5. In other embodiments, the molar ratio of hydroxy groups to thiol groups can range from 0.25 to 2.0; alternatively, from 0.5 to 1.5; or alternatively, from 0.75 to 1.25.

In embodiments where the hydroxy thiol esters are produced from an epoxidized unsaturated ester, the hydroxy thiol esters can be described as containing ester groups and α-hydroxy thiol groups. In this case, the hydroxy thiol esters that contain ester groups and α-hydroxy thiol groups can be referred to as mercaptanized epoxidized esters. The number of ester groups and the number of α-hydroxy thiol groups are independent elements and as such, the hydroxy thiol esters can be described as having any combination of ester groups and α-hydroxy thiol groups described herein. Minimally, the hydroxy thiol ester can have an average of at least 1 α-hydroxy thiol group per hydroxy thiol ester molecule. In some embodiments, the hydroxy thiol ester composition can have an average of at least 1.5 α-hydroxy thiol groups per hydroxy thiol ester molecule; alternatively, an average of at least 2 α-hydroxy thiol groups per hydroxy thiol ester molecule; alternatively, an average of at least 2.5 α-hydroxy thiol groups per hydroxy thiol ester molecule; or alternatively, an average of at least 3 α-hydroxy thiol groups per hydroxy thiol ester molecule. In other embodiments, the hydroxy thiol ester composition can have an average of from 1.5 to 9 α-hydroxy thiol groups per hydroxy thiol ester molecule; alternatively, an average of from 3 to 8 α-hydroxy thiol groups per hydroxy thiol ester molecule; alternatively, an average of from 2 to 4 α-hydroxy thiol groups per hydroxy thiol ester molecule; or alternatively, an average of from 4 to 8 α-hydroxy thiol groups per hydroxy thiol ester molecule.

In an aspect, the hydroxy thiol ester can be described using the number of thiol groups or α-hydroxy thiol groups present in the hydroxy thiol ester. For example, a hydroxy thiol ester referred to as a trimercaptan hydroxy thiol ester can be a hydroxy thiol ester containing an average of between 2.5 to 3.5 thiol or α-hydroxy thiol groups per hydroxy thiol ester molecule. Alternatively, the trimercaptan hydroxy thiol ester can contain an average of between 2.75 to 3.25 thiol or α-hydroxy thiol groups per hydroxy thiol ester molecule. As another example, a hydroxy thiol ester referred to as a dimercaptan hydroxy thiol ester can be a hydroxy thiol ester containing an average of between 1.5 to 2.5 thiol or α-hydroxy thiol groups per hydroxy thiol ester molecule; or alternatively, between 1.75 and 2.25 thiol or α-hydroxy thiol groups per hydroxy thiol ester molecule.

In another aspect, the hydroxy thiol ester can be described using the number of alcohol, α-hydroxy thiol, or other functional groups present in the hydroxy thiol ester. For example, a hydroxy thiol ester referred to as a trifunctional hydroxy thiol ester can be a hydroxy thiol ester containing an average of between 2.5 to 3.5 alcohol, α-hydroxy thiol, or other functional groups per hydroxy thiol ester molecule. Alternatively, the trifunctional hydroxy thiol ester can contain an average of between 2.75 to 3.25 alcohol, α-hydroxy thiol, or other functional groups per hydroxy thiol ester molecule. As another example, a hydroxy thiol ester referred to as a difunctional hydroxy thiol ester can be a hydroxy thiol ester containing an average of between 1.5 to 2.5 alcohol, α-hydroxy thiol, or other functional groups per hydroxy thiol ester molecule; or alternatively, between 1.75 and 2.25 alcohol, α-hydroxy thiol, or other functional groups per hydroxy thiol ester molecule.

The hydroxy thiol esters can be produced by contacting an epoxidized ester derived from an unsaturated ester (i.e., epoxidized unsaturated ester) with hydrogen sulfide, as described herein. In some instances, it is desirable to have epoxide groups present in the hydroxy thiol ester composition. While in other embodiments, it can be desirable to minimize the number of epoxy groups present in the hydroxy thiol ester composition. Thus, the presence of residual epoxide groups can be another separate functional group used to describe the hydroxy thiol ester. The hydroxy thiol esters can include an average of greater than 0 to about 4 epoxide groups per triglyceride. The thiol composition can also include an average of greater than 1.5 to about 9 epoxide groups per triglyceride.

The presence of epoxide groups in the hydroxy thiol ester can be independently described as an average number of epoxide groups per hydroxy thiol ester, a molar ratio of epoxide groups to thiol groups, a molar ratio of epoxide groups to α-hydroxy thiol groups, or any combination thereof. In some embodiments, the hydroxy thiol ester molecules can have an average of less than 2 epoxide groups per hydroxy thiol ester molecule, i.e., the hydroxy thiol ester molecules have a molar ratio of epoxide groups to α-hydroxy thiol groups of less than 2. Alternatively, the hydroxy thiol ester can have an average of less than 1.5 epoxide groups per hydroxy thiol ester molecule; alternatively, an average of less than 1 epoxide group per hydroxy thiol ester molecule; alternatively, an average of less than 0.75 epoxide groups per hydroxy thiol ester molecule; or alternatively, an average of less than 0.5 epoxide groups per hydroxy thiol ester molecule. In other embodiments, the molar ratio of epoxide groups to thiol groups can average less than 1.5. Alternatively, the molar ratio of epoxide groups to thiol groups can average less than 1; alternatively, average less than 0.75; alternatively, average less than 0.5; alternatively, average less than 0.25; or alternatively, average less than 0.1. In yet other embodiments, the molar ratio of epoxide groups to α-hydroxy thiol groups can average less than 1.5. Alternatively, the molar ratio of epoxide groups to α-hydroxy thiol groups can average less than 1; alternatively, average less than 0.75; alternatively, average less than 0.5; alternatively, average less than 0.25; or alternatively, average less than 0.1. In yet other embodiments, the hydroxy thiol ester composition is substantially free of epoxide groups.

In other embodiments, the hydroxy thiol ester can be described by the average amount of thiol sulfur present in the hydroxy thiol ester. In an embodiment, the hydroxy thiol ester molecules can have an average of at least 2.5 weight percent thiol sulfur per hydroxy thiol ester molecule; alternatively, an average of at least 5 weight percent thiol sulfur per hydroxy thiol ester molecule; alternatively, an average of at least 10 weight percent thiol sulfur per hydroxy thiol ester molecule; or alternatively, an average of greater than 15 weight percent thiol sulfur per hydroxy thiol ester molecule. In an embodiment, the hydroxy thiol ester molecules can have an average of from 5 to 25 weight percent thiol sulfur per hydroxy thiol ester molecule; alternatively, an average of from 5 to 20 weight percent thiol sulfur per hydroxy thiol ester molecule; alternatively, an average of from 6 to 15 weight percent thiol sulfur per hydroxy thiol ester molecule; or alternatively, an average of from 8 to 10 weight percent thiol sulfur per hydroxy thiol ester molecule.

In some embodiments when the hydroxy thiol ester is described as an ester of a polyol and a hydroxy thiol carboxylic acid, at least 20 percent of the total side chains include a hydroxy group and a thiol group. In other embodiments when the hydroxy thiol ester is described as an ester of a polyol and a hydroxy thiol carboxylic acid, at least 40 percent of the total side chains include a hydroxy group and a thiol group. In yet other embodiments when the hydroxy thiol ester is described as an ester of a polyol and a hydroxy thiol carboxylic acid, at least 60 percent of the total side chains include a hydroxy group and a thiol group; or alternatively, at least 70 percent of the total side chains include the hydroxy group and a thiol group. Yet in further embodiments when the hydroxy thiol ester is described as an ester of a polyol and a hydroxy thiol carboxylic acid, at least 80 percent of the total side chains include the hydroxy group and a thiol group.

In some embodiments when the hydroxy thiol ester is described as an ester of a polyol and an α-hydroxy thiol carboxylic acid, at least 20 percent of the total side chains include the α-hydroxy thiol group. In other embodiments when the hydroxy thiol ester is described as an ester of a polyol and an α-hydroxy thiol carboxylic acid, at least 20 percent of the total side chains include the α-hydroxy thiol group. In yet other embodiments when the hydroxy thiol ester is described as an ester of a polyol and an α-hydroxy thiol carboxylic acid, at least 60 percent of the total side chains include the α-hydroxy thiol group; or alternatively, at least 70 percent of the total side chains include the α-hydroxy thiol group. Yet in further embodiments when the hydroxy thiol ester is described as an ester of a polyol and an α-hydroxy thiol carboxylic acid, at least 80 percent of the total side chains include the α-hydroxy thiol group.

In some aspects when the hydroxy thiol ester is described as an ester of a polyol and an hydroxy thiol carboxylic acid or an ester of a polyol and an α-hydroxy thiol carboxylic acid, greater than 20 percent of the hydroxy thiol ester molecule total side chains contain sulfur. In some aspects when the hydroxy thiol ester is described as an ester of a polyol and an hydroxy thiol carboxylic acid or an ester of a polyol and an α-hydroxy thiol carboxylic acid, greater than 40 percent of the hydroxy thiol ester molecule total side chains contain sulfur. In some aspects when the hydroxy thiol ester is described as an ester of a polyol and an hydroxy thiol carboxylic acid or an ester of a polyol and an α-hydroxy thiol carboxylic acid, greater than 60 percent of the hydroxy thiol ester molecule total side chains contain sulfur; alternatively, greater than 70 percent of the total side chains contain sulfur; or alternatively, greater than 80 percent of the total side chains contain sulfur.

In particular embodiments, the epoxidized unsaturated ester used in the synthesis of the hydroxy thiol ester is produced from the epoxidized unsaturated ester composition that includes an epoxidized natural source oil. Because the natural source oils have particular compositions regarding the number of ester groups present, the hydroxy thiol ester will have about the same number of ester groups as the natural source oil. Other independent properties that are described herein can be used to further describe the hydroxy thiol ester.

In other embodiments, the epoxidized unsaturated ester used to produce the hydroxy thiol ester is produced from synthetic (or semi-synthetic) unsaturated ester oils. Because the synthetic ester oils can have particular compositions regarding the number of ester groups present, the hydroxy thiol ester would have about the same number of ester groups as the synthetic ester oil. Other independent properties of the unsaturated ester, whether the unsaturated ester includes natural source or synthetic oils, can be used to further describe the hydroxy thiol ester composition.

Examples of suitable hydroxy thiol esters include, but are not limited to mercaptanized epoxidized vegetable oils, mercaptanized epoxidized soybean oil, mercaptanized castor oil, and mercaptanized epoxidized castor oil. Other suitable mercaptanized epoxidized esters are described in the '675 Applications and are to be considered within the scope of the present invention.

Crosslinked Thiol Ester Compositions

In an aspect, the feedstock thiol ester compositions include a crosslinked thiol ester composition. Generally, the crosslinked thiol ester molecules are oligomers of thiol esters that are connected together by polysulfide linkages $—S_x—$, wherein x is an integer greater than 1. As the crosslinked thiol ester is described as an oligomer of thiol esters, the thiol esters can be described as the monomer from which the crosslinked thiol esters are produced. In embodiments, the crosslinked thiol ester is produced from a mercaptanized unsaturated ester and can be called a crosslinked mercaptanized unsaturated ester. In other embodiments, the crosslinked thiol ester can be produced from a hydroxy thiol ester and can be called a crossed linked hydroxy thiol ester. In yet other embodiments, the crosslinked thiol ester can be produced from a mercaptanized epoxidized ester and can be called a crosslinked mercaptanized epoxidized thiol ester.

In an aspect, the crosslinked thiol ester composition comprises a thiol ester oligomer having at least two thiol ester monomers connected by a polysulfide linkage having a structure $—S_Q—$, wherein Q is an integer greater than 1. In an aspect, the polysulfide linkage can be the polysulfide linkage $—S_Q—$, wherein Q is 2, 3, 4, or mixtures thereof. In other embodiments, Q can be 2; alternatively, 3; or alternatively, 4.

In an aspect, the crosslinked thiol ester composition comprises a thiol ester oligomer having at least 3 thiol ester monomers connected by polysulfide linkages; alternatively, at least 5 thiol ester monomers connected by polysulfide linkages; alternatively, at least 7 thiol ester monomers connected by polysulfide linkages; or alternatively, at least 10 thiol ester monomers connected by polysulfide linkages. In yet other embodiments, the crosslinked thiol ester composition comprises a thiol ester oligomer having from 3 to 20 thiol ester monomers connected by polysulfide linkages; alternatively, from 5 to 15 thiol ester monomers connected by polysulfide linkages; or alternatively, from 7 to 12 thiol ester monomers connected by polysulfide linkages.

In an aspect, the crosslinked thiol ester composition comprises thiol ester monomers and thiol ester oligomers. In some embodiments, the crosslinked thiol ester composition has a combined thiol ester monomer and thiol ester oligomer average molecular weight greater than 2,000. In other embodiments, the crosslinked thiol ester composition has a combined thiol ester monomer and thiol ester oligomer average molecular weight greater than 5,000; or alternatively, greater than 10,000. In yet other embodiments, the crosslinked thiol ester composition has a combined thiol ester monomer and thiol ester oligomer average molecular weight ranging from 2,000 to 20,000; alternatively, from 3,000 to 15,000; or alternatively, from 7,500 to 12,500.

In an aspect, the thiol ester monomers and thiol ester oligomers have a total thiol sulfur content greater than 0.5 weight percent. In other embodiments, the thiol ester monomers and thiol ester oligomers have a total thiol sulfur content greater than 1 weight percent; alternatively, greater than 2 weight percent; or alternatively, greater than 4 weight percent. In yet other embodiments, the thiol ester monomers and the thiol ester oligomers have a total thiol sulfur content from 0.5 to 8 weight percent; alternatively, from 4 to 8 weight percent; or alternatively, 0.5 to 4 weight percent.

In an aspect, the thiol ester monomers and thiol ester oligomers have a total sulfur content greater than 8 weight percent. In some embodiments, the thiol ester monomers and thiol ester oligomers have a total sulfur content greater than 10 weight percent; or alternatively, greater than 12 weight percent. In yet other embodiments, the thiol ester monomers and thiol ester oligomers have a total sulfur content ranging from 8 to 15 weight percent; alternatively, from 9 to 14 weight percent; or alternatively, from 10 to 13 weight percent.

Epoxide Compositions

In an aspect, the mercaptan-hardened epoxy polymer compositions of the present invention can be produced by contacting a thiol ester composition with an epoxide composition. Generally, the epoxide composition comprises an epoxide having at least 2 epoxide groups. In embodiments, the epoxide composition can comprise an epoxide having at least 3 epoxide groups. In some embodiments, the epoxide composition comprises a mixture of epoxide molecules. When the epoxide composition comprises a mixture of epoxide molecules, the epoxide molecules can have an average of at least 1.5 epoxide groups per epoxide molecule; alternatively, an average of at least 2 epoxide groups per epoxide molecule; alternatively, an average of at least 2.5 epoxide groups per epoxide molecule; or alternatively, an average of at least 3 epoxide groups per epoxide molecule. In other embodiments, the epoxide molecules can have an average of from 1.5 to 16 epoxide groups per epoxide molecule; alternatively, an average of from 1.5 to 12 epoxide groups per epoxide molecule; alternatively, an average of from 1.5 to 9 epoxide groups per epoxide molecule; alternatively, an average of from 2 to 7 epoxide groups per epoxide molecule; alternatively, an average of from 2 to 5 epoxide groups per epoxide molecule; or alternatively, an average of from 2 to 4 epoxide groups per epoxide molecule.

Generally, the epoxides that can be utilized in the preparation of the mercaptan-hardened epoxy polymer (mercaptan-crosslinked epoxy polymer or adhesive) can be comprised of molecules having multiple groups having structure E2:

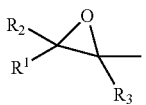

E2 where each $R^1$, $R^2$, and $R^3$ can be H, an organyl group, or a hydrocarbyl group and the undesignated valency represents the remainder of the structure of the epoxide molecule. In embodiments, each $R^1$, $R^2$, and $R^3$ can be H or a $C_1$ to $C_{20}$ organyl group; alternatively, H or a $C_1$ to $C_{10}$ organyl group; or alternatively, H or a $C_1$ to $C_5$ organyl group. In other embodiments, each $R^1$, $R^2$, and $R^3$ can be H or a $C_1$ to $C_{20}$ hydrocarbyl group; alternatively, H or a $C_1$ to $C_{10}$ hydrocarbyl group; or alternatively, H or a $C_1$ to $C_5$ hydrocarbyl group. In yet other embodiments, $R^1$, $R^2$, and $R^3$ are H, or $R^1$ and $R^2$ are H and $R^3$ is a methyl group, or a combination thereof In yet other embodiments, $R^1$, $R^2$, and $R^3$ are H; or alternatively, $R^1$ and $R^2$ are H and $R^3$ is a methyl group. When an epoxide molecule comprises two or more E2 groups, the additional E2 can be located within $R^1$, $R^2$, $R^3$ or the undesignated epoxide valency. In an embodiment when the epoxide molecule comprises two or more E2 groups, $R^1$, $R^2$, and $R^3$ can be any group described herein and the additional E2 group(s) are located in the undesignated epoxide valency.

In embodiments, the epoxide composition comprises an epoxide having at least 2 epoxide groups having structure E2. In embodiments, the epoxide composition can comprise an epoxide having at least 3 epoxide groups having structure E2. In some embodiments, the epoxide composition comprises a mixture of epoxide molecules having structure E2. When the epoxide composition comprises a mixture of epoxide molecules, the epoxide molecules can have an average of at least 1.5 epoxide groups having structure E2 per epoxide molecule; alternatively, an average of at least 2 epoxide groups having structure E2 per epoxide molecule; alternatively, an average of at least 2.5 epoxide groups having structure E2 per epoxide molecule; or alternatively, an average of at least 3 epoxide groups having structure E2 per epoxide molecule. In embodiments, the epoxide molecules can have an average of from 1.5 to 16 epoxide groups having structure E2 per epoxide molecule; alternatively, an average of from 1.5 to 12 epoxide groups having structure E2 per epoxide molecule; alternatively, an average of from 1.5 to 9 epoxide groups having structure E2 per epoxide molecule; alternatively, an average of from 2 to 7 epoxide groups having structure E2 per epoxide molecule; alternatively, an average of from 2 to 5 epoxide groups having structure E2 per epoxide molecule; or alternatively, an average of from 2 to 4 epoxide groups having structure E2 per epoxide molecule.

A class of epoxides that can be utilized in the epoxide composition is a polyol glycidylether. Generally, the polyol glycidylether composition that can be utilized in the preparation of the mercaptan-hardened epoxy polymer (mercaptan-crosslinked epoxy polymer or adhesive) of the present invention can be comprised of molecules having multiple glycidylether groups having structure E3:

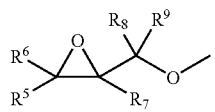

E3 where each $R^5$, $R^6$, $R^7$, $R^8$, and $R^9$ can be H, an organyl group, or a hydrocarbyl group and the undesignated valency represents the remainder of the structure of the polyol glycidylether molecule. In embodiments, each $R^5$, $R^6$, $R^7$, $R^8$, and $R^9$ can be H or a $C_1$ to $C_{20}$ organyl group; alternatively, H or a $C_1$ to $C_{10}$ organyl group; or alternatively, H or a $C_1$ to $C_5$ organyl group. In other embodiments, each $R^5$, $R^6$, $R^7$, $R^8$, and $R^9$ can be H or a $C_1$ to $C_{20}$ hydrocarbyl group; alternatively, H or a $C_1$ to $C_{10}$ hydrocarbyl group; or alternatively, H or a $C_1$ to $C_5$ hydrocarbyl group. In yet other embodiments, $R^5$, $R^6$, $R^8$, and $R^9$ are H and $R^7$ is a methyl group; or alternatively, $R^5$, $R^6$, $R^7$, $R^8$, and $R^9$ are H. In an embodiment when the epoxide molecule comprises two or more E3 groups, $R^5$, $R^6$, $R^7$, $R^8$, and $R^9$ can be any group described herein and the additional E3 group(s) are located in the undesignated epoxide valency.

In embodiments, the epoxide composition comprises a glycidylether molecule having at least 2 glycidylether groups having structure E3. In embodiments, the glycidylether composition can comprise a glycidylether having at least 3 glycidylether groups having structure E3. In some embodiments, the glycidylether composition comprises a mixture of glycidylether molecules having structure E3. When the glycidylether composition comprises a mixture of glycidylether molecules, the glycidylether molecules can have an average of at least 1.5 glycidylether groups having structure E3 per glycidylether molecule; alternatively, an average of at least 2 glycidylether groups having structure E3 per glycidylether molecule; alternatively, an average of at least 2.5 glycidylether groups having structure E3 per glycidylether molecule; or alternatively, an average of at least 3 glycidylether groups having structure E3 per glycidylether molecule. In embodiments, the glycidylether molecules can have an average of from 1.5 to 16 glycidylether groups having structure E3 per glycidylether molecule; alternatively, an average of from 1.5 to 12 glycidylether groups having structure E3 per glycidylether molecule; alternatively, an average of from 1.5 to 9 glycidylether groups having structure E3 per glycidylether molecule; alternatively, an average of from 2 to 7 glycidylether groups having structure E3 per glycidylether molecule; alternatively, an average of from 2 to 5 glycidylether groups having structure E3 per glycidylether molecule; or alternatively, an average of from 2 to 4 glycidylether groups having structure E3 per glycidylether molecule.

In embodiments, the polyol glycidylether can be described as a glycidylether product of contacting a polyhydric alcohol (or polyol) with an epichlorohydrin (herein referred to as "poly glycidylether product"). While this description appears to imply that the polyol glycidylether is prepared by contacting a polyol with an epichlorohydrin, this is not the intent of the description. The intent of the description is to describe the polyol glycidylether. The polyol glycidylether product can be prepared using any method apparent to those persons having ordinary skill in the art. For example, the poly glycidylether product can be prepared by contacting a polyol with an epihalohydrin (chloro, bromo or iodo) or by contacting a metal salt of a polyol with an epihalohydrin (chloro, bromo, or iodo) among other methods. The polyol component can be any aliphatic, cycloaliphatic, or aromatic polyol.

In embodiments, the polyol of the polyol glycidylether product comprises at least 2 alcohol groups (or alternatively called hydroxy groups); alternatively, at least 3 alcohol groups; or alternatively, at least 4 alcohol groups. In some embodiments, the polyol can comprise a mixture of alcohols having an average of at least 1.5 alcohol groups per alcohol molecule; alternatively, an average of at least 2 alcohol groups per alcohol molecule; alternatively, an average of at least 2.5 alcohol groups per alcohol molecule; alternatively, an average of at least 3 alcohol groups per alcohol molecule; alternatively, an average of from 1.5 to 16 alcohol groups per alcohol molecule; alternatively, an average of from 1.5 to 12 alcohol groups per alcohol molecule; alternatively, an average of from 1.5 to 9 alcohol groups per alcohol molecule; alternatively, an average of from 2 to 7 alcohol groups per alcohol molecule; alternatively, an average of from 2 to 5 alcohol groups per alcohol molecule; or alternatively, an average of from 2 to 4 alcohol groups per alcohol molecule.

In an aspect, the polyol of the polyol glycidylether product can be an aliphatic polyol. In embodiments, the aliphatic polyol of the polyol glycidylether product can comprise ethylene glycol, diethylene glycol, triethylene glycol, tetraethylene glycol, tripropylene glycol, polyethylene glycols with a molecular weight of from 106 to 8500, polyethylene glycols with a molecular weight of from 400 to 2000, 1,2-propanediol, 1,3-propanediol, 1,2-butanediol, 1,3-butanediol, 1,4-butanediol, 1,5-pentanediol, neopentyl glycol, 1,2-hexanediol, 1,6-hexanediol, 1,2-octanediol, 1,8-octanediol, 1,2-decanediol, 1,10-decanediol, glycerol, 2,2-dimethylolpropane, trimethylolethane, trimethylolpropane, pentaerythritol, dipentaerythritol, sorbitol, 1,2,4-butanetriol, 2,2,4-trimethyl-1,3-pentanediol, or combinations thereof In some embodiments, the aliphatic polyol of the polyol glycidylether product can comprise ethylene glycol, diethylene glycol, triethylene glycol, tetraethylene glycol; alternatively, tripropylene glycol; alternatively, ethylene glycol; alternatively, diethylene glycol; alternatively, triethylene glycol; alternatively, tetraethylene glycol; alternatively, polyethylene glycols with a molecular weight of from 106 to 8500; alternatively, polyethylene glycols with a molecular weight of from 400 to 2000; alternatively, 1,2-propanediol, 1,3-propanediol, or mixtures thereof; alternatively, 1,2-butanediol, 1,3-butanediol, 1,4-butanediol, or mixtures thereof; alternatively, 1,5-pentanediol, neopentyl glycol, or mixtures, thereof; alternatively, 1,2-hexanediol, or 1,6-hexanediol; alternatively, 1,2-octanediol, or 1,8-octanediol; alternatively, 1,2-decanediol, or 1,10-decanediol; alternatively, glycerol; alternatively, 2,2-dimethylolpropane; alternatively, trimethylolethane; alternatively, trimethylolpropane; alternatively, pentaerythritol; alternatively, dipentaerythritol; alternatively, sorbitol; alternatively, 1,2,4-butanetriol; or alternatively, 2,2,4-trimethyl-1,3-pentanediol. In other embodiments, the aliphatic polyol can comprise an ethoxylate, a propoxylate, or a mixed ethoxylate/propoxylate of an aliphatic polyol or mixture of aliphatic polyols. In yet other embodiments, the polyol comprises a polyol ethoxylate product containing from 2 to 400 mol of ethylene oxide per mole of polyol.

In an aspect, the polyol of the polyol glycidylether product can be a cyclic aliphatic polyol. In embodiments, the cyclic aliphatic polyol of the polyol glycidylether product can comprise 1,2-cyclo-pentanediol, 1,3-cyclopentanediol, 1,2-cyclohexanediol, 1,3-cyclohexanediol, 1,4-cyclohexanediol, 1,2-cyclohexanedimethanol, 1,4-cyclohexanedimethanol, bis(4-hydroxycyclohexyl)methane, 2,2-bis(4-hydroxy-cyclohexyl)propane, or any combination thereof. In some embodiments, the cyclic polyol of the polyol glycidylether product can comprise 1,2-cyclopentanediol, 1,3-cyclopentanediol, or mixtures thereof; alternatively, 1,2-cyclohexanediol, 1,3-cyclohexanediol, 1,4-cyclohexanediol, or mixtures thereof; alternatively, 1,2-cyclopentanediol; alternatively, 1,3-cyclopentanediol; alternatively, 1,2-cyclohexanediol; alternatively, 1,3-cyclohexanediol; alternatively, 1,4-cyclo-hexanediol; alternatively, 1,2-cyclohexanedimethanol; or alternatively, 1,4-cyclohexanedimethanol; or alternatively, bis(4-hydroxycyclohexyl)methane; or alternatively, 2,2-bis(4-hydroxy-cyclohexyl)-propane.

In an aspect, the polyol of the polyol glycidylether product can be an aromatic polyol. In embodiments, the aromatic polyol of the polyol glycidylether product can comprise 1-phenyl-1,2-ethanediol, 1,2-benzenediol (pyrocatechol), 1,3-benzenediol (resorcinol), 1,4-benzenediol, methyl catechol, methyl resorcinol, 1,2,4-benzenetriol, 2-hydroxybenzylalcohol, 3-hydroxybenzylalcohol, 4-hydroxybenzylalcohol, 3,5-dihydroxybenzylalcohol, 1,2-benzenedimethanol, 1,3-benzene-di-methanol, 1,4-benzene-dimethanol, 2-(2-hydroxyphenyl)ethanol, 2-(3-hydroxy-phenyl)-ethanol, 2-(4-hydroxyphenyl)-ethanol, 2-phenyl-1,2-propanediol or mixtures thereof In some embodiments, the aromatic polyol of the polyol glycidylether product can comprise 1-phenyl-1,2-ethanediol; alternatively, 1,2-benzenediol (catechol, pyrocatechol); alternatively, 1,3-benzenediol (resorcinol); alternatively, 1,4-benzenediol; alternatively, methyl catechol; alternatively, methyl resorcinol; alternatively, 1,2,4-benzenetriol; alternatively, 2-hydroxybenzylalcohol; alternatively, 3-hydroxy-benzylalcohol; alternatively, 4-hydroxybenzylalcohol; alternatively, 3,5-dihydroxybenzylalcohol; alternatively, 1,2-benzenedimethanol; alternatively, 1,3-benzene-di-methanol; alternatively, 1,4-benzenedimethanol; alternatively, 2-(2-hydroxyphenyl)ethanol; alternatively, 2-(3-hydroxy-phenyl)-ethanol; alternatively, 2-(4-hydroxyphenyl)ethanol; or alternatively, 2-phenyl-1,2-propanediol.

In an aspect, the aromatic polyol of the polyol glycidylether product can be a bisphenol. In embodiments, the bisphenol can be bisphenol A (2,2-di(4-hydroxy-phenyl)propane), bisphenol AP (4,4'-(1-phenyl-ethylidene)bisphenol), bisphenol F (bis(4-hydroxy-phenyl)methane), bisphenol M (4,4'-(1,3-phenylidene-diisopropylidene)bisphenol), bisphenol P (4,4'-(1,4-phenylidene-diiso-propylidene)bisphenol), bisphenol S (4,4'-dihydroxydiphenylsulfone), bisphenol Z (4,4'-cyclo-hexylidene-bisphenol), or any combination thereof. In some embodiments, the bisphenol can be bisphenol A; alternatively, bisphenol AP; alternatively, bisphenol F; alternatively, bisphenol M; alternatively, bisphenol P; alternatively, bisphenol S; or alternatively, bisphenol Z.

In an aspect, the aromatic polyol of the polyol glycidylether product can be a novolak resin. Novolak resins are a broad class of resins that are produced by the condensation reaction of a phenolic compound with an aldehyde. Novolak resins are manufactured using a wide range of phenolic compounds and aldehyde combinations and can be produced in a wide range of molecular weights. Within this specification, the term "novolak resin" generally refers to the oligomerized or polymerized product of the aldehyde and phenolic compound and does not connote any indication of the degree of oligomerization, molecular weight, and/or the physical form (e.g. solid, liquid etc.) of the novolak resin.

In embodiments, the aldehyde used to produce the novolak resin can be formaldehyde. In embodiments, the phenolic compound used to produce the novolak resin can be any phenolic compound capable of undergoing a condensation reaction with an aldehyde. In some non-limiting embodiments, the phenolic compound can be phenol, a substituted phenol, catechol (pyrocatechol), a substituted catechol, resorcinol, a substituted resorcinol, 1,4-benzenediol, a substituted 1,4-benzene diol, 1,2,4-benzenetriol, bisphenol A, Bisphenol AP, bisphenol F, bisphenol M, bisphenol P, bisphenol S, bisphenol Z, or any combination thereof. In some embodiments, the phenolic compound can comprise phenol; alternatively, a substituted phenol; alternatively, catechol; alternatively, a substituted catechol; alternatively, resorcinol; alternatively, a substituted resorcinol; alternatively, 1,4-benzenediol; alternatively, a substituted 1,4-benzenediol; alternatively, 1,2,4-benzenetriol; alternatively, bisphenol A; alternatively, Bisphenol AP; alternatively, bisphenol F; alternatively, bisphenol M; alternatively, bisphenol P; alternatively, bisphenol S; or alternatively, bisphenol Z.

Within the substituted phenolic compound portion of the novolak resin, the substitute(s) can be any organyl group, a hydrocarbyl group, a halide atom, or any combination thereof. In some embodiments, the phenolic compound substituent(s) can be a $C_1$ to $C_{20}$ organyl group, a $C_1$ to $C_{20}$ hydrocarbyl group, a halide atom, or any combination thereof, alternatively, a $C_1$ to $C_{10}$ organyl group, a $C_1$ to $C_{10}$ hydrocarbyl group, a halide atom, or any combination thereof, or alternatively, a $C_1$ to $C_5$ organyl group, a $C_1$ to $C_5$ hydrocarbyl group, a halide atom, or any combination thereof.

Generally, a particular novolak resin can be indicated by prefacing the novolak resin with the aldehyde and/or phenolic compound utilized to produce the novolak resin. Thus, in embodiments, the novolak resin of the polyol glycidylether product can comprise a formaldehyde-phenol novolak resin, a formaldehyde-substituted phenol novolak resin, a formaldehyde-catechol novolak resin, a formaldehyde-substituted catechol novolak resin, a formaldehyde-resorcinol novolak resin, a formaldehyde-substituted resorcinol novolak resin, a formaldehyde-1,4-benzenediol novolak resin, a formaldehyde-substituted 1,4-benzenediol novolak resin, a formaldehyde-1,2,4-benzenetriol novolak resin, a formaldehyde-bisphenol A novolak resin, a formaldehyde-bisphenol AP novolak resin, a formaldehyde-bisphenol F novolak resin, a formaldehyde-bisphenol M novolak resin, a formaldehyde-bisphenol P novolak resin, a formaldehyde-bisphenol S novolak resin, a formaldehyde-bisphenol Z novolak resin, or any combination thereof. In other embodiments, the novolak resin of the polyol glycidylether product can comprise a formaldehyde-phenol novolak resin; alternatively, a formaldehyde-substituted phenol novolak resin; alternatively, formaldehyde-catechol novolak resin; alternatively, a formaldehyde-substituted catechol novolak resin; alternatively, a formaldehyde-resorcinol novolak resin; alternatively, a formaldehyde-substituted resorcinol novolak resin; alternatively, a formaldehyde-1,4-benzenediol novolak resin; alternatively, a formaldehyde-substituted 1,4-benzene diol novolak resin; alternatively, a formaldehyde-1,2,4-benzenetriol novolak resin; alternatively, a formaldehyde-bisphenol A novolak resin; alternatively, a formaldehyde-bisphenol AP novolak resin; alternatively, a formaldehyde-bisphenol F novolak resin; alternatively, a formaldehyde-bisphenol M novolak resin; alternatively, a formaldehyde-bisphenol P novolak resin; alternatively, a formaldehyde-bisphenol S novolak resin; or alternatively, a formaldehyde-bisphenol Z novolak resin.

In embodiments, aliphatic polyol glycidyl ethers that can be utilized within the epoxide composition can include, singly or in any combination thereof, ethylene glycol diglycidyl ether, diethylene glycol diglycidyl ether, triethylene glycol diglycidyl ether, tetraethylene glycol diglycidyl ether, tripropylene glycol diglycidyl ether, diglycidyl ethers of polyethylene glycols with a molecular weight of from 106 to 8500, diglycidyl ethers of polyethylene glycols with a molecular weight of from 400 to 2000, 1,2-propanediol diglycidyl ether, 1,3-propanediol diglycidyl ether, 1,2-butanediol diglycidyl ether, 1,3-butanediol diglycidyl ether, 1,4-butanediol diglycidyl ether, 1,5-pentanediol diglycidyl ether, neopentyl glycol diglycidyl ether, 1,2-hexanediol diglycidyl ether, 1,6-hexanediol diglycidyl ether, 1,2-cyclohexanediol diglycidyl ether, 1,4-cyclohexanediol diglycidyl ether, 1,2-octanediol diglycidyl ether, 1,8-octanediol diglycidyl ether, 1,2-decanediol diglycidyl ether, 1,10-decanediol diglycidyl ether, glycerol triglycidyl ether, 2,2-dimethylolpropane diglycidyl ether, trimethylolethane triglycidyl ether, trimethylolpropane diglycidyl ether, pentaerythritol tetraglycidyl ether, dipentaerythritol tetraglycidyl ether, dipentaerythritol hexaglycidyl ether, sorbitol tetraglycidyl ether, sorbitol hexaglycidyl ether, 1,2,4-butanetriol triglycidyl ether, 2,2,4-trimethyl-1,3-pentanediol triglycidyl ether, or combinations thereof In some embodiments, aliphatic polyol glycidyl ethers that can be utilized within the epoxide composition can comprise ethylene glycol diglycidyl ether, diethylene glycol diglycidyl ether, triethylene glycol diglycidyl ether, tetraethylene glycol diglycidyl ether; alternatively, tripropylene glycol diglycidyl ether; alternatively, ethylene glycol diglycidyl ether; alternatively, diethylene glycol diglycidyl ether; alternatively, triethylene glycol diglycidyl ether; alternatively, tetraethylene glycol diglycidyl ether; alternatively, diglycidyl ethers of polyethylene glycols with a molecular weight of from 106 to 8500; alternatively, diglycidyl ethers of polyethylene glycols with a molecular weight of from 400 to 2000; alternatively, 1,2-propanediol diglycidyl ether, 1,3-propanediol diglycidyl ether, or mixtures thereof, alternatively, 1,2-butanediol diglycidyl ether, 1,3-butanediol diglycidyl ether, 1,4-butanediol diglycidyl ether, or mixtures thereof, alternatively, 1,5-pentanediol diglycidyl ether, neopentyl glycol diglycidyl ether, or mixtures, thereof, alternatively, 1,2-cyclohexanediol diglycidyl ether, 1,4-cyclohexanediol diglycidyl ether, or mixtures thereof, alternatively, 1,2-hexanediol diglycidyl ether or 1,6-hexanediol diglycidyl ether; alternatively, 1,2-octanediol diglycidyl ether or 1,8-octanediol diglycidyl ether; alternatively, 1,2-decanediol diglycidyl ether or 1,10-decanediol diglycidyl ether; alternatively, glycerol triglycidyl ether; alternatively, 2,2-dimethylolpropane diglycidyl ether; alternatively, trimethylolethane triglycidyl ether; alternatively, trimethylolpropane triglycidyl ether; alternatively, pentaerythritol tetraglycidyl ether; alternatively, dipentaerythritol hexaglycidyl; alternatively, dipentaerythritol tetraglycidyl ether; alternatively, sorbitol tetraglycidyl ether; sorbitol hexaglycidyl ether; alternatively, 1,2,4-butanetriol triglycidyl ether; or alternatively, 2,2,4-trimethyl-1,3-pentanediol diglycidyl ether. In other embodiments, aliphatic polyol glycidyl ethers that can be utilized within the epoxide composition can comprise a polyglycidyl ether of an ethoxylate, a propoxylate, or a polyglycidyl ether of a mixed ethoxylate/propoxylate of a polyol or mixture of a polyols. In yet other embodiments, aliphatic polyol glycidyl ethers that can be utilized within the epoxide composition can comprise a polyglycidyl ether of a polyol ethoxylate product containing from 2 to 400 mol of ethylene oxide per mole of polyol.

In embodiments, cyclic polyol glycidyl ethers that can be utilized within the epoxide composition can include, singly or in any combination thereof, 1,2-cyclopentanediol diglycidyl ether, 1,3-cyclopentanediol diglycidyl ether, 1,2-cyclohexanediol diglycidyl ether, 1,3-cyclohexanediol diglycidyl ether, 1,4-cyclohexanediol diglycidyl ether, 1,2-cyclohexanedimethanol diglycidyl ether, 1,4-cyclohexanedimethanol diglycidyl ether, bis(4-hydroxycyclohexyl)methane diglycidyl ether, 2,2-bis(4-hydroxy-cyclo-hexyl)-propane diglycidyl ether, or any combination thereof. In some embodiments, aliphatic polyol glycidyl ethers that can be utilized within the epoxide composition can comprise 1,2-cyclopentanediol diglycidyl ether, 1,3-cyclopentanediol diglycidyl ether, or mixtures thereof; alternatively, 1,2-cyclohexanediol diglycidyl ether, 1,3-cyclohexanediol diglycidyl ether, 1,4-cyclohexanediol diglycidyl ether, or mixtures thereof; alternatively, 1,2-cyclopentanediol diglycidyl ether; alternatively, 1,3-cyclopentanediol diglycidyl ether; alternatively, 1,2-cyclohexanediol diglycidyl ether; alternatively, 1,3-cyclohexanediol diglycidyl ether; alternatively, 1,4-cyclohexanediol diglycidyl ether; alternatively, 1,2-cyclohexanedimethanol diglycidyl ether; alternatively, 1,4-cyclohexanedimethanol diglycidyl ether; alternatively, bis(4-hydroxy-cyclohexyl) methane diglycidyl ether; or alternatively, 2,2-bis(4-hydroxy-cyclo-hexyl)-propane diglycidyl ether.

In embodiments, aromatic polyol glycidyl ethers that can be utilized within the epoxide composition can include, singly or in any combination thereof, 1-phenyl-1,2-ethanediol diglycidyl ether, 1,2-benzenediol diglycidyl ether(pyrocatechol diglycidyl ether), 1,3-benzenediol diglycidyl ether(resorcinol diglycidyl ether), 1,4-benzenediol diglycidyl ether, methyl catechol diglycidyl ether, methyl resorcinol diglycidyl ether, 1,2,4-benzenetriol triglycidyl ether, 2-hydroxybenzylalcohol diglycidyl ether, 3-hydroxybenzylalcohol diglycidyl ether, 4-hydroxybenzylalcohol diglycidyl ether, 3,5-dihydroxybenzylalcohol diglycidyl ether, 1,2-benzenedimethanol diglycidyl ether, 1,3-benzenedimethanol diglycidyl ether, 1,4-benzene-dimethanol diglycidyl ether, 2-(2-hydroxyphenyl)ethanol diglycidyl ether, 2-(3-hydroxy-phenyl)-ethanol diglycidyl ether, 2-(4-hydroxy-phenyl)ethanol diglycidyl ether, or 2-phenyl-1,2-propanediol diglycidyl ether. In embodiments, aromatic polyol glycidyl ethers that can be utilized within the epoxide composition can be 1-phenyl-1,2-ethanediol diglycidyl ether; alternatively, 1,2-benzenediol diglycidyl ether; alternatively, 1,3-benzenediol diglycidyl ether; alternatively, 1,4-benzenediol diglycidyl ether; alternatively, methyl catechol diglycidyl ether; alternatively, methyl resorcinol diglycidyl ether; alternatively, 1,2,4-benzenetriol triglycidyl ether; alternatively, 2-hydroxybenzylalcohol diglycidyl ether; alternatively, 3-hydroxybenzylalcohol diglycidyl ether; alternatively, 4-hydroxybenzylalcohol diglycidyl ether; alternatively, 3,5-dihydroxybenzylalcohol diglycidyl ether; alternatively, 1,2-benzenedimethanol diglycidyl ether; alternatively, 1,3-benzenedimethanol diglycidyl ether; alternatively, 1,4-benzenedimethanol diglycidyl ether; alternatively, 2-(2-hydroxyphenyl)ethanol diglycidyl ether; alternatively, 2-(3-hydroxy-phenyl)ethanol diglycidyl ether; alternatively, 2-(4-hydroxyphenyl)-ethanol diglycidyl ether; or alternatively, 2-phenyl-1,2-propanediol diglycidyl ether.

In embodiments, the glycidyl ether that can be utilized within the epoxide composition can be a novolak polyglycidyl ether (a glycidylether product of a novolak resin). In embodiments, the novolak polyglycidyl ethers that can be utilized within the epoxide composition can include a formaldehyde-phenol novolak polyglycidyl ether, a formaldehyde-substituted phenol novolak polyglycidyl ether, a formaldehyde-catechol novolak polyglycidyl ether, a formaldehyde-substituted catechol novolak polyglycidyl ether, a formaldehyde-resorcinol novolak polyglycidyl ether, a formaldehyde-substituted resorcinol novolak polyglycidyl ether, a formaldehyde-1,4-benzenediol novolak polyglycidyl ether, a formaldehyde-substituted 1,4-benzene diol novolak polyglycidyl ether, a formaldehyde-1,2,4-benzenetriol novolak polyglycidyl ether, a formaldehyde-bisphenol A novolak polyglycidyl ether, a formaldehyde-bisphenol AP novolak polyglycidyl ether, a formaldehyde-bisphenol F novolak polyglycidyl ether, a formaldehyde-bisphenol M novolak polyglycidyl ether, a formaldehyde-bisphenol P novolak polyglycidyl ether, a formaldehyde-bisphenol S novolak polyglycidyl ether, a formaldehyde-bisphenol Z novolak polyglycidyl ether, or any combination thereof. In other embodiments, the novolak polyglycidyl ether of the polyol glycidylether product can comprise a formaldehyde-phenol novolak polyglycidyl ether; alternatively, a formaldehyde-substituted phenol novolak polyglycidyl ether; alternatively, formaldehyde-catechol novolak polyglycidyl ether; alternatively, a formaldehyde-substituted catechol novolak polyglycidyl ether; alternatively, a formaldehyde-resorcinol novolak polyglycidyl ether; alternatively, a formaldehyde-substituted resorcinol novolak polyglycidyl ether; alternatively, a formaldehyde-1,4-benzenediol novolak polyglycidyl ether; alternatively, a formaldehyde-substituted 1,4-benzene diol novolak polyglycidyl ether; alternatively, a formaldehyde-1,2,4-benzenetriol novolak polyglycidyl ether; alternatively, a formaldehyde-bisphenol A novolak polyglycidyl ether; alternatively, a formaldehyde-bisphenol AP novolak polyglycidyl ether; alternatively, a formaldehyde-bisphenol F novolak polyglycidyl ether; alternatively, a formaldehyde-bisphenol M novolak polyglycidyl ether; alternatively, a formaldehyde-bisphenol P novolak polyglycidyl ether; alternatively, a formaldehyde-bisphenol S novolak polyglycidyl ether; or alternatively, a formaldehyde-bisphenol Z novolak polyglycidyl ether.

Unsaturated Esters

The unsaturated ester used as a feedstock to produce some of the thiol ester compositions disclosed herein can be described using a number of different methods. One method of describing the unsaturated ester feedstock is by the number of ester groups and the number of carbon-carbon double bonds that comprise each unsaturated ester oil molecule. Suitable unsaturated esters used as a feedstock to produce the thiol ester compositions described herein minimally comprise at least 1 ester group and at least 1 carbon-carbon double bond. However, beyond this requirement, the number of ester groups and carbon-carbon double bonds comprising the unsaturated esters are independent elements and can be varied independently of each other. Thus, the unsaturated esters can have any combination of the number of ester groups and the number of carbon-carbon double bonds described separately herein. Suitable, unsaturated esters can also contain additional functional groups such as alcohol, aldehyde, ketone, epoxy, ether, aromatic groups, and combinations thereof. As an example, the unsaturated esters can also comprise hydroxy groups. An example of an unsaturated ester that contains hydroxy groups is castor oil. Other suitable unsaturated esters will be apparent to those of skill in the art and are to be considered within the scope of the present invention.

Minimally, the unsaturated ester comprises at least one ester group. In other embodiments, the unsaturated ester comprises at least 2 ester groups. Alternatively, the unsaturated ester comprises 3 ester groups. Alternatively, the unsaturated ester comprises 4 ester groups. Alternatively, the unsaturated ester includes from 2 to 8 ester groups. Alternatively, the unsaturated ester includes from 2 to 7 ester groups. Alternatively, the unsaturated ester includes from 3 to 5 ester groups. As another alternative, the unsaturated ester includes from 3 to 4 ester groups.

In other embodiments, the unsaturated ester comprises a mixture of unsaturated esters. In these situations, the number of ester groups is best described as an average number of ester groups per unsaturated ester molecule comprising the unsaturated ester composition. In some embodiments, the unsaturated esters have an average of at least 1.5 ester groups per unsaturated ester molecule; alternatively, an average of at least 2 ester groups per unsaturated ester molecule; alternatively, an average of at least 2.5 ester groups per unsaturated ester molecule; or alternatively, an average of at least 3 ester groups per unsaturated ester molecule. In other embodiments, the unsaturated esters have an average of from 1.5 to 8 ester groups per unsaturated ester molecule; alternatively, an average of from 2 to 7 ester groups per unsaturated ester molecule;

alternatively, an average of from 2.5 to 5 ester groups per unsaturated ester molecule; or alternatively, an average of from 3 to 4 ester groups per unsaturated ester molecule. In another embodiment, the unsaturated esters have an average of about 3 ester groups per unsaturated ester molecule; or alternatively, an average of about 4 ester groups per unsaturated ester molecule.

Minimally, the unsaturated ester comprises at least one carbon-carbon double bond per unsaturated ester molecule. In an embodiment, the unsaturated ester comprises at least 2 carbon-carbon double bonds; alternatively, at least 3 carbon-carbon double bonds; or alternatively, at least 4 carbon-carbon double bonds. In other embodiments, the unsaturated ester comprises from 2 to 9 carbon-carbon double bonds; alternatively, from 2 to 4 carbon-carbon double bonds; alternatively, from 3 to 8 carbon-carbon double bonds; or alternatively, from 4 to 8 carbon-carbon double bonds.

In some embodiments, the unsaturated ester comprises a mixture of unsaturated esters. In this aspect, the number of carbon-carbon double bonds in the mixture of unsaturated ester is best described as an average number of carbon-carbon double bonds per unsaturated ester oil molecule. In some embodiments, the unsaturated esters have an average of at least 1.5 carbon-carbon double bonds per unsaturated ester molecule; alternatively, an average of at least 2 carbon-carbon double bonds per unsaturated ester molecule; alternatively, an average of at least 2.5 carbon-carbon double bonds per unsaturated ester molecule; or alternatively, an average of at least 3 carbon-carbon double bonds per unsaturated ester molecule. In other embodiments, the unsaturated esters have average of from 1.5 to 9 carbon-carbon double bonds per unsaturated ester molecule; alternatively, an average of from 3 to 8 carbon-carbon double bonds per unsaturated ester molecule; alternatively, an average of from 2 to 4 carbon-carbon double bonds per unsaturated ester molecule; or alternatively, an average of from 4 to 8 carbon-carbon double bonds per unsaturated ester molecule.

While the number (or average number) of ester groups and the number (or average number) of double bonds are independent elements of the unsaturated esters, particular embodiments are mentioned for illustrative purposes. In an embodiment, the unsaturated ester molecules have an average of at least 1.5 ester groups per unsaturated ester molecule and have an average of at least 1.5 carbon-carbon double bonds per unsaturated ester molecule. Alternatively, the unsaturated ester molecules have an average of at least 3 ester groups per unsaturated ester molecule and have an average of at least 1.5 carbon-carbon double bonds per unsaturated ester molecule. Alternatively, the unsaturated ester molecules have an average of at least 3 ester groups per unsaturated ester molecule and have an average of from 1.5 to 9 carbon-carbon double bonds per unsaturated ester molecule. As another alternative, the unsaturated ester molecules have an average of from 2 to 8 ester groups per unsaturated ester molecule and have an average of from 1.5 to 9 carbon-carbon double bonds per unsaturated ester oil.

In addition to the number (or average number) of ester groups and the number (or average number) of carbon-carbon double bonds present in the unsaturated ester molecules, the disposition of the carbon-carbon double bonds in unsaturated ester molecules having 2 or more carbon-carbon double bonds can be a consideration. In some embodiments where the unsaturated ester molecules have 2 or more carbon-carbon double bonds, the carbon-carbon double bonds can be conjugated. In other embodiments, the carbon-carbon double bonds can be separated from each other by only one carbon atom. When two carbon-carbon double bonds are separated by a carbon atom having two hydrogen atoms attached to it, e.g. a methylene group, the carbon-carbon double bonds can be termed as methylene interrupted double bonds. In yet other embodiments, the carbon-carbon double bonds are isolated, i.e. the carbon-carbon double bonds are separated from each other by 2 or more carbon atoms. In further embodiments, the carbon-carbon double bonds can be conjugated with a carbonyl group.

In some aspects, the unsaturated ester can be described as an ester of a polyol and unsaturated carboxylic acids. While this description appears to imply that the unsaturated ester is prepared by contacting a polyol with an unsaturated carboxylic acid, one skilled in the art will recognize that the unsaturated ester can be prepared in a multitude of methods including reaction of a polyol with an unsaturated carboxylic acid, reaction of a polyol with an unsaturated carboxylic acid anhydride, reaction of a simple unsaturated carboxylic acid ester with a polyol, or reaction of a polyol with an unsaturated carboxylic acid halide, among other methods. Thus, the manner in which the unsaturated ester is described does not limit the methods by which the unsaturated ester can be produced. Additionally, the manner in which the unsaturated ester is described does not imply that the unsaturated ester is synthetically produced. For example, some natural triglycerides (e.g. soybean, and castor oil, among other) can be described as an ester of glycerol (a polyol) and an unsaturated carboxylic acid.

Within the description of an unsaturated ester is an ester (or unsaturated ester) of a polyol and an unsaturated carboxylic acid, the unsaturated carboxylic acid portion of the unsaturated ester can be called a polyol side chain (i.e. a side chain). In some embodiments, the unsaturated ester comprises less than 30 percent of side chains comprising methylene interrupted double bonds. In other embodiments, the unsaturated ester comprises greater than 30 percent of the side chains comprise methylene interrupted double bonds. In yet other embodiments, the unsaturated ester comprises less than 25 percent of side chains having 3 contiguous methylene interrupted carbon-carbon double bonds. In further embodiments, the unsaturated ester comprises less than 25 percent linolenic side chains. In further embodiments, the unsaturated ester comprises greater than 25 percent of side chains having 3 contiguous methylene interrupted carbon-carbon double bonds. In further embodiments, the unsaturated ester comprises greater than 25 percent linolenic side chains. In additional embodiments, the unsaturated ester comprises at least 30 percent side chains having 2 contiguous methylene interrupted carbon-carbon double bonds and less than 25 percent of side chains having 3 contiguous methylene interrupted carbon-carbon double bonds.

Additional functional groups can also be present in the unsaturated ester. A non-limiting list of functional groups includes a hydroxy group, an ether group, aldehyde group, a ketone group, an amine group, a carboxylic acid group among others, and combinations thereof. In an aspect, the unsaturated ester can comprise hydroxy groups. In some embodiments, the unsaturated esters have an average of at least 1.5 hydroxy groups per unsaturated ester molecule; alternatively, an average of at least 2 hydroxy groups per unsaturated ester molecule; alternatively, an average of at least 2.5 hydroxy groups per unsaturated ester molecule; or alternatively, an average of at least 3 hydroxy groups per unsaturated ester molecule. In other embodiments, the unsaturated esters have an average of from 1.5 to 9 hydroxy groups per unsaturated ester molecule; alternatively, an average of from 3 to 8 hydroxy groups per unsaturated ester molecule; alternatively, an average of from 2 to 4 hydroxy groups per unsaturated ester molecule; or alternatively, an average of from 4 to 8 hydroxy groups per unsaturated ester molecule. In an embodiment, the unsaturated ester comprises at least 2 hydroxy groups; alternatively, at least 3 hydroxy groups; or alternatively, at least 4 hydroxy groups. In other embodiments, the unsaturated ester comprises from 2 to 9 hydroxy groups; alternatively, from 2 to 4 hydroxy groups; alternatively, from 3 to 8 hydroxy groups; or alternatively, from 4 to 8 hydroxy groups.

The unsaturated ester utilized to produce the thiol ester compositions can be any unsaturated ester having any number of ester groups and carbon-carbon double bonds per unsaturated ester described herein. The unsaturated esters can be derived from natural sources, synthetically produced from natural source raw materials, produced from synthetic raw materials, produced from a mixture of natural and synthetic materials, or a combination thereof.

Unsaturated Natural Source Oil

In an embodiment, the unsaturated ester is unsaturated natural source oil. The unsaturated natural source oil can be derived from naturally occurring nut, vegetable, plant, and animal sources. In an embodiment, the unsaturated ester comprises a triglyceride derived from naturally occurring nuts, vegetables, plant, and animal sources. In an embodiment, the unsaturated ester can be derived from genetically modified nuts, vegetables, plant, and animal sources. In an embodiment, the unsaturated ester oil comprises a triglyceride derived from genetically modified nuts, vegetables, plant, animal sources, and combinations thereof.

In an aspect, the unsaturated natural source oil can be tallow, olive, peanut, castor bean, sunflower, sesame, poppy, seed, palm, almond seed, hazelnut, rapeseed, canola, soybean, corn, safflower, canola, cottonseed, camelina, flaxseed, or walnut oil. In some embodiment, the unsaturated natural source oil can be soybean, corn, castor bean, safflower, canola, cottonseed, camelina, flaxseed, walnut oil, and combinations thereof. In further embodiments, the unsaturated natural source oil can be soybean oil; alternatively, corn oil; alternatively, castor bean oil; or alternatively, canola oil.

The unsaturated natural source oils are comprised of triglycerides that can be described as an ester of glycerol and an unsaturated carboxylic acid. Within this description, the unsaturated carboxylic acid portion of the triglyceride can be called a glycerol side chain (i.e. a side chain). In some embodiments, the triglyceride comprises less than 30 percent of side chains comprising methylene interrupted double bonds. In other embodiments, the triglyceride comprises greater than 30 percent of the side chains comprise methylene interrupted double bonds. In yet other embodiments, the triglyceride comprises less than 25 percent of side chains having 3 contiguous methylene interrupted carbon-carbon double bonds. In further embodiments, the triglyceride comprises less than 25 percent linolenic side chains. In further embodiments, the triglyceride comprises greater than 25 percent of side chains having 3 contiguous methylene interrupted carbon-carbon double bonds. In further embodiments, the triglyceride comprises greater than 25 percent linolenic side chains. In additional embodiments, the triglyceride comprises at least 30 percent side chains having 2 contiguous methylene interrupted carbon-carbon double bonds and less than 25 percent of side chains having 3 contiguous methylene interrupted carbon-carbon double bonds.

In another embodiment, the unsaturated natural ester oil comprises "natural" triglycerides derived from unsaturated natural source oils. In an embodiment, the unsaturated ester oil is synthetic. In an embodiment, the unsaturated ester oil comprises both synthetic and natural raw materials. In an embodiment, the unsaturated ester oil comprises synthetic triglycerides.

Synthetic Unsaturated Esters

Synthetic unsaturated esters used as feedstock for aspects of this invention can be produced using methods for producing an ester group known to those skilled in the art. The term "ester group" means a moiety formed from the reaction of a hydroxy group and a carboxylic acid or a carboxylic acid derivative. Typically, the esters can be produced by reacting an alcohol with a carboxylic acid, transesterification of carboxylic acid ester with an alcohol, reacting an alcohol with a carboxylic acid anhydride, or reacting an alcohol with a carboxylic acid halide. Any of these methods can be used to produce the synthetic unsaturated ester oils used as a feedstock in an aspect of this invention. The alcohol, unsaturated carboxylic acid, unsaturated carboxylic acid ester, and unsaturated carboxylic acid anhydride raw materials for the production of the unsaturated ester oil can be derived from natural, synthetic, genetic, or any combination of natural, genetic, and synthetic sources.

The polyols and the unsaturated carboxylic acids, simple unsaturated carboxylic acid esters, or unsaturated carboxylic acid anhydrides used to produce the unsaturated esters used as a feedstock in various aspects of this invention are independent elements. That is, these elements can be varied independently of each other and thus, can be used in any combination to produce an unsaturated ester utilized as a feedstock to produce the compositions described in this application or as a feedstock for the processes described in this application.

Synthetic Unsaturated Ester Oils—Polyol Component

The polyol used to produce the unsaturated ester oil can be any polyol or mixture of polyols capable of reacting with an unsaturated carboxylic acid, unsaturated simple carboxylic acid ester, carboxylic acid anhydride, or carboxylic acid halide under reaction conditions apparent to those skilled in the art.

The number of carbon atoms in the polyol can be varied. In one aspect, the polyol used to produce the unsaturated ester can comprise from 2 to 20 carbon atoms. In other embodiments, the polyol comprises from 2 to 10 carbon atoms; alternatively, from 2 to 7 carbon atoms; or alternatively, from 2 to 5 carbon atoms. In further embodiments, the polyol can be a mixture of polyols having an average of 2 to 20 carbon atoms; alternatively, an average of from 2 to 10 carbon atoms; alternatively, an average of 2 to 7 carbon atoms; or alternatively, an average of 2 to 5 carbon atoms.

In another aspect, the polyol used to produce the unsaturated ester can have any number of hydroxy groups needed to produce the unsaturated ester as described herein. In some embodiments, the polyol has 2 hydroxy groups; alternatively, 3 hydroxy groups; alternatively, 4 hydroxy groups; alternatively, 5 hydroxy groups; or alternatively, 6 hydroxy groups. In other embodiments, the polyol comprises at least 2 hydroxy groups; alternatively, at least 3 hydroxy groups; alternatively, at least 4 hydroxy groups; alternatively, at least 5 hydroxy groups; or alternatively, at least 6 hydroxy groups. In yet other embodiments, the polyol comprises from 2 to 8 hydroxy groups; alternatively, from 2 to 4 hydroxy groups; or alternatively, from 4 to 8 hydroxy groups.

In further aspects, the polyol used to produce the unsaturated ester is a mixture of polyols. In an embodiment, the mixture of polyols has an average of at least 1.5 hydroxy groups per polyol molecule. In other embodiments, the mixture of polyols has an average of at least 2 hydroxy groups per polyol molecule; alternatively, an average of at least 2.5 hydroxy groups per polyol molecule; alternatively, an average of at least 3.0 hydroxy groups per polyol molecule; or alternatively, an average of at least 4 hydroxy groups per polyol molecule. In yet other embodiments, the mixture of polyols has an average of 1.5 to 8 hydroxy groups per polyol molecule; alternatively, an average of 2 to 6 hydroxy groups per polyol molecule; alternatively, an average of 2.5 to 5 hydroxy groups per polyol molecule; alternatively, an average of 3 to 4 hydroxy groups per polyol molecule; alternatively, an average of 2.5 to 3.5 hydroxy groups per polyol molecule; or alternatively, an average of 2.5 to 4.5 hydroxy groups per polyol molecule.

In yet another aspect, the polyol or mixture of polyols used to produce the unsaturated thiol ester has a molecular weight or average molecular weight less than 500. In other embodiments, the polyol or mixture of polyols have a molecular weight or average molecular weight less than 300; alternatively, less than 200; alternatively, less than 150; or alternatively, less than 100.

In some embodiments, suitable polyols include 1,2-ethanediol, 1,3-propanediol, 1,4-butanediol, 1,5-pentanediol, 1,6-hexanediol, dimethylolpropane, neopentylpropane, 2-propyl-2-ethyl-1,3-propanediol, 1,2-propanediol, 1,3-butanediol, diethylene glycol, triethylene glycol, polyethylene glycol, dipropylene glycol, tripropylene glycol, polypropylene glycol, cyclohexanedimethanol, 1,3-dioxane-5,5-dimethanol, 1,4-xylylenedimethanol, 1-phenyl-1,2-ethanediol, trimethylolpropane, trimethylolethane, trimethylolbutane, glycerol, 1,2,5-hexanetriol, pentaerythritol, ditrimethylolpropane, diglycerol, ditrimethylolethane, 1,3,5-trihydroxybenzene, 1,4-xylylenedimethanol, 1-phenyl-1,2-ethanediol, or any combination thereof. In further embodiments, the polyol is glycerol, pentaerythritol, or mixtures thereof In other embodiments, the polyol is glycerol; or alternatively, pentaerythritol.

Synthetic Unsaturated Ester—Carboxylic Acid or Carboxylic Acid Equivalent Component The carboxylic acid component of the unsaturated ester oil can be any carboxylic acid or mixture of carboxylic acids comprising a carbon-carbon double bond. As the carboxylic acid component will be combined with a polyol or polyol mixture comprising an average of greater than 1.5 hydroxy groups or any other number of hydroxy groups described herein, the carboxylic acid component can be any mixture comprising unsaturated carboxylic acids that produces an unsaturated ester oil meeting the feedstock requirements described herein. In some embodiments, the carboxylic acid component can be any mixture of saturated carboxylic acid and unsaturated carboxylic acid that produces an unsaturated ester oil meeting the feedstock requirements described herein. Thus, the carboxylic acid or carboxylic acid mixture used to produce the synthetic unsaturated ester oil can be described as having an average number of a specified element per carboxylic acid.

Independent elements of the carboxylic acid include the average number of carboxylic acid groups per carboxylic acid molecule, the average number of carbon atoms present in the carboxylic acid, and the average number of carbon-carbon double bonds per carboxylic acid. Additional independent elements include the position of the double bond in the carbon chain and the relative position of the double bonds with respect to each other when there are multiple double bonds.

Specific carboxylic acids used to produce the unsaturated ester oil can have from 3 to 30 carbon atoms per carboxylic acid molecule. In some embodiments, the carboxylic acid is linear. In some embodiments, the carboxylic acid is branched. In some embodiments, the carboxylic acid is a mixture of linear and branched carboxylic acids. In some embodiments, the carboxylic acid can also comprise additional functional groups including alcohols, aldehydes, ketones, and epoxides, among others.

Suitable carboxylic acids that can be used as a component of the unsaturated carboxylic acid composition can have from about 3 to about 30 carbon atoms; alternatively, 8 to 25 carbon atoms; or alternatively, from 12 to 20 carbon atoms. In other embodiments, the carboxylic acids comprising the unsaturated carboxylic acid composition comprise an average of 3 to 30 carbon atoms; alternatively, an average of 8 to 25 carbon atoms; or alternatively, an average of from 12 to 20 carbon atoms.

The carbon-carbon double bond can be located anywhere along the length of the carbon-carbon chain. In one embodiment, the double bond can be located at a terminal position. In another embodiment, the carbon-carbon double bond can be located at an internal position. In yet another embodiment, the carboxylic acid or mixture of carboxylic acids can comprise both terminal and internal carbon-carbon double bonds. The double bond can also be described by indicating the number of substitutes that are attached to the carbon-carbon double bond. In some embodiments, the carbon-carbon double bond can be mono-substituted, disubstituted, trisubstituted, tetrasubstituted, or a mixture of unsaturated carboxylic acids that can have any combination of monosubstituted, disubstituted, trisubstituted and tetrasubstituted carbon-carbon double bonds.

Suitable unsaturated carboxylic acids include acrylic, agonandoic, agonandric, alchornoic, ambrettolic, angelic, asclepic, auricolic, avenoleic, axillarenic, brassidic, caproleic, cetelaidic, cetoleic, civetic, coriolic, coronaric, crepenynic, densipolic, dihomolinoleic, dihomotaxoleic, dimorphecolic, elaidic, ephedrenic, erucic, gadelaidic, gadoleic, gaidic, gondolo, gondoleic, gorlic, helenynolic, hydrosorbic, isoricinoleic, keteleeronic, labellenic, lauroleic, lesquerolic, linelaidic, linderic, linoleic, lumequic, malvalic, mangold's acid, margarolic, megatomic, mikusch's acid, mycolipenic, myristelaidic, nervoic, obtusilic, oleic, palmitelaidic, petroselaidic, petroselinic, phlomic, physeteric, phytenoic, pyrulic, ricinelaidic, rumenic, selacholeic, sorbic, stearolic, sterculic, sterculynic, stillingic, strophanthus, tariric, taxoleic, traumatic, tsuduic, tsuzuic, undecylenic, vaccenic, vernolic, ximenic, ximenynic, ximenynolic, and combinations thereof. In further embodiments, suitable unsaturated carboxylic acids include oleic, palmitoleic, ricinoleic, linoleic, and combinations thereof. Other suitable unsaturated carboxylic acids will be apparent to those persons having ordinary skill in the art and are to be considered within the scope of the present invention.

In some embodiments, the unsaturated ester can be produced by transesterification of a simple ester of the carboxylic acid or mixture of carboxylic acids described herein with the polyol compositions described herein. In some embodiments, the simple ester is a methyl or ethyl ester of the carboxylic acid or mixture of carboxylic acids. In further embodiments, the simple carboxylic acid ester is a methyl ester of the carboxylic acids described herein.

Epoxidized Unsaturated Esters

In an aspect, epoxidized unsaturated esters are used as a feedstock to produce materials described herein and for the processes to produce the material described herein. Generally, the epoxidized unsaturated ester can be derived by epoxidizing any unsaturated ester described herein. The unsaturated ester oil can be derived from natural sources, synthetically produced from natural source raw materials, produced from synthetic raw materials, produced from a mixture of natural and synthetic materials, or a combination thereof.

Minimally, the epoxidized unsaturated ester comprises at least one epoxide group. In an embodiment, the epoxidized unsaturated ester comprises at least 2 epoxide groups; alternatively, at least 3 epoxide groups; or alternatively, at least 4 epoxide groups. In other embodiments, the epoxidized unsaturated ester comprises from 2 to 9 epoxide groups; alternatively, from 2 to 4 epoxide groups; alternatively, from 3 to 8 epoxide groups; or alternatively, from 4 to 8 epoxide groups.

In some embodiments, the unsaturated ester comprises a mixture of epoxidized unsaturated esters. In this aspect, the number of epoxide groups in the epoxidized unsaturated ester can be described as an average number of epoxide groups per epoxidized unsaturated ester molecule. In some embodiments, the epoxidized unsaturated esters have an average of at least 1.5 epoxide groups per epoxidized unsaturated ester molecule; alternatively, an average of at least 2 epoxide groups per epoxidized unsaturated ester molecule; alternatively, an average of at least 2.5 epoxide groups per epoxidized unsaturated ester molecule; or alternatively, an average of at least 3 epoxide groups per epoxidized unsaturated ester molecule. In other embodiments, the epoxidized unsaturated esters have an average of from 1.5 to 9 epoxide groups per epoxidized unsaturated ester molecule; alternatively, an average of from 3 to 8 epoxide groups per epoxidized unsaturated ester molecule; alternatively, an average of from 2 to 4 epoxide groups per epoxidized unsaturated ester molecule; or alternatively, an average of from 4 to 8 epoxide groups per epoxidized unsaturated ester molecule.

In an aspect the epoxidized unsaturated ester can be an epoxidized unsaturated natural source oil. The unsaturated natural source oil can be derived from naturally occurring nut, vegetable, plant, and animal sources. In an embodiment, the unsaturated ester oil is derived from genetically modified nuts, vegetables, plant, and animal sources. In an embodiment, the unsaturated ester oil comprises a triglyceride derived from genetically modified nuts, vegetables, plant, and animal sources.

In an aspect, the feedstock natural source oil for the epoxidized natural source oil can be tallow, olive, peanut, castor bean, sunflower, sesame, poppy, seed, palm, almond seed, hazelnut, rapeseed, canola, soybean, corn, safflower, canola, cottonseed, camelina, flaxseed, or walnut oil. In some embodiments, the feedstock natural source oil for the epoxidized natural source oil can be soybean, corn, castor bean, safflower, canola, cottonseed, camelina, flaxseed, or walnut oil. In further embodiments, the feedstock natural source oil for the epoxidized natural source oil can be soybean oil; alternatively, corn oil; alternatively, castor bean oil; or alternatively, canola oil. Consequently, the epoxidized natural source oil can be referred to using the prefix of epoxidized before the specific natural source oil, e.g. epoxidized soybean oil, epoxidized canola oil, or epoxidized castor oil.

EXAMPLES

Example 1

Mercaptanized Soybean Oil

Mercaptan-hardened epoxy polymer Compositions

TABLE 1

MERCAPTAN-HARDENED EPOXY POLYMER COMPOSITIONS

| R&T Feedstocks | Epoxy Resin | Catalysts |
|---|---|---|
| MSO - trifunctional, 2.5-3.0 SH groups per MSO molecule 8.1-9.8 wt. % mercaptan sulfur | Epoxidized Soybean Oil | DABCO |

TABLE 1-continued

MERCAPTAN-HARDENED EPOXY POLYMER COMPOSITIONS

| R&T Feedstocks | Epoxy Resin | Catalysts |
|---|---|---|
| MHSO - trimercaptan, 2.5-3.0 SH groups per MSO molecule 7.3-8.7 wt. % mercaptan sulfur | Araldite ® | TEA |
| MHSO - dimercaptan, 1.8-2.3 SH groups per MSO molecule 5.2-6.4 wt. % mercaptan sulfur | Epikote ® 180 | Jeffol ® A-480 |
| CMSO - low crosslink, 1.8-2.3 SH groups per MSO molecule 4.6-6.4 wt. % mercaptan sulfur | Epikote ® 164 | Versamine ® |
| Mercaptanized Castor Oil, 2.0-2.2 SH groups per MSO molecule 6.4-7.1 wt. % mercaptan sulfur | | |
| Capcure ® - 3800 | | |

Numerous mercaptan-hardened epoxy polymer compositions can be prepared by reacting a thiol ester composition with an epoxide in the presence of a catalyst by using the processes described herein for preparing such mercaptan-hardened epoxy polymer compositions. The compositions can be produced using the different variables of feedstocks, epoxides, and catalysts shown in Table 1. The thiol ester composition feedstocks can include mercaptanized soybean oil (MSO), mercaptohydroxy or mercaptanized epoxidized soybean oil (MHSO), crosslinked mercaptanized soybean oil (CMSO), mercaptanized castor oil (MCaO). Capcure® 3800 is a polymercaptan, which can be used as a feedstock in production of control samples and is produced by Cognis C0. For the epoxides, epoxidized soybean oil, Araldite®, and Epikote® can be used. Araldite® is a bisphenol A composition produced by Huntsman Advanced Materials. Epikote® is a novolak produced by Shell Chemical Corporation. Various amines can be used as the catalyst. Suitable amine catalysts that can be used for the production of the mercaptan-hardened epoxy polymer compositions include diazabicyclooctane—di-tertiary amine (DABCO), triethylamine (TEA), tertiary amine polyol such as Jeffol® A-480 produced by Huntsman Based Chemicals, and aliphatic amine such as Versamine® produced by Cognis Co. The catalyst amount used can vary between 0.002 wt. % up to 0.05 wt. %.

Each of the feedstocks in Table 1 can be reacted with each of the epoxide with each of the catalysts listed to produce the various mercaptan-hardened epoxy polymer compositions. The stoichiometry can be 1, which is based upon a thiol ester composition (MSO, MHSO, CMSO, MCaO) active mercaptan hydrogen to epoxide equivalent ratio (SH:epoxide equivalent ratio). Other suitable stoichiometries can be used. For example, the stoichiometry can be between 0.85 to 1.30; alternatively, 0.9 to 1.25; or alternatively, 0.95 to 1.2. For example, castor oil can be reacted with Araldite® 506 while using Jeffol® A-480 as the catalyst using a stoichiometry of 1.1. As another example, a thiol ester composition can be reacted with Araldite® GY 6010 while using Versamine® EH-30 as the catalyst and using a stoichiometry of 0.9.

Mercaptan-hardened epoxy polymer Preparation

Twenty-eight polymer compositions were prepared, as shown in Tables 2 (FIG. 1) and Table 3 (FIG. 2). Table 2 (FIG. 1) contains the control sample group, while Table 3 (FIG. 2) contains compositions made in accordance with embodiments of the present invention. To prepare the samples, Mercaptanized Soybean Oil (MSO), Mercaptohydroxy Soybean Oil (MHSO), or Capcure® (all referred to hereafter as "crosslinking agent") was weighed into a polyethylene beaker. The desired catalyst was added to the crosslinking agent.

In the samples shown in Table 2 (FIG. 1) and Table 3 (FIG. 2), Versamine® H30 and DBU were the catalysts that were used in the compositions.

The epoxide, which was Araldite® 506, was added to the reaction mixture. The three-component reaction mixture was then manually stirred. The pre-polymer mixture was then poured into the appropriate mold for setup. Example molds include 50 mm diameter or 70 mm diameter aluminum pans. The samples were then allowed to setup at room temperature. The time in which no visual flow could be observed in the mixture while tipping the mold was recorded as the Gel Time in the tables. The samples were then stored at room temperature in plastic, resealable bags for 2 weeks. Other observations were also recorded for the samples and are located in Tables 2 and 3 (FIGS. 1 and 2).

Quick Set Mercaptan-crosslinked epoxy polymer Compositions

A second group of mercaptan-hardened epoxy polymers was prepared as quick set epoxies. The ASTM D4541-02 Pull-Off Strength of Coatings Using Portable Adhesion Testers was performed on this second group of mercaptan-hardened epoxy polymers, as shown in Table 4 (FIG. 3) and Table 5 (FIG. 4). All tests were performed after curing the mercaptan-hardened epoxy polymers for 24 hours at room temperature (~22° C.). The results shown are an average of three measurements that were taken. With respect to the failure type, A=adhesive and C=cohesive. When both failure types are listed, the one that is listed first was predominant.

Table 4 (FIG. 3) contains the results for the control group, while Table 5 (FIG. 4) contains the results for the compositions prepared in accordance with embodiments of the present invention. As can be seen, comparable results can be achieved using the mercaptan-hardened epoxy polymer compositions of the present invention, when compared with the control group.

Many of the crosslinking agents in the control group, such as Loctite® Quickset and Loctite® Plastic, contain additional components, such as substituted aminophenol and nonylphenol, which it is believed could potentially improve the performance of the mercaptan-hardened epoxy polymer compositions of the present invention to surpass the control group of samples in Table 4 (FIG. 3). Capcure®-3-800 and the epoxy hardener portion of both Loctite® products contain polymercaptans, among other substituents. Along with the epoxy hardener, the Loctite® products also contain various epoxy resins.

Example 2

Mercaptanized Soybean Oil Films

Mercaptanized soybean oil was prepared having about 8.6 wt. % mercaptan sulfur and a functionality of about 2.6. The prepared mercaptanized soybean oil was evaluated for use as an epoxy polymer crosslinking agent as a function of epoxy resin type, catalyst type, catalyst concentration, cure profile, and solvent, as shown in Table 6. The effectiveness of the mercaptanized soybean oil was evaluated by qualitative observation of polymer quality on a scale of 1 to 5, with 5=excellent, 4=Very Good, 3=Good, 2=Fair, and 1=poor.

TABLE 6

| Constants | Variable | Levels |
|---|---|---|
| MSO functionality – M.S. = 8.6 wt. % (~2.6 thiol groups per thiol ester molecule) Epoxide/SH mole ratio - 1.02 (slight epoxy excess) | Epoxy Resin | D.E.R. ™[1] 330 D.E.R. ™ 331 D.E.R. ™ 354 |
| | Solvent | No Solvent n-Butanol n-Butyl acetate Xylene |
| Substrate - CRS | Catalyst Type | EH30[2] PMDT[3] Resorcinol |
| Wet film thickness - 5 mil | Cure Temperature | Ambient 100° C. 3 hrs 120° C. 24 hrs |
| | Catalyst Concentration | 1.0 wt. % 2.0 wt. % |

[1]D.E.R. ™ = Dow Epoxy Resins
[2]EH30 = Versamine ® EH 30 - 2,4,6-dimethylamino phenol
[3]PMDT = Pentamethyldiethylenetriamine Each of the MSO/epoxy formulations (MSO, epoxy resin, catalyst, catalyst level, and solvent or no solvent) was mixed at room temperature. The resulting mixture was placed on a cold rolled steel (CRS) Q-panel™ substrate and was drawn down to a 5 mil wet film thickness. The Q-panel™ substrates were prepared by scrubbing with Scotchbrite® pads, wiping with isopropanol, and then drying the substrate. The coated panels were then cured using two different curing profiles. The first cure profile was curing under ambient conditions for one week. The second curing profile used was curing by heating the coated panel to 100° C. for 3 hrs and then 120° C. for 24 hrs. The cured panels were then evaluated for polymer film formation and adhesion to the cold rolled steel. The results of these evaluations are provided FIGS. 5-11.

FIG. 5 illustrates the film quality using the 3 epoxy resins, D.E.R.™ 330, 331, and 354, under the same conditions with the selected solvents. The three epoxy resins used are commercially available liquid epoxy resins from The Dow Chemical Company. D.E.R.™ 330 and 331 are reaction products of epichlorohydrin and bisphenol-A. D.E.R.™ 354 is a reaction product of epichlorohydrin and bisphenol-F. The samples illustrated were made using Versamine® EH30 catalyst at 1.0 wt. % and heat cured as previously described. D.E.R.™ 330 and 331 formed better films using MSO as a hardener and butyl acetate as the solvent than did D.E.R.™ 354, while D.E.R.™ 354 and 331 formed better quality films than D.E.R.™ 330 did using MSO with xylene as the solvent. D.E.R.™ 330 forms better films using n-butanol as the solvent, while D.E.R.™ 331 and 354 form better films using butyl acetate or xylene as a solvent.

Figure 6:
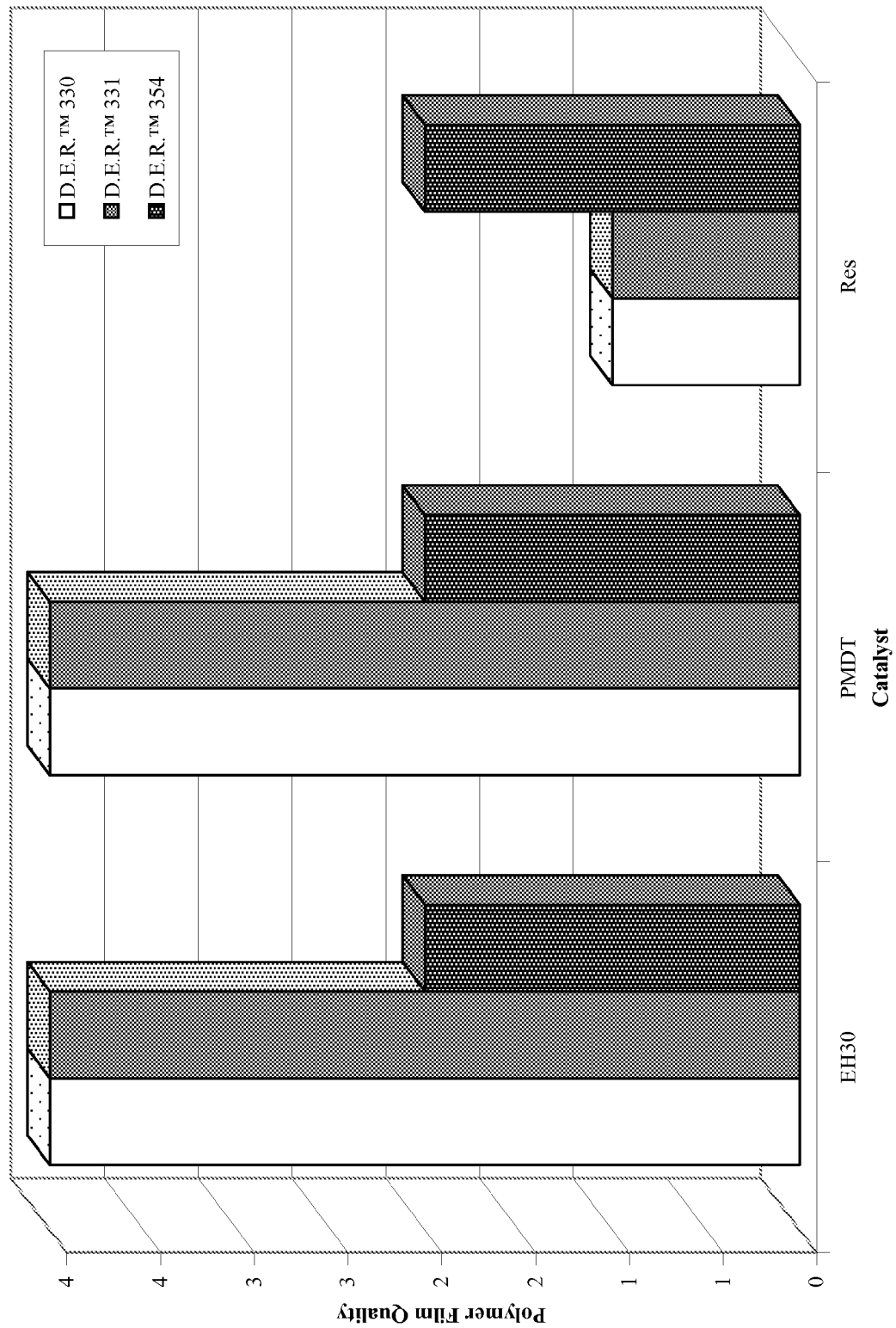
FIG. 6 is a graph showing the effect of epoxy resin type and catalyst on mercaptan-hardened epoxy polymer film quality when using a mercaptanized soybean oil as an epoxy crosslinking agent in accordance with embodiments of the present invention.

The effect of the catalyst is illustrated in FIG. 6. Both D.E.R.™ 330 and 331 yielded better film quality using Versamine® EH30 or PMDT in butyl acetate rather than resorcinol. However, D.E.R.™ 354 seemed to yield similar polymer films in butyl acetate using any of the selected catalysts.

Figure 7:
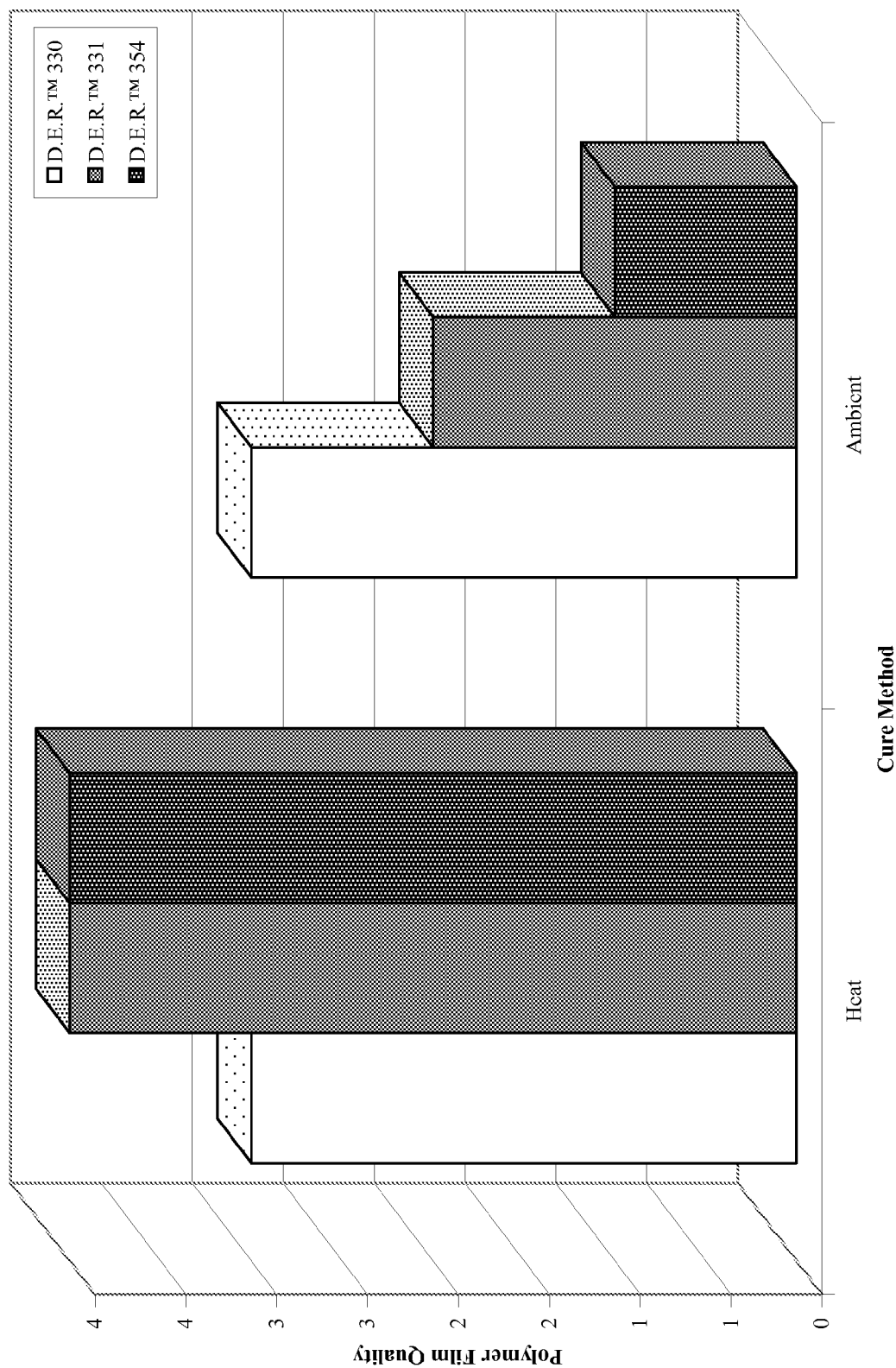
FIG. 7 is a graph showing the effect of epoxy resin type and cure profile on mercaptan-hardened epoxy polymer film quality when using a mercaptanized soybean oil as an epoxy crosslinking agent in accordance with embodiments of the present invention.

The cure profile also played a significant role in the polymer film quality as shown in FIG. 7. D.E.R.™ 330 formed good, similar quality films with either ambient cure for 1 week or heat cure. However, the film quality produced from either D.E.R.™ 331 or 354 increased significantly using heat cure compared to ambient cure. Several of the ambient cured films were somewhat cloudy, i.e., not clear, even in those films containing solvent. The starting formulations including solvent were all clear and homogeneous. The cloudiness developed during ambient cure, which may indicate some immiscibility of the MSO and epoxy resin as the solvent starts to evaporate. The cure mechanism can slow enough at room temperature, that insufficient cure takes place before the solvent evaporates, resulting in separation of components and hazing of the film.

Overall, there does not appear to be a significant difference in the film qualities generated using D.E.R.™ 330 or 331. MSO generates similar film qualities when crosslinking either of the epoxy resins D.E.R.™ 330 or 331 under the conditions selected for the examples.

The other metric used to evaluate epoxy resin crosslinking ability by MSO was adhesion of the film to the CRS substrate. The factors influencing film adhesion to CRS were similar to those affecting film quality. MSO epoxy resin hardener effectiveness by polymer film adhesion to CRS was shown to be a function of the epoxy resin type, solvent, catalyst, and cure profile. Polymer film adhesion to CRS also appears to be a function of the secondary interactions epoxy resin-cure profile, solvent-catalyst, solvent-cure profile, and catalyst-cure profile.

Figure 8:
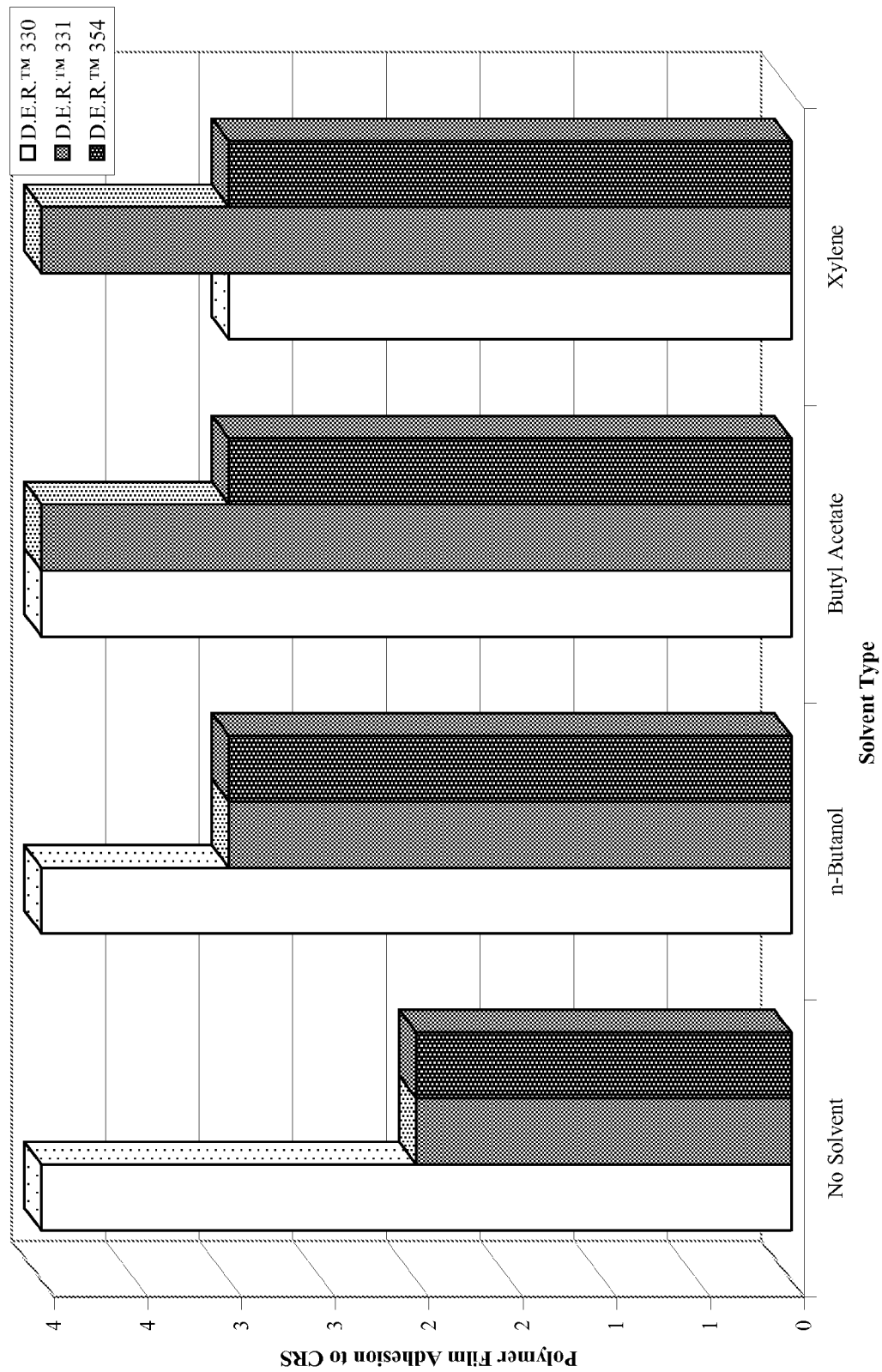
FIG. 8 is a graph showing the effect of epoxy resin type and solvent type on mercaptan-hardened epoxy polymer film adhesion to cold rolled steel (CRS) when using a mercaptanized soybean oil as an epoxy crosslinking agent in accordance with embodiments of the present invention.

The effect of epoxy resin type and solvent on adhesion can be noted in FIG. 8. FIG. 8 illustrates adhesion using the 3 epoxy resins in the study under the same conditions with the selected solvents. The samples illustrated were made using Versamine® EH30 catalyst at 1.0 wt. % and heat cured (100° C. 3 hrs and 120° C. 24 hrs). D.E.R.™ 330 formed films with the least adhesion using MSO as a hardener in xylene, while D.E.R.™ 331 formed better film adhesion in butyl acetate and xylene and D.E.R.™ 354 performed equally well in any of the solvents chosen.

It is also evident from FIG. 4 that D.E.R.™ 330 forms better adhesion films than the other resins studied with no solvent or n-butanol. On the other hand D.E.R.™ 331 forms comparable adhesion films as D.E.R.™ 330 in butyl acetate and better adhesion films in xylene than D.E.R.™ 330. D.E.R.™ 354 provides the least adhesion of all the resins under the conditions studied.

Figure 9:
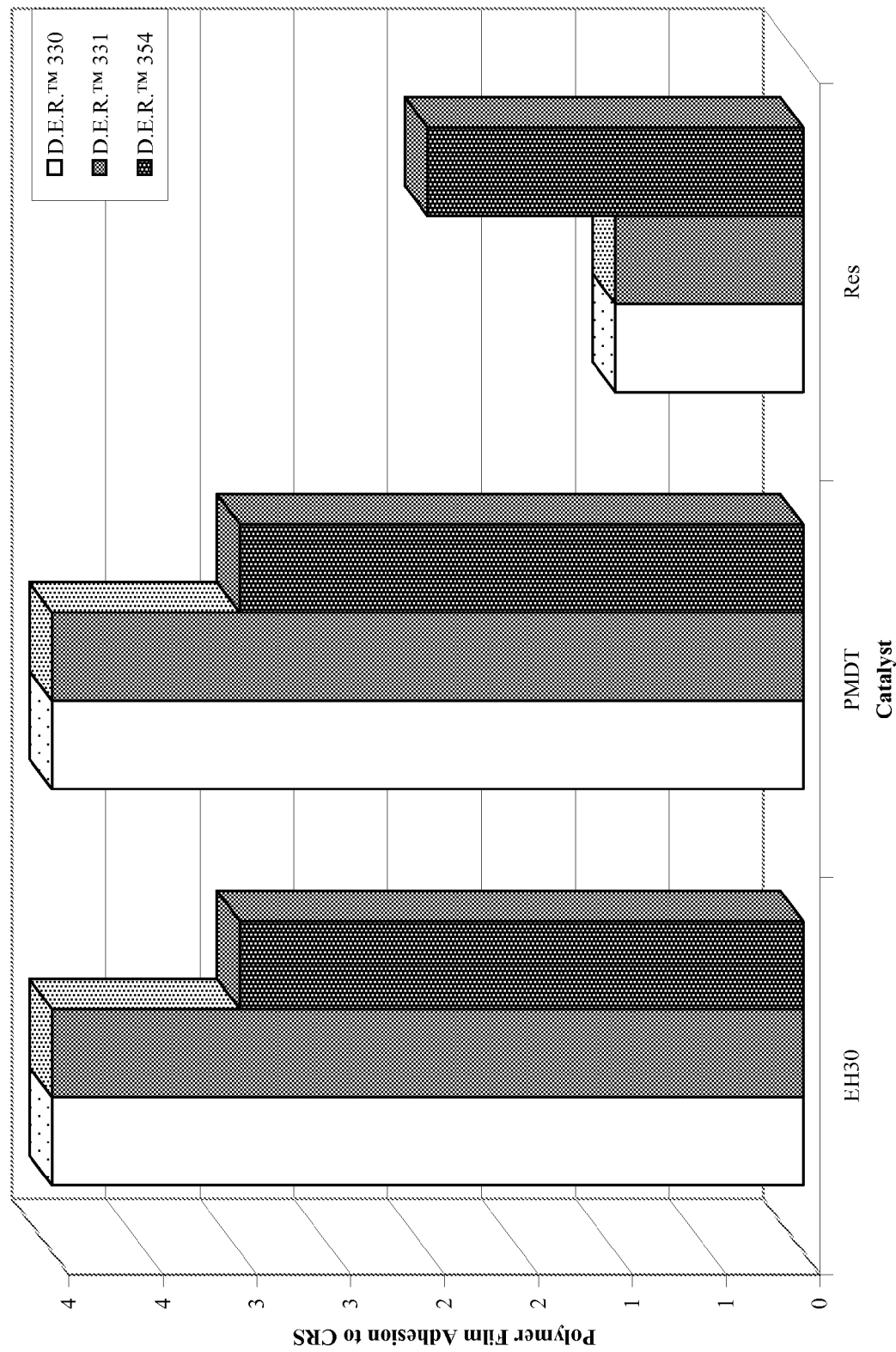
FIG. 9 is a graph showing the effect of epoxy resin type and catalyst on mercaptan-hardened epoxy polymer film adhesion to cold rolled steel when using a mercaptanized soybean oil as an epoxy crosslinking agent in accordance with embodiments of the present invention.

The effect of catalyst on the adhesion of the polymer films is noted in FIG. 9. All epoxy resins studied yielded better film adhesion using Versamine® EH30 or PMDT in butyl acetate rather than resorcinol.

Figure 10:
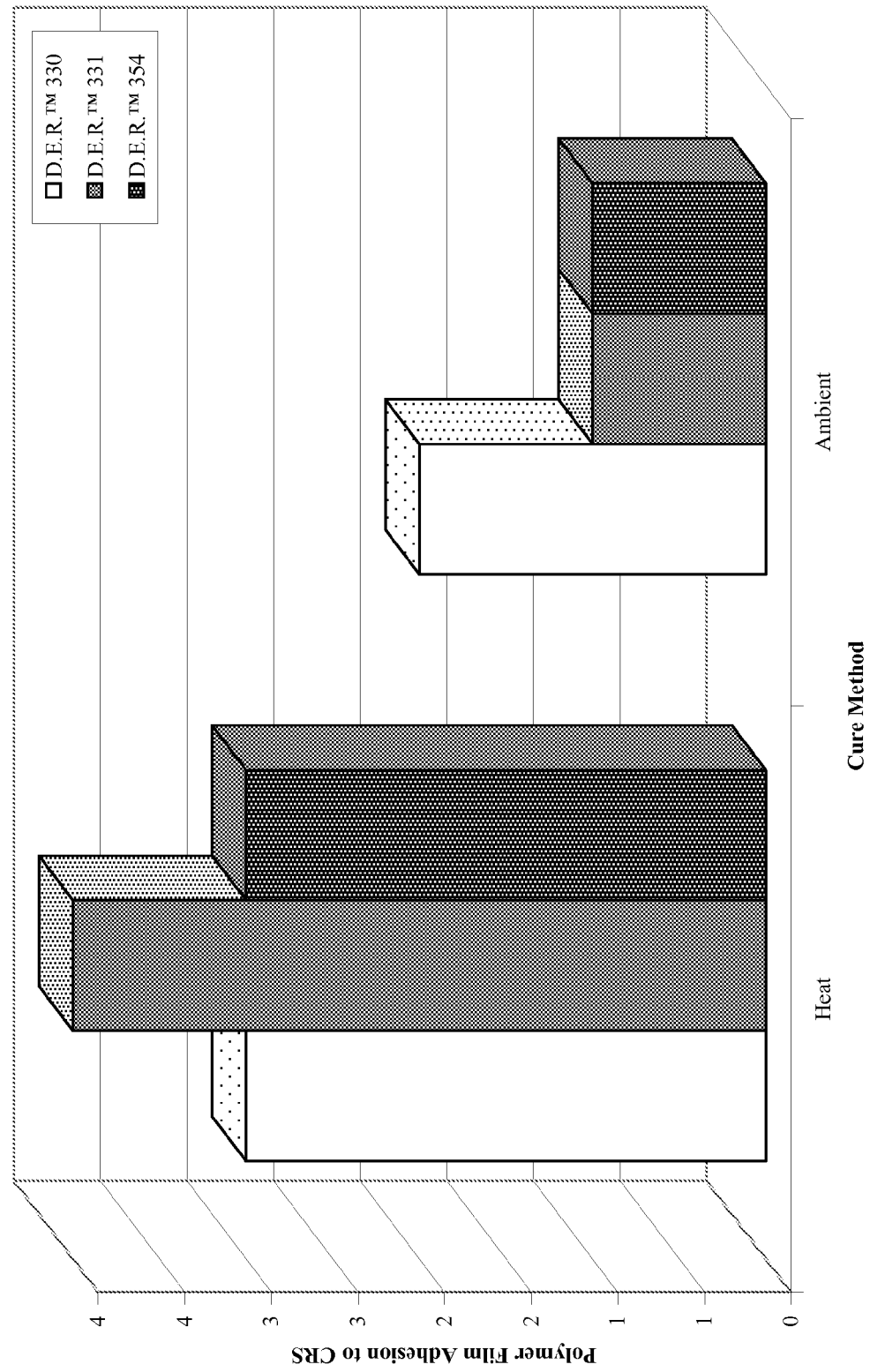
FIG. 10 is a graph showing the effect of epoxy resin type and cure profile on mercaptan-hardened epoxy polymer film adhesion to cold rolled steel when using a mercaptanized soybean oil as an epoxy crosslinking agent in accordance with embodiments of the present invention.

As shown in FIG. 10, cure profile also affected the film adhesion to cold rolled steel. Film adhesion produced from all of the epoxy resins used under the selected conditions increased significantly when a heat cure profile was used, particularly when compared with an ambient air cure. D.E.R.™ 331 produced the highest increase in adhesion with heat curing using Versamine® EH30 catalyst (1 wt. %) in xylene.

Example 3

Properties of Mercaptan-Hardened Epoxy Composition

Six samples of the mercaptan-hardened epoxy composition were prepared, as shown in Table 8 (FIG. 12). The Young's Modulus for the samples ranged from about 325 psi to about 11030 psi. The Tensile strength varied from about 180 psi to about 1500 psi. The % elongation of the samples varied from about 45% to about 90%. The toughness of the samples ranged from about 55 lb-ft/in$^2$ to about 590 lb-ft/in$^2$. In Table 8 (FIG. 12), two different types of epoxy resin were used to produce the samples.

Applications

In addition to the uses related to adhesives described herein, embodiments of the present invention are useful in other numerous applications. For example, embodiments of the invention are useful in various polymer applications that include, but are not limited to, foams, sealants, epoxy hardening agents, printing ink binder polymers, alkyd resin crosslinkers, sulfur based paint template, radiation cured polymers, mining and drilling chemicals, specialty chain transfer agents, rubber modifiers, and the like. Because the feedstock materials are economical and readily available, it is believed that embodiments of the present would be useful in such applications and others.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A mercaptan-hardened epoxy polymer comprising a reaction product of 1) a thiol ester composition comprising
   a) a mercaptanized natural source oil,
   b) a mercaptanized epoxidized natural source oil, or
   c) a crosslinked mercaptanized natural source oil or a crosslinked mercaptanized epoxidized natural source oil,
wherein the thiol ester composition comprises thiol ester molecules, the thiol ester molecules having an average of at least 1.5 ester groups per thiol ester molecule and an average of at least 1.5 thiol groups per thiol ester molecule; and 2) an epoxide composition comprising epoxide molecules, the epoxide molecules having an average of at least 1.5 epoxide groups per epoxide molecule.

2. The mercaptan-hardened epoxy polymer of claim 1, wherein the thiol ester composition comprises a mercaptanized epoxidized natural source oil comprising hydroxy thiol ester molecules, the hydroxy thiol ester molecules having
   an average of from 1.5 to 8 ester groups per hydroxy thiol ester molecule,
   an average of from 1.5 to 9 thiol groups per hydroxy thiol ester molecule,
   an average of from 1.5 to 9 hydroxy groups per hydroxy thiol ester molecule, and
   an average of from 5 to 25 weight percent thiol sulfur per hydroxy thiol ester molecule.

3. The mercaptan-hardened epoxy polymer of claim 1, wherein the thiol ester composition comprises a mercaptanized epoxidized natural source oil comprising hydroxy thiol ester molecules, the hydroxy thiol ester molecules having
   an average of from 2.5 to 5 ester groups per hydroxy thiol ester molecule,
   an average of from 2 to 4 thiol groups per hydroxy thiol ester molecule,
   an average of from 2 to 4 hydroxy groups per hydroxy thiol ester molecule, and
   an average of from 6 to 15 weight percent thiol sulfur per hydroxy thiol ester molecule.

4. The mercaptan-hardened epoxy polymer of claim 3, wherein the natural source oil is soybean oil, corn oil, castor bean oil, or canola oil.

5. The mercaptan-hardened epoxy polymer of claim 3, wherein the epoxidized natural source oil is an epoxidized soybean oil.

6. The mercaptan-hardened epoxy polymer of claim 1, wherein the thiol ester composition comprises thiol ester oligomers having at least three mercaptanized natural source oil monomers or at least three mercaptanized epoxidized natural source oil monomers connected by polysulfide linkages having a structure —$S_Q$—, wherein Q is greater than 1.

7. The mercaptan-hardened epoxy polymer of claim 1, wherein the thiol ester composition comprises a mercaptanized natural source oil comprising thiol ester molecules, the thiol ester molecules having
   an average of from 1.5 to 8 ester groups per thiol ester molecule,
   an average of from 1.5 to 9 thiol groups per thiol ester molecule, and
   an average of from 5 to 25 weight percent thiol sulfur per thiol ester molecule.

8. The mercaptan-hardened epoxy polymer of claim 1, wherein the thiol ester composition comprises a mercaptanized natural source oil comprising thiol ester molecules, the thiol ester molecules having
   an average of from 2.5 to 5 ester groups per thiol ester molecule,
   an average of from 2 to 4 thiol groups per thiol ester molecule,
   an average of from 6 to 15 weight percent thiol sulfur per thiol ester molecule, and
   an average molar ratio of cyclic sulfide groups to thiol groups per thiol ester molecule less than 0.5.

9. The mercaptan-hardened epoxy polymer of claim 8, wherein the natural source oil is soybean oil, corn oil, castor bean oil, or canola oil.

10. The mercaptan-hardened epoxy polymer of claim 8, wherein the mercaptanized natural source oil is a mercaptanized soybean oil or a mercaptanized castor bean oil.

11. The mercaptan-hardened epoxy polymer of claim 1, wherein the epoxide molecules have an average of from 1.5 to 16 epoxide groups per epoxide molecule.

12. The mercaptan-hardened epoxy polymer of claim 1, wherein the mercaptan-hardened epoxy polymer has a glass transition temperature in a range from −100° C. to 250° C.

13. An adhesive polymer composition comprising a reaction product of 1) a thiol ester composition comprising
   a) a mercaptanized natural source oil,
   b) a mercaptanized epoxidized natural source oil, or
   c) a crosslinked mercaptanized natural source oil or a crosslinked mercaptanized epoxidized natural source oil,
wherein the thiol ester composition comprises thiol ester molecules, the thiol ester molecules having an average of at least 1.5 ester groups per thiol ester molecule and an average of at least 1.5 thiol groups per thiol ester molecule; and 2) an epoxide comprising at least two epoxide groups, the adhesive polymer composition having an adjusted separation pressure of greater than 350 psig as measured by ASTM D4541-02.

14. The adhesive polymer composition of claim 13, wherein the epoxide is a glycidyl ether comprising at least two glycidyl ether groups.

15. The adhesive polymer composition of claim 13 having a cure temperature ranging from 10° C. to 40° C.

16. The adhesive polymer composition of claim 13, wherein the thiol ester composition comprises a mercaptanized natural source oil comprising thiol ester molecules, the thiol ester molecules having
   an average of from 1.5 to 8 ester groups per thiol ester molecule,
   an average of from 1.5 to 9 thiol groups per thiol ester molecule, and
   an average of from 5 to 25 weight percent thiol sulfur per thiol ester molecule.

17. The adhesive polymer composition of claim 13, wherein the thiol ester composition comprises a mercaptanized natural source oil comprising thiol ester molecules, the thiol ester molecules having
   an average of from 2.5 to 5 ester groups per thiol ester molecule,
   an average of from 2 to 4 thiol groups per thiol ester molecule,
   an average of from 6 to 15 weight percent thiol sulfur per thiol ester molecule, and
   an average molar ratio of cyclic sulfide groups to thiol groups per thiol ester molecule less than 0.5.

18. The adhesive polymer composition of claim 17, wherein the natural source oil is soybean oil, corn oil, castor bean oil, or canola oil.

19. The adhesive polymer composition of claim 17, wherein the mercaptanized natural source oil is a mercaptanized soybean oil or a mercaptanized castor bean oil.

20. The adhesive polymer composition of claim 13, wherein the thiol ester composition comprises a mercaptanized epoxidized natural source oil comprising hydroxy thiol ester molecules, the hydroxy thiol ester molecules having
   an average of from 1.5 to 8 ester groups per hydroxy thiol ester molecule,
   an average of from 1.5 to 9 thiol groups per hydroxy thiol ester molecule,
   an average of from 1.5 to 9 hydroxy groups per hydroxy thiol ester molecule, and
   an average of from 5 to 25 weight percent thiol sulfur per hydroxy thiol ester molecule.

21. The adhesive polymer composition of claim 13, wherein the thiol ester composition comprises a mercaptanized epoxidized natural source oil comprising hydroxy thiol ester molecules, the hydroxy thiol ester molecules having
   an average of from 2.5 to 5 ester groups per hydroxy thiol ester molecule,
   an average of from 2 to 4 thiol groups per hydroxy thiol ester molecule,
   an average of from 2 to 4 hydroxy groups per hydroxy thiol ester molecule, and
   an average of from 6 to 15 weight percent thiol sulfur per hydroxy thiol ester molecule.

22. The adhesive polymer composition of claim 21, wherein the natural source oil is soybean oil, corn oil, castor bean oil, or canola oil.

23. The adhesive polymer composition of claim 21, wherein the epoxidized natural source oil is an epoxidized soybean oil.

24. The adhesive polymer composition of claim 13, wherein the thiol ester composition comprises thiol ester oligomers having at least three mercaptanized natural source oil monomers or at least three mercaptanized epoxidized natural source oil monomers connected by polysulfide linkages having a structure —$S_Q$—, wherein Q is greater than 1.

25. A method of making a mercaptan-hardened epoxy polymer comprising the steps of:
   (a) contacting 1) a thiol ester composition comprising
      a) a mercaptanized natural source oil,
      b) a mercaptanized epoxidized natural source oil, or c) a crosslinked mercaptanized natural source oil or a crosslinked mercaptanized epoxidized natural source oil, wherein the thiol ester composition comprises thiol ester molecules, the thiol ester molecules having an average of at least 1.5 ester groups per thiol ester molecule and an average of at least 1.5 thiol groups per thiol ester molecule; and 2) an epoxide composition comprising epoxide molecules, the epoxide molecules having an average of at least 1.5 epoxide groups per epoxide molecule to form a mixture; and (b) curing the mixture to produce the mercaptan-hardened epoxy polymer.

26. The method of claim 25, wherein a catalyst is used to form the mixture.

27. The method of claim 26, wherein the catalyst is an amine.

28. The method of claim 25, wherein the mixture is heated at a temperature ranging from 0° C. to 100° C.

29. The method of claim 25, wherein the thiol ester composition comprises a mercaptanized natural source oil comprising thiol ester molecules, the thiol ester molecules having an average of from 2.5 to 5 ester groups per thiol ester molecule, an average of from 2 to 4 thiol groups per thiol ester molecule, an average of from 6 to 15 weight percent thiol sulfur per thiol ester molecule, and an average molar ratio of cyclic sulfide groups to thiol groups per thiol ester molecule less than 0.5.

30. The method of claim 29, wherein the natural source oil is soybean oil, corn oil, castor bean oil, or canola oil.

31. The method of claim 29, wherein the mercaptanized natural source oil is a mercaptanized soybean oil or a mercaptanized castor bean oil.

32. The method of claim 25, wherein the thiol ester composition comprises a mercaptanized epoxidized natural source oil comprising hydroxy thiol ester molecules, the hydroxy thiol ester molecules having an average of from 2.5 to 5 ester groups per hydroxy thiol ester molecule, an average of from 2 to 4 thiol groups per hydroxy thiol ester molecule, an average of from 2 to 4 hydroxy groups per hydroxy thiol ester molecule, and an average of from 6 to 15 weight percent thiol sulfur per hydroxy thiol ester molecule.

33. The method of claim 32, wherein the natural source oil is soybean oil, corn oil, castor bean oil, or canola oil.

34. The method of claim 32, wherein the epoxidized natural source oil is an epoxidized soybean oil.

35. The method of claim 25, wherein the thiol ester composition comprises thiol ester oligomers having at least three mercaptanized natural source oil monomers or at least three mercaptanized epoxidized natural source oil monomers connected by polysulfide linkages having a structure —$S_Q$—, wherein Q is greater than 1.

36. The method of claim 25, wherein the thiol ester composition and the epoxide composition are contacted at a molar ratio of —XH groups to epoxide groups in a range from 0.9 to 1.3, wherein —XH groups of the thiol ester composition are a total of —SH groups or —SH and —OH groups of the thiol ester molecules.

* * * * *